(12) United States Patent
Teraki

(10) Patent No.: US 12,196,459 B2
(45) Date of Patent: Jan. 14, 2025

(54) SOLID-STATE COOLING MODULE

(71) Applicant: DAIKIN INDUSTRIES, LTD., Osaka (JP)

(72) Inventor: Junichi Teraki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 313 days.

(21) Appl. No.: 17/706,180

(22) Filed: Mar. 28, 2022

(65) Prior Publication Data

US 2022/0221201 A1 Jul. 14, 2022

Related U.S. Application Data

(63) Continuation of application No. PCT/JP2020/036608, filed on Sep. 28, 2020.

(30) Foreign Application Priority Data

Sep. 30, 2019 (JP) .................................. 2019-180473

(51) Int. Cl.
F25B 21/00 (2006.01)
(52) U.S. Cl.
CPC ...... *F25B 21/00* (2013.01); *F25B 2321/0023* (2013.01); *F25B 2400/21* (2013.01)
(58) Field of Classification Search
CPC .............. F25B 21/00; F25B 2321/0023; F25B 2321/0021
See application file for complete search history.

(56) References Cited

U.S. PATENT DOCUMENTS

| 9,546,803 | B2 * | 1/2017 | Watanabe | ............... F25B 21/00 |
| 9,784,482 | B2 * | 10/2017 | Mun | ....................... F25B 21/00 |
| 2011/0314836 | A1 | 12/2011 | Heitzler et al. | |
| 2014/0165595 | A1 | 6/2014 | Zimm et al. | |
| 2014/0290275 | A1 | 10/2014 | Muller | |
| 2015/0184902 | A1 | 7/2015 | Torii et al. | |
| 2017/0370624 | A1 | 12/2017 | Zimm et al. | |
| 2021/0164706 | A1 | 6/2021 | Teraki | |

FOREIGN PATENT DOCUMENTS

| EP | 2 813 785 A1 | 12/2014 |
| JP | 2006-308197 A | 11/2006 |
| JP | 2010-112606 A | 5/2010 |
| JP | 2012-520986 A | 9/2012 |
| JP | 2012-237497 A | 12/2012 |

(Continued)

OTHER PUBLICATIONS

International Preliminary Report of corresponding PCT Application No. PCT/JP2020/036608 dated Apr. 14, 2022.

(Continued)

*Primary Examiner* — Ana M Vazquez
(74) *Attorney, Agent, or Firm* — Global IP Counselors, LLP

(57) ABSTRACT

A solid-state cooling module includes a plurality of housing portions. Each of the housing portions houses a solid refrigerant substance. The solid-state cooling module is configured to heat or cool a heat medium flowing through insides of the plurality of housing portions. At least some of the plurality of housing portions are connected to each other in series with respect to a flow of the heat medium.

24 Claims, 36 Drawing Sheets

(56) References Cited

FOREIGN PATENT DOCUMENTS

| | | |
|---|---|---|
| JP | 2015-124927 A | 7/2015 |
| JP | 2016-507714 A | 3/2016 |
| JP | 2016-80205 A | 5/2016 |
| JP | 2020-41791 A | 3/2020 |

OTHER PUBLICATIONS

International Search Report of corresponding PCT Application No. PCT/JP2020/036608 dated Dec. 8, 2020.
European Search Report of corresponding EP Application No. 20 87 1883.3 dated Sep. 25, 2023.

* cited by examiner

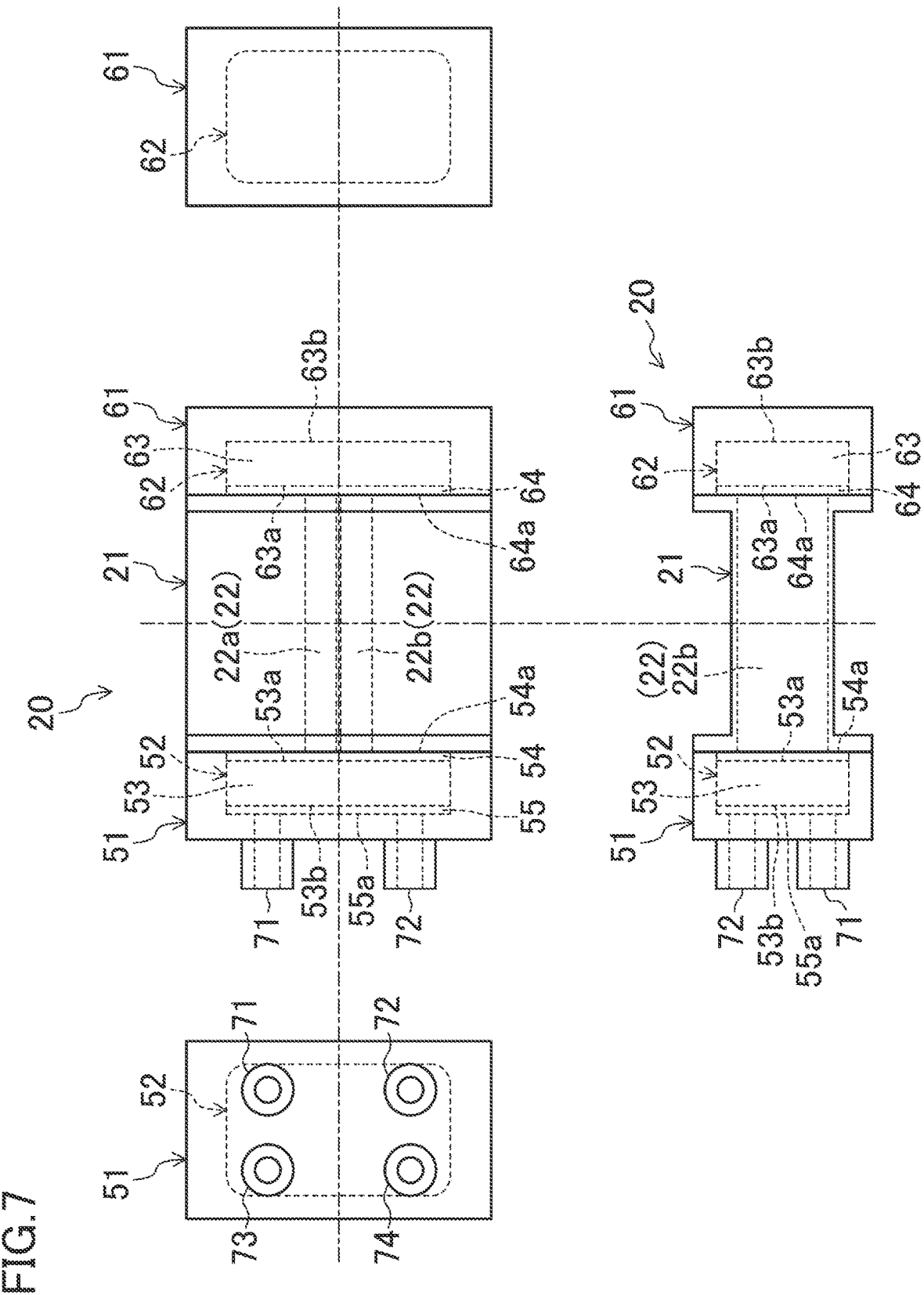

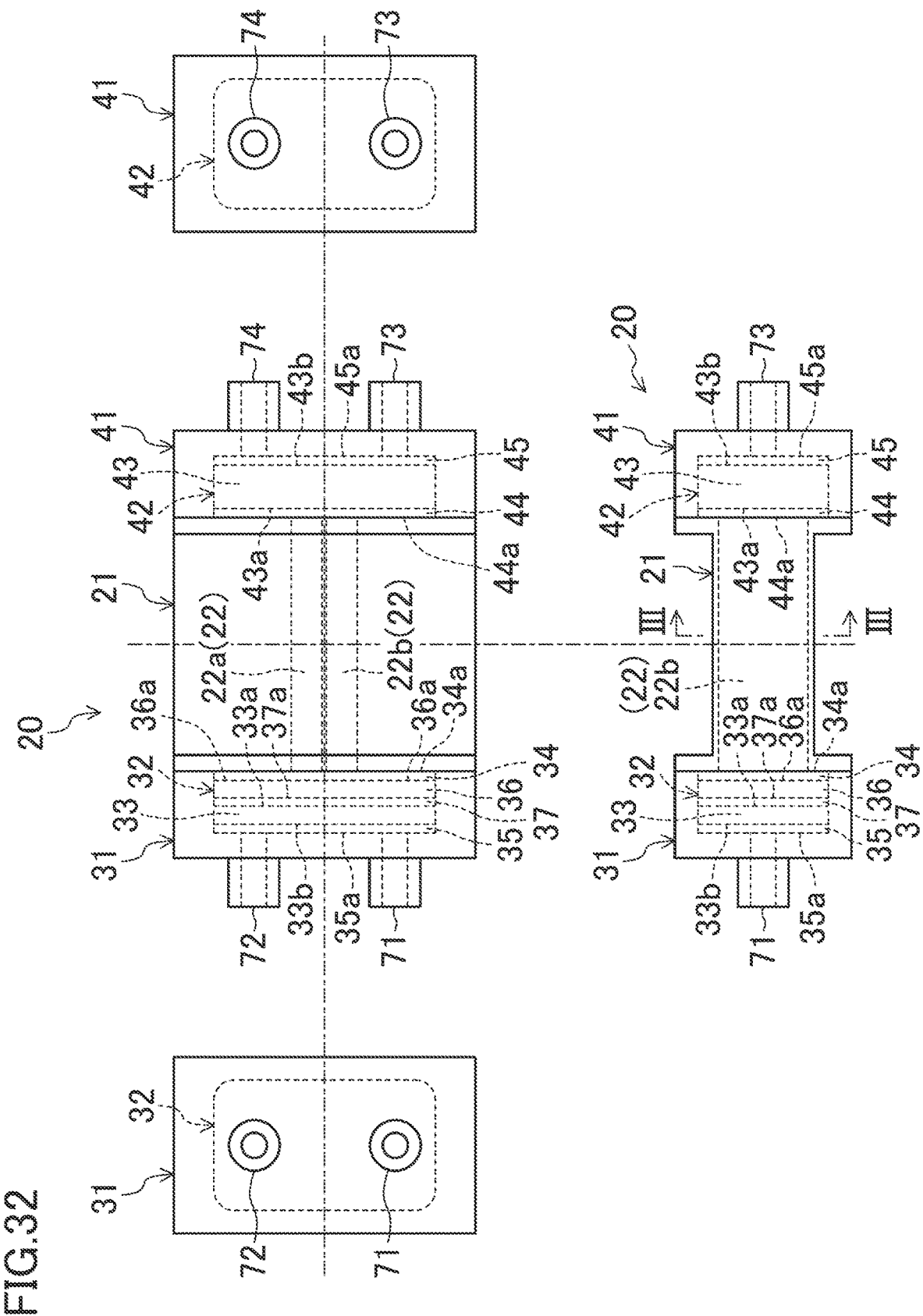

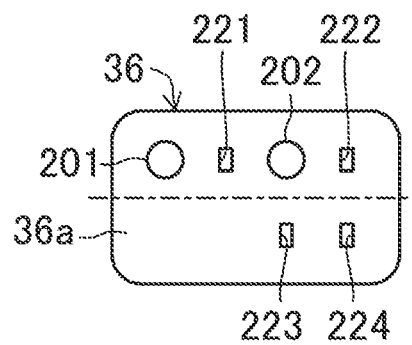 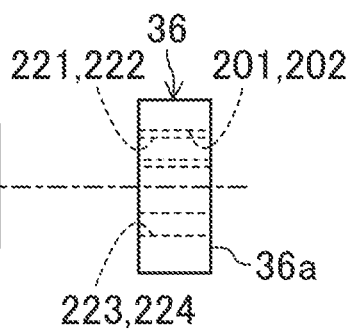 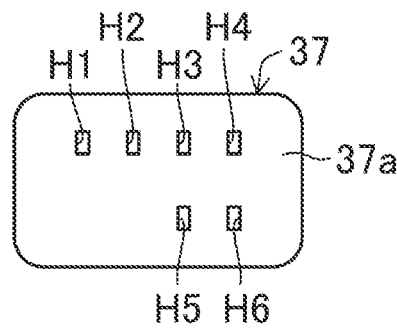
FIG.33A    FIG.33B    FIG.33C
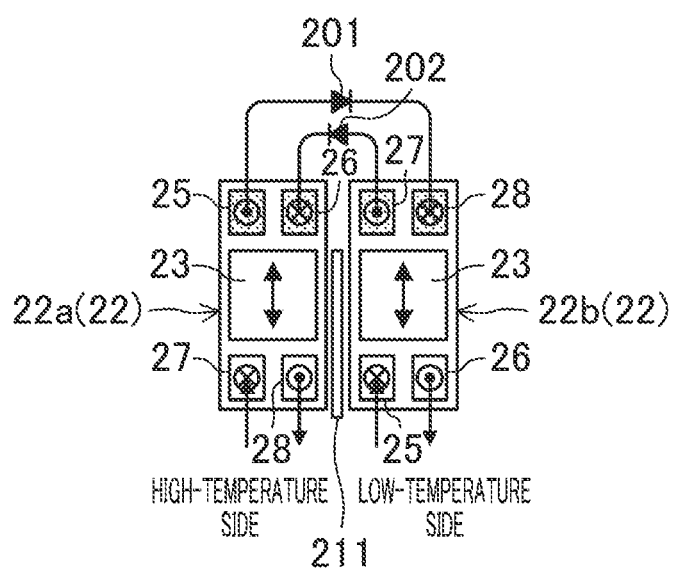
FIG.34

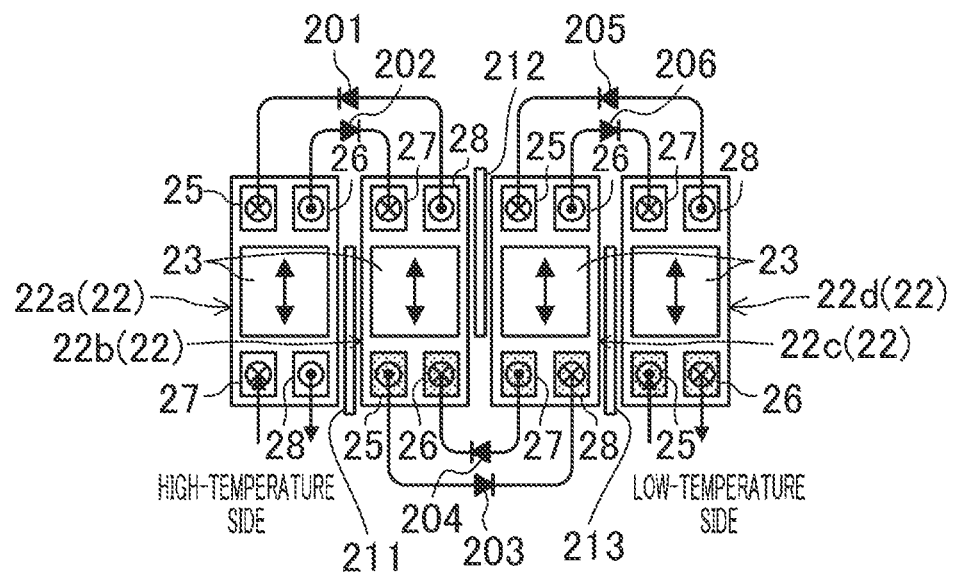
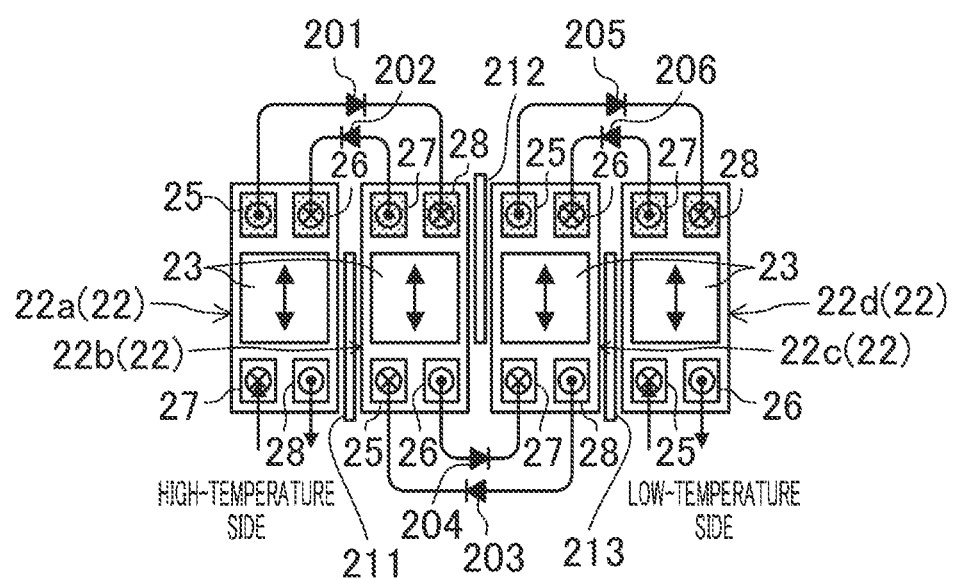

SOLID-STATE COOLING MODULE

CROSS-REFERENCE TO RELATED APPLICATIONS

This is a continuation of International Application No. PCT/JP2020/036608 filed on Sep. 28, 2020, which claims priority to Japanese Patent Application No. 2019-180473, filed on Sep. 30, 2019. The entire disclosures of these applications are incorporated by reference herein.

BACKGROUND

Technical Field

The present disclosure relates to a solid-state cooling module.

Background Art

In related art, a magnetic refrigeration module including a plurality of housing portions each housing a magnetic working substance is known (for example, Japanese Unexamined Patent Application Publication (Translation of PCT Application) No, 2016-507714). In the magnetic refrigeration module of Japanese Unexamined Patent Application Publication No. 2016-507714, as illustrated in FIG. 4 of the same literature, the plurality of housing portions are connected to each other in parallel.

SUMMARY

A first aspect of the present disclosure is directed to a solid-state cooling module including a plurality of housing portions. Each of the housing portions houses a solid refrigerant substance. The solid-state cooling module is configured to heat or cool a heat medium flowing through insides of the plurality of housing portions. At least some of the plurality of housing portions are connected to each other in series with respect to a flow of the heat medium.

BRIEF DESCRIPTION OF THE DRAWINGS

FIG. 7 is a four-side view illustrating a configuration of a magnetic refrigeration module according to a modification of Embodiment 1.

FIG. 16A, FIG. 1613, FIG. 16C, FIG. 16D, FIG. 16E, FIG. 16F, FIG. 16G, FIG. 16H and FIG. 16I are diagrams illustrating; components of the magnetic refrigeration module according to the modification of Embodiment 2.

FIG. 32 is a four-side view illustrating an example of a configuration of the magnetic refrigeration module provided with the backflow prevention portion illustrated in FIG. 31.

FIG. 33A, FIG. 33B and FIG. 33C are diagrams illustrating an example of a header structure of the magnetic refrigeration module illustrated in FIG. 32.

FIG. 34 is a diagram illustrating a state in which a backflow prevention portion and a heat insulating layer are further provided in the magnetic refrigeration module illustrated in FIGS. 8A to 8I.

FIG. 37 is a diagram illustrating a state in which a backflow prevention portion and a heat insulating layer are further provided in the magnetic refrigeration module illustrated in FIGS. 20A to 20K.

FIG. 38 is a diagram illustrating a state in which a backflow prevention portion and a heat insulating layer are further provided in the magnetic refrigeration module illustrated in FIGS. 24A to 24I.

DETAILED DESCRIPTION OF EMBODIMENT(S)

Embodiment 1

Figure 1:
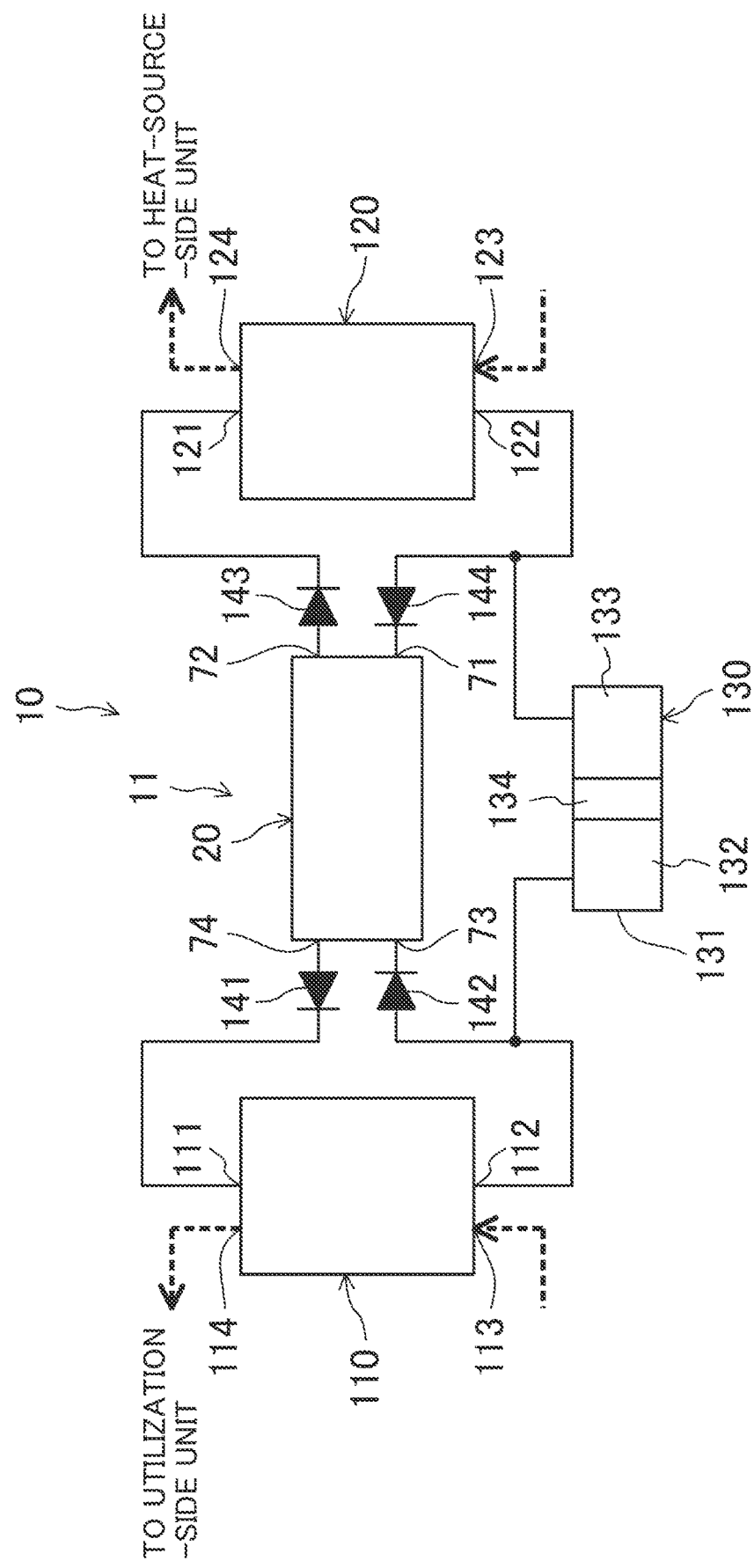
FIG. 1 is a circuit diagram illustrating a configuration of an air conditioning system according to Embodiment 1.

Embodiment 1 will be described. A magnetic refrigeration module (20) according to the present embodiment adjusts a temperature of a heat medium (a fluid in the present embodiment) by using a magnetocaloric effect, and is provided in an air conditioning system (10) configured as a cold chiller, for example. The magnetic refrigeration module (20) is a solid-state cooling module that adjusts the temperature of the heat medium by using a caloric effect. Note that the use of the magnetic refrigeration module (20) is not limited thereto. For example, the magnetic refrigeration module (20) may be provided in an air conditioner. Configuration of Air Conditioning System As illustrated in FIG. 1, the air conditioning system (10) includes a heat medium circuit (11) provided with the magnetic refrigeration module (20), a low-temperature-side heat exchanger (110), a high-temperature-side heat exchanger (120), and a heat medium pump (130). Components of the heat medium circuit (11) are connected to each other through a heat medium pipe.

The magnetic refrigeration module (20) includes a magnetic working substance (23) as a solid refrigerant substance. The magnetic refrigeration module (20) is an apparatus that generates a magnetocaloric effect by applying or removing a magnetic field to or from the magnetic working substance (23), thereby heating or cooling a heat medium flowing therein. The magnetic refrigeration module (20) has a low-temperature-end inflow port (73), a low-temperature-end outflow port (74), a high-temperature-end inflow port (71), and a high-temperature-end outflow port (72). The low-temperature-end inflow port (73) and the high-temperature-end inflow port (71), and the low-temperature-end outflow port (74) and the high-temperature-end outflow port (72) communicate with a housing portion (22) (see FIGS. 2 and 3) inside the magnetic refrigeration module (20). The heat medium having flowed in from the low-temperature-end inflow port (73) flows through the inside of the housing portion (22) and flows out from the high-temperature-end outflow port (72). The heat medium having flowed in from the high-temperature-end inflow port (71) flows through the inside of the housing portion (22) and flows out from the low-temperature-end outflow port (74). A configuration of the magnetic refrigeration module (20) will be described in detail later.

The low-temperature-side heat exchanger (110) exchanges heat between the heat medium cooled by the magnetic refrigeration module (20) and a second refrigerant flowing through a utilization-side unit not illustrated (for example, an air handling unit). The low-temperature-side heat exchanger (110) includes a first inflow portion (111) connected to the low-temperature-end outflow port (74) of the magnetic refrigeration module (20), a first outflow portion (112) connected to the low-temperature-end inflow port (73) of the magnetic refrigeration module (20), and a third inflow portion (113) and a third outflow portion (114) connected to the utilization-side unit.

A heat medium pipe between the low-temperature-end outflow port (74) and the first inflow portion (111) is provided with a first check valve (141) that allows a flow of the heat medium from the former one to the latter one but prohibits a flow of the heat medium in the opposite direction. A heat medium pipe between the low-temperature-end inflow port (73) and the first outflow portion (112) is provided with a second check valve (142) that allows a flow of the heat medium from the latter one to the former one but prohibits a flow of the heat medium in the opposite direction.

The high-temperature-side heat exchanger (120) exchanges heat between the heat medium heated by the magnetic refrigeration module (20) and a second refrigerant flowing through a heat-source-side unit not illustrated (for example, a cooling tower). The high-temperature-side heat exchanger (120) includes a second inflow portion (121) connected to the high-temperature-end outflow port (72) of the magnetic refrigeration module (20), a second outflow portion (122) connected to the high-temperature-end inflow port (71) of the magnetic refrigeration module (20), and a fourth inflow portion (123) and a fourth outflow portion (124) connected to the heat heat-source-side unit.

A heat medium pipe between the high-temperature-end outflow port (72) and the second inflow portion (121) is provided with a third check valve (143) that allows a flow of the heat medium from the former one to the latter one but prohibits a flow of the heat medium in the opposite direction. A heat medium pipe between the high-temperature-end inflow port (71) and the second outflow portion (122) is provided with a fourth check valve (144) that allows a flow of the heat medium from the latter one to the former one but prohibits a flow of the heat medium in the opposite direction.

The heat medium pump (130) causes the heat medium to flow between the magnetic refrigeration module (20) and the low-temperature-side heat exchanger (110), and between the magnetic refrigeration module (20) and the high-temperature-side heat exchanger (120). In this example, the heat medium pump (130) is configured as a piston pump. The heat medium pump (130) includes a cylinder (131) and a piston (134) disposed therein. The cylinder (131) is partitioned by the piston (134) into a first chamber (132) and a second chamber (133). The first chamber (132) communicates with the heat medium pipe between the low-temperature-side heat exchanger (110) and the second check valve (142). The second chamber (133) communicates with the heat medium pipe between the high-temperature-side heat exchanger (120) and the fourth check valve (144).

The heat medium pump (130) is configured to perform a first operation of discharging the heat medium from the first chamber (132) and sucking the heat medium into the second chamber (133) and a second operation of discharging the heat medium from the second chamber (133) and sucking the heat medium into the first chamber (132) when the piston (134) reciprocates in the cylinder (131).

Configuration of Magnetic Refrigeration Module

As illustrated in FIGS. 2 to 6K, the magnetic refrigeration module (20) includes a housing portion case (21), a high-temperature-side header case (31), and a low-temperature-side header case (41), each of which has a rectangular-parallelepiped shape. The high-temperature-side header case (31) is integrally attached to one side surface (a left side surface in FIG. 2) of the housing portion case (21). The low-temperature-side header case (41) is integrally attached to another side surface (a right side surface in FIG. 2) of the housing portion case (21).

Figure 4A:
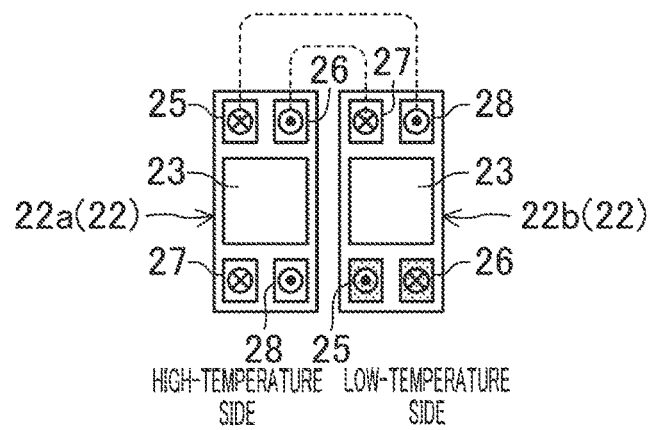
FIG. 4A, FIG. 4B, FIG. 4C, FIG. 4D, FIG. 4E, FIG. 4F, FIG. 4G, FIG. 4H, FIG. 4I, FIG. 4J and FIG. 4K are diagrams illustrating components of the magnetic refrigeration module according to Embodiment 1.

FIG. 4A is a view of a plurality of housing portions (22) described later when seen from the left side in FIG. 2. Here, a symbol in each of flow paths (25 to 28) indicates a direction in which the heat medium flows in the flow path (25 to 28). The hatching applied to the flow path (25 to 28) indicates that the near side in a direction orthogonal to the sheet of FIG. 4A is closed. The flow path (25 to 28) without the hatching is closed on the far side in the direction orthogonal to the sheet of FIG. 4A.

Figure 4B:
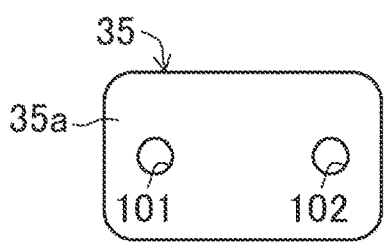
Figure 4C:
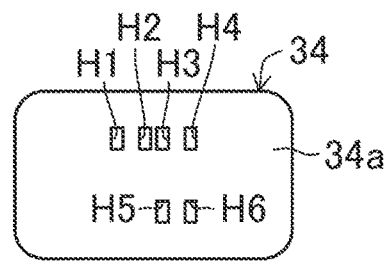
Figure 4D:
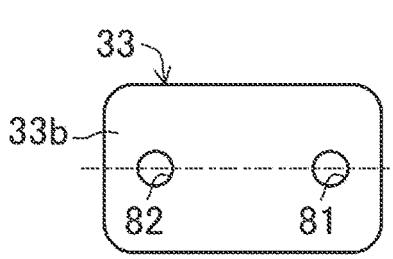
Figure 4E:
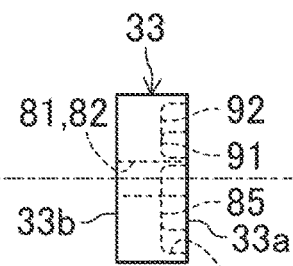
Figure 4F:
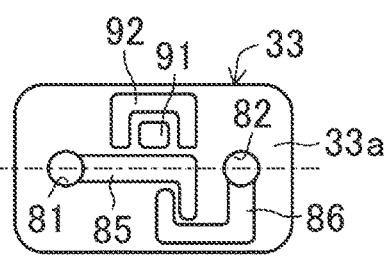

FIG. 4B is a view of a second high-temperature-side packing (35) described later when seen from the left side in FIG. 2. FIG. 4C is a view of a first high-temperature-side packing (34) described later when seen from the right side in FIG. 2. FIG. 4D is a view of a high-temperature-side header body (33) described later when seen from the left side in FIG. 2. FIG. 4E is a view of the high-temperature-side header body (33) when seen from the near side in the direction orthogonal to the sheet of FIG. 2. FIG. 4F is a view of the high-temperature-side header body (33) when seen from the right side in FIG. 2.

Figure 4G:
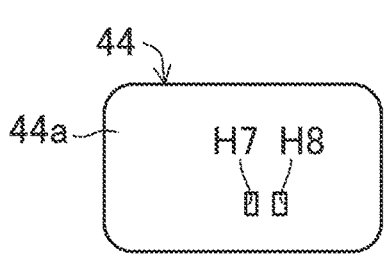
Figure 4H:
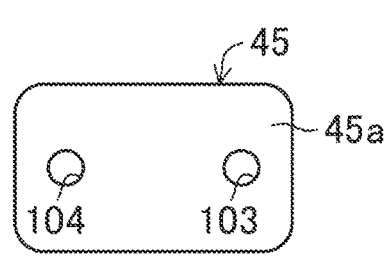
Figure 4I:
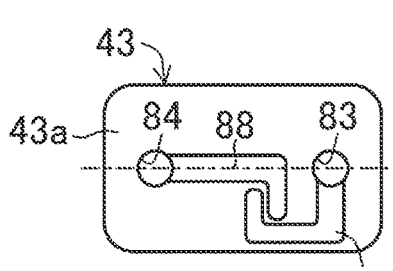
Figure 4J:
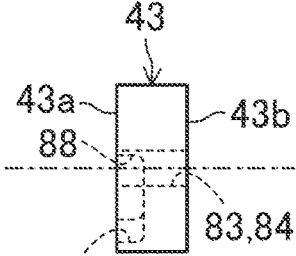
Figure 4K:
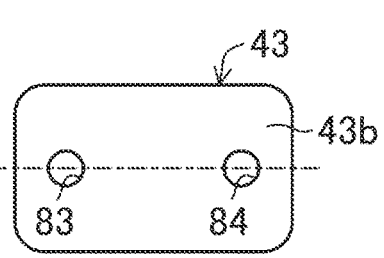
Figure 5A:
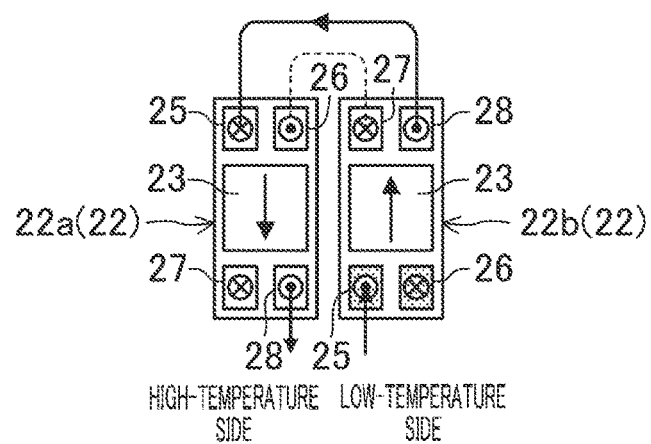
FIG. 5A, FIG. 5B, FIG. SC.
Figure 5B:
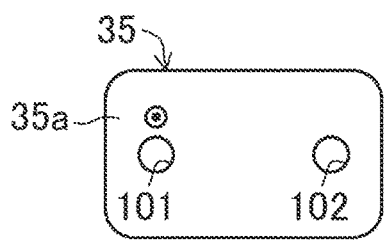
Figure 5C:
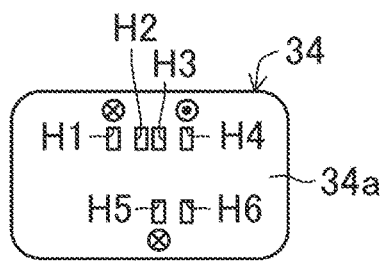
FIG. 5D, FIG. 5E, FIG. 5F, FIG. 5G, FIG. 5H, FIG. 5I, FIG. 5J and FIG. 5K are diagrams for describing a flow of a heat medium in the magnetic refrigeration module when a heat medium pump performs a first operation.
Figure 5D:
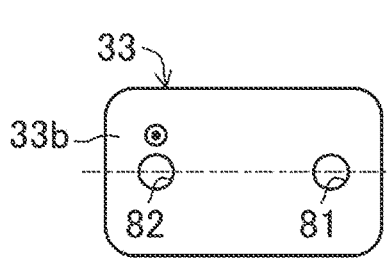
Figure 5E:
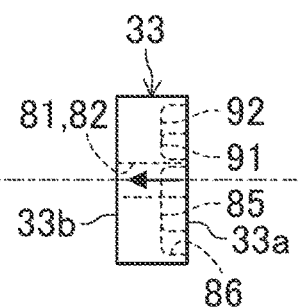
Figure 5F:
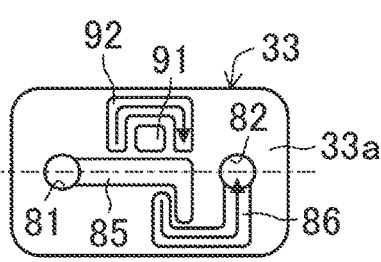
Figure 5G:
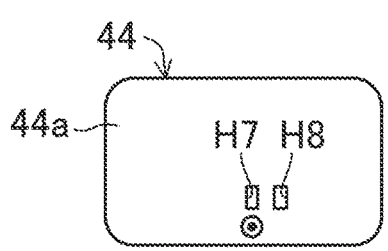
Figure 5H:
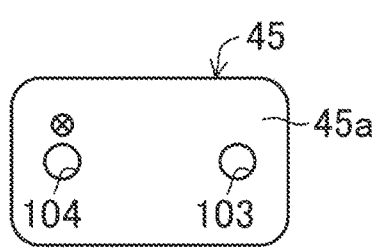
Figure 5I:
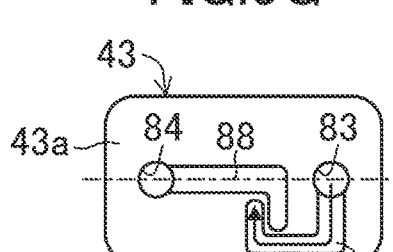
Figure 5J:
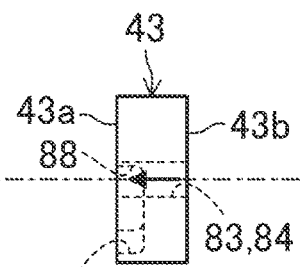
Figure 5K:
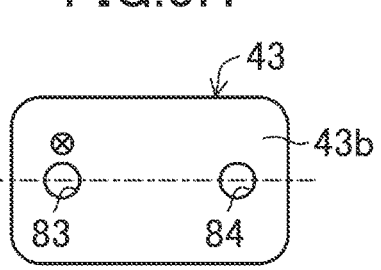
Figure 6A:
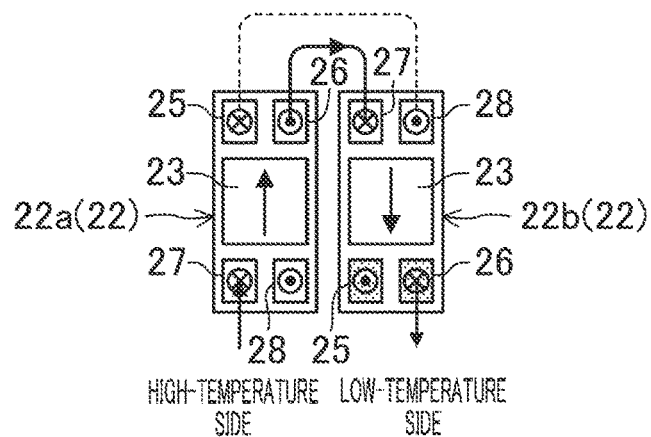
FIG. 6A, FIG. 6B, FIG. 6C, FIG. 6D, FIG. 6E, FIG. 6F, FIG. 6G, FIG. 6H, FIG. 6I, FIG. 6J and FIG. 6K are diagrams for describing a flow of the heat medium in the magnetic refrigeration module when the heat medium pump performs a second operation.
Figure 6B:
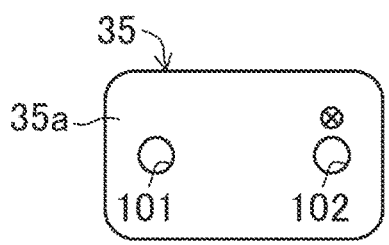
Figure 6C:
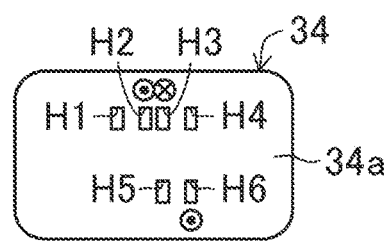
Figure 6D:
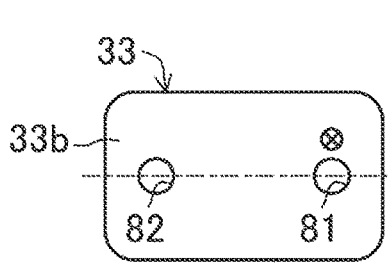
Figure 6E:
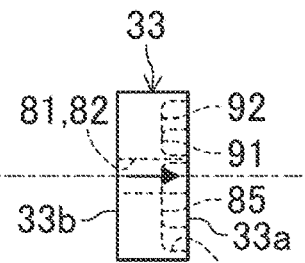
Figure 6F:
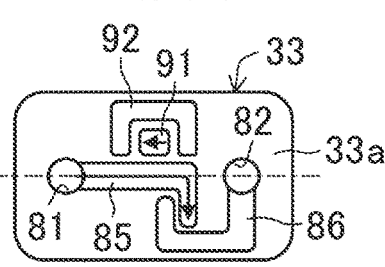
Figure 6G:
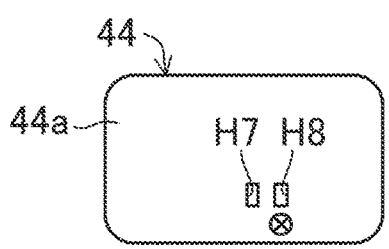
Figure 6H:
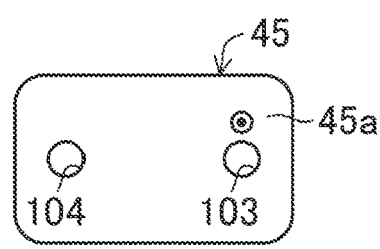
Figure 6I:
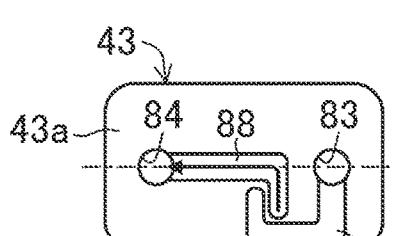
Figure 6J:
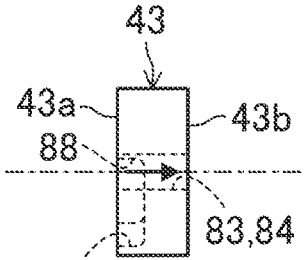
Figure 6K:
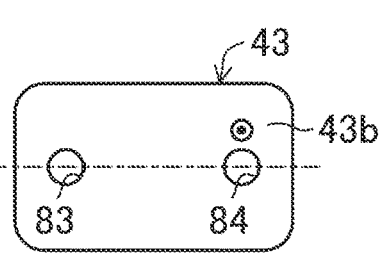
Figure 8A:
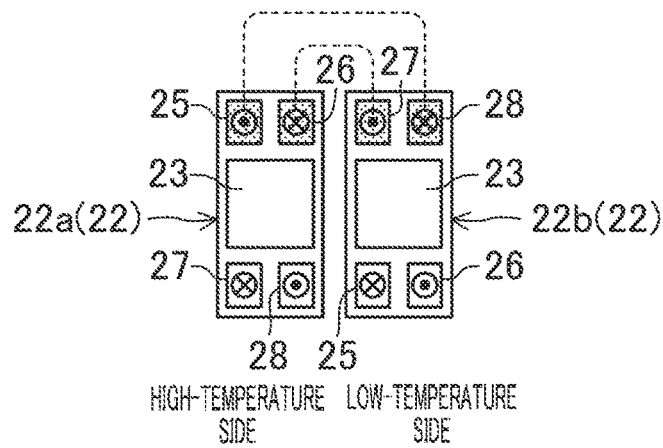
FIG. 8A.
Figure 8B:
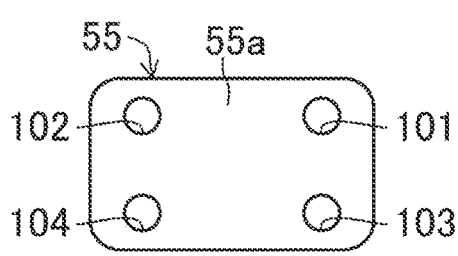
FIG. 8B, FIG. 8C, FIG. SD.
Figure 8C:
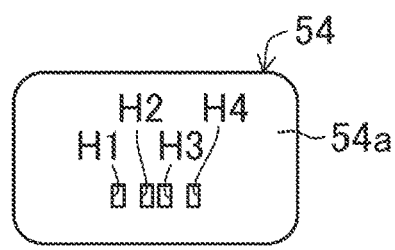
Figure 8D:
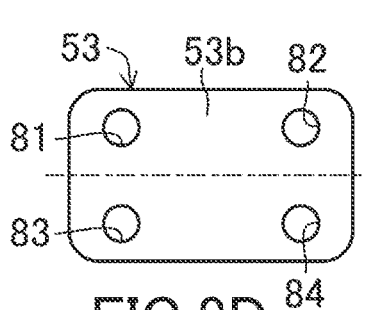
FIG. 8E, FIG. SF.
FIG. 8G, FIG. 8H and FIG. 8I are diagrams illustrating components of the magnetic refrigeration module according to the modification of Embodiment 1.
Figure 8E:
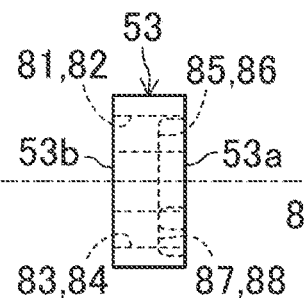
Figure 8F:
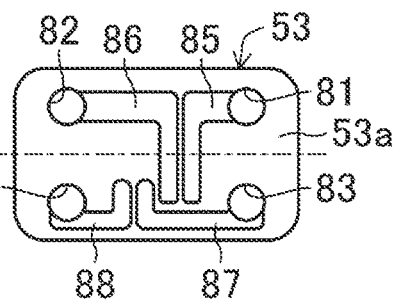
Figure 8G:
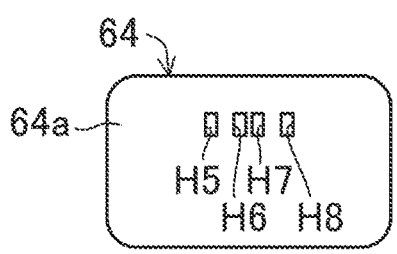
Figure 8H:
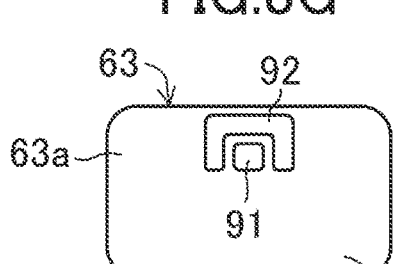
Figure 8I:
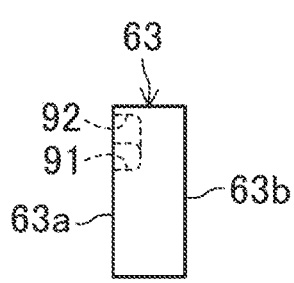
Figure 9A:
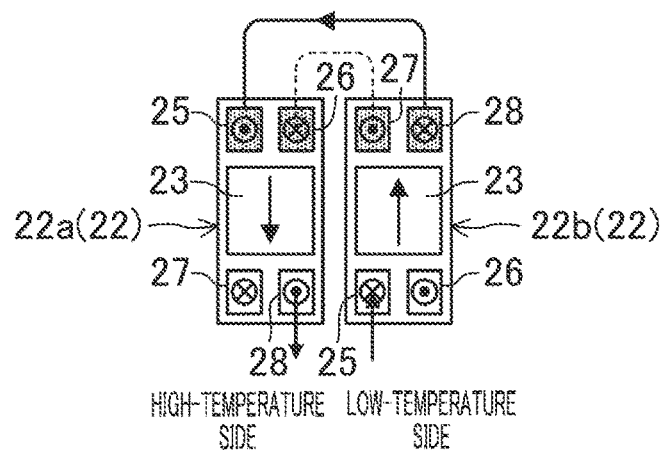
FIG. 9A, FIG. 9B, FIG. 9C, FIG. 9D, FIG. 9E, FIG. 9F, FIG. 9G, FIG. 9H and FIG. 9I are diagrams for describing a flow of a heat medium in the magnetic refrigeration module when a heat medium pump performs a first operation.
Figure 9B:
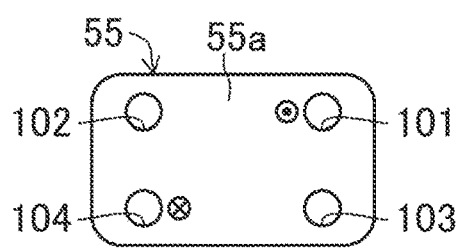
Figure 9C:
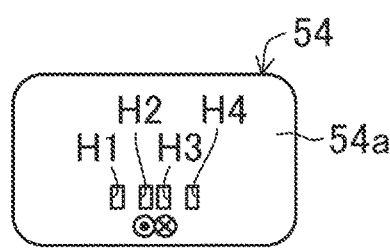
Figure 9D:
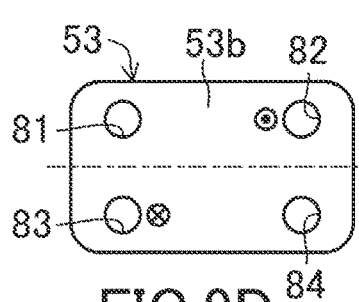
Figure 9E:
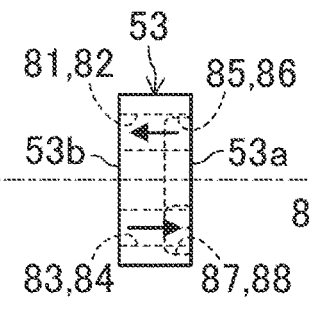
Figure 9F:
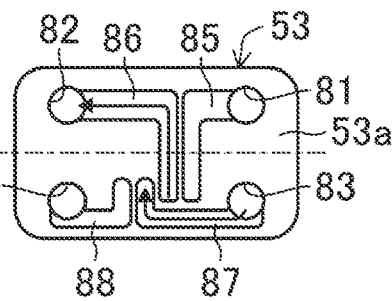
Figure 9G:
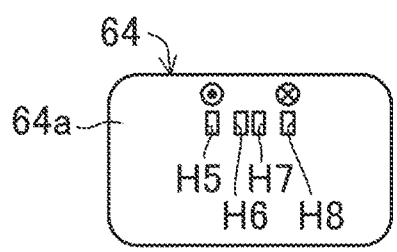
Figure 9H:
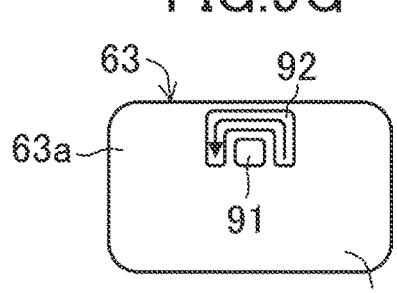
Figure 9I:
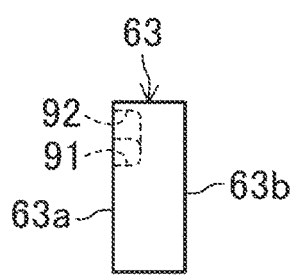
Figure 10A:
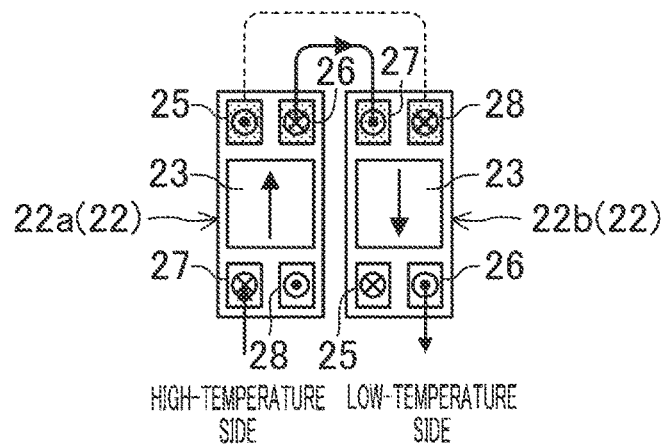
FIG. 10A, FIG. 10B, FIG. 10C, FIG. 10D, FIG. 10E, FIG. 10F, FIG. 10G, FIG. 10H and FIG. 10I are diagrams for describing a flow of the heat medium in the magnetic refrigeration module when the heat medium pump performs a second operation.
Figure 10B:
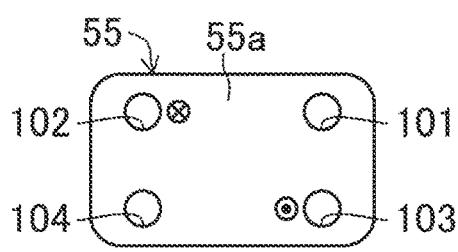
Figure 10C:
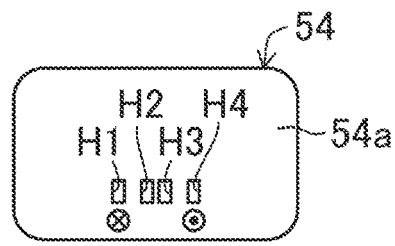
Figure 10D:
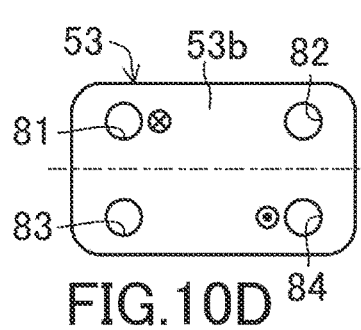
Figure 10E:
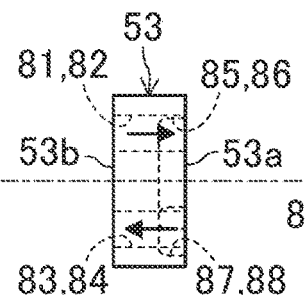
Figure 10F:
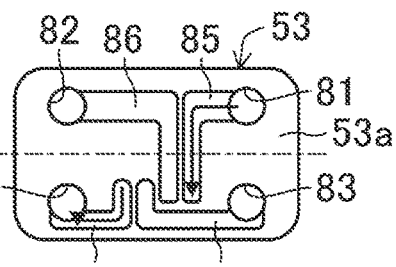
Figure 10G:
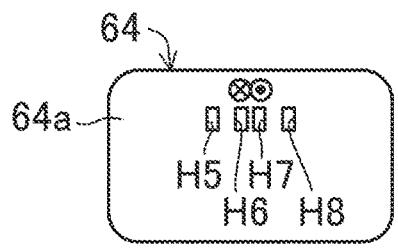
Figure 10H:
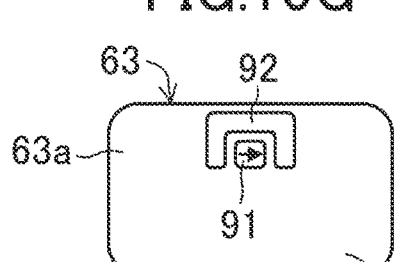
Figure 10I:
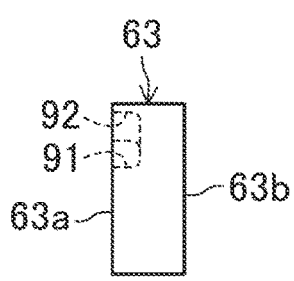
Figure 11:
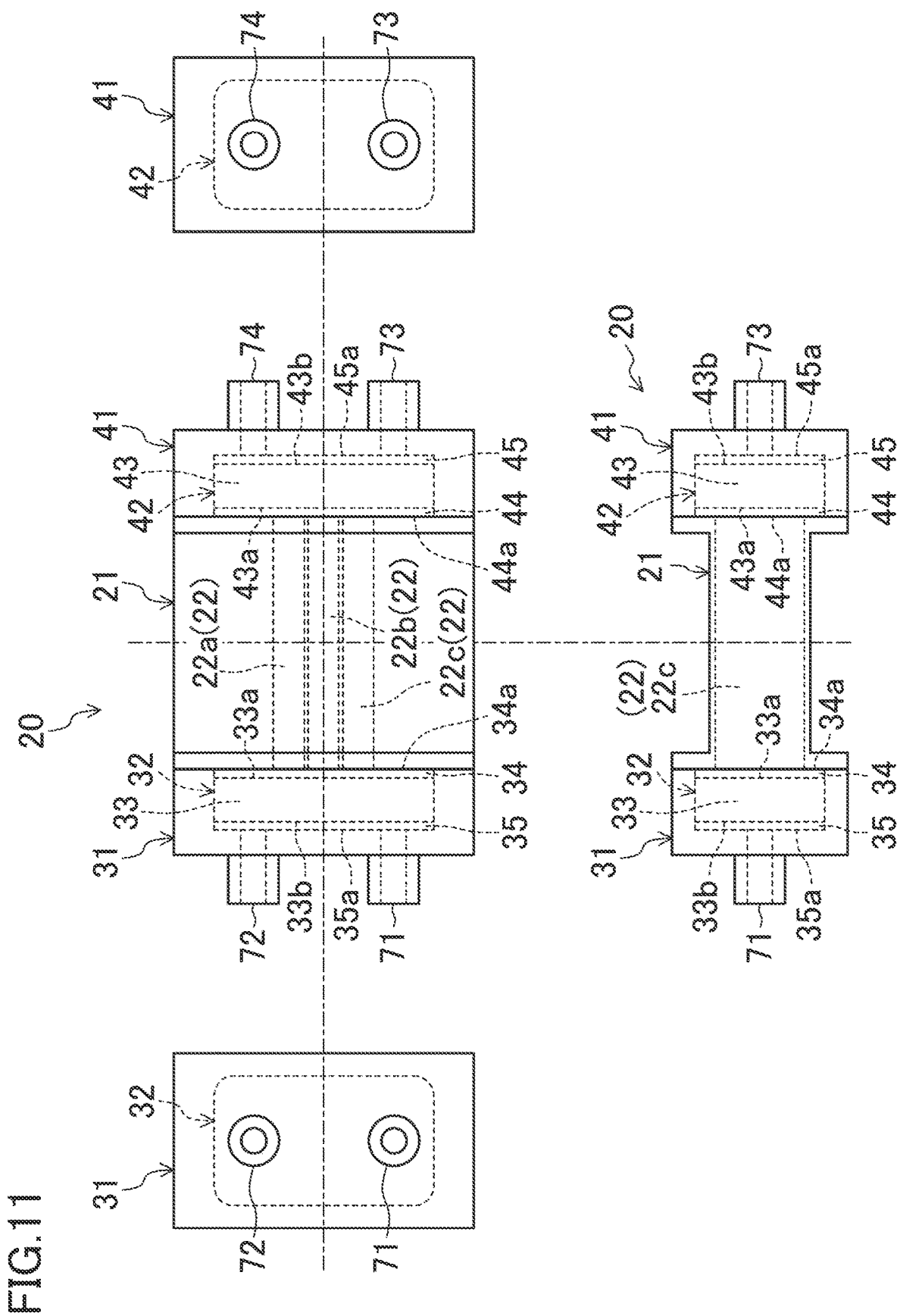
FIG. 11 is a four-side view illustrating a configuration of a magnetic refrigeration module according to Embodiment 2.

FIG. 4G is a view of a first low-temperature-side packing (44) described later when seen from the left side in FIG. 2. FIG. 4H is a view of a second low-temperature-side packing (45) described later when seen from the right side in FIG. 2. FIG. 4I is a view of a low-temperature-side header body (43) described later when seen from the left side in FIG. 2. FIG. 4J is a view of the low-temperature-side header body (43) when seen from the near side in the direction orthogonal to the sheet of FIG. 2. FIG. 4K is a view of the low-temperature-side header body (43) when seen from the right side in FIG. 2.

Housing Portion Case

The housing portion case (21) houses a plurality of (in this example, two) housing portions (22). The housing portion case (21) has a plurality of (in this example, two) through holes (21a). Each through hole (21a) houses one housing portion (22).

Figure 3:
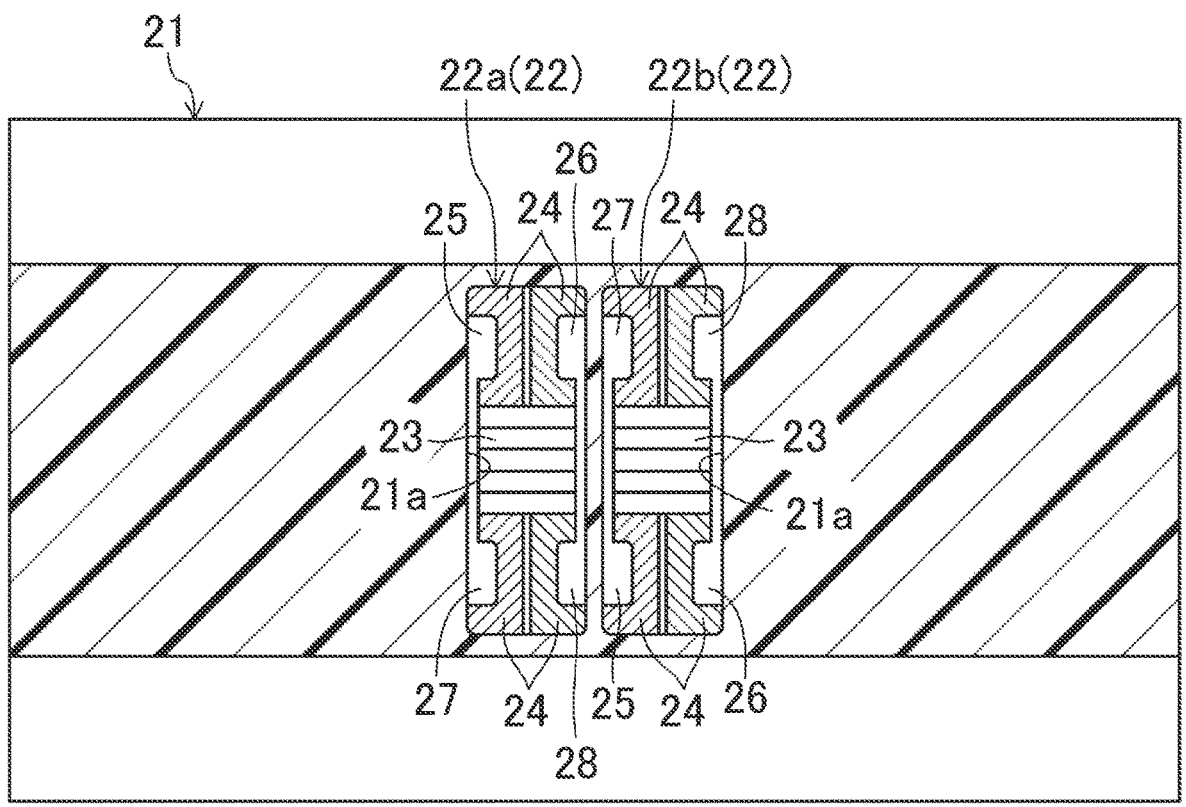
FIG. 3 is a sectional view taken along line III-III in FIG. 2.

Hereinafter, the two housing portions (22) according to the present embodiment may be referred to as a first housing portion (22a) and a second housing portion (22b) in this order from the left side to the right side in FIG. 3. The first housing portion (22a) constitutes a housing portion disposed on a most high-temperature side. The second housing portion (22b) constitutes a housing portion disposed on a most low-temperature side, Each of the plurality of housing portions (22) houses a plurality of magnetic working substances (23). In each housing portion (22), the plurality of magnetic working substances (23) are arranged in a direction in which the heat medium flows (an up-down direction in FIG. 3). The plurality of housing portions (22) extend in a predetermined direction (a direction orthogonal to the paper face of FIG. 3) and are arranged in a direction intersecting with the predetermined direction (a left-right direction in FIG. 3). In this example, the plurality of housing portions (22) are arranged in a direction orthogonal to the predetermined direction.

Each housing portion (22) includes a plurality of (in this example, four) flow path forming members (24). Each of the flow path forming members (24) extends in the same direction as the direction in which the housing portion (22) extends. Each of the flow path forming members (24) is made of a magnetic material (for example, iron).

Each two of the flow path forming members (24) make a pair, one pair being disposed above the magnetic working substances (23) and the other pair being disposed below the magnetic working substances (23). Each of the flow path forming members (24) has a substantially C-shaped cross section, and the flow path forming members (24) in each pair are disposed such that opening sides of the flow path forming members (24) face in opposite directions. Openings of the flow path forming members (24) form the plurality of flow paths (25 to 28) extending in the predetermined direction for allowing the heat medium to enter and exit the magnetic working substances (23). The flow paths (25 to 28) and the magnetic working substances (23) are arranged in a direction (an up-down direction in FIG. 3) intersecting with both of the direction in which the plurality of housing portions (22) are arranged and the predetermined direction. In this example, the flow paths (25 to 28) and the magnetic working substances (23) are arranged in a direction orthogonal to both of the direction in which the plurality of housing portions (22) are arranged and the predetermined direction.

The plurality of flow paths (25 to 28) are, specifically, a low-temperature-side inflow path (25), a low-temperature-side outflow path (26), a high-temperature-side inflow path (27), and a high-temperature-side outflow path (28). In a cross section of the magnetic refrigeration module (20), the low-temperature-side inflow path (25) and the high-temperature-side outflow path (28) are disposed in pair along one diagonal line of the housing portion (22). In a cross section of the magnetic refrigeration module (20), the high-temperature-side inflow path (27) and the low-temperature-side outflow path (26) are disposed in pair along the other diagonal line of the housing portion (22). The heat medium having flowed in from the low-temperature-side inflow path (25) flows through the magnetic working substances (23) and then flows out from the high-temperature-side outflow path (28). The heat medium having flowed in from the high-temperature-side inflow path (27) flows through the magnetic working substances (23) and then flows out from the low-temperature-side outflow path (26).

High-Temperature-Side Header Case

A high-temperature-side header (32) is housed in the high-temperature-side header case (31). The high-temperature-side header case (31) includes the high-temperature-end inflow port (71) and the high-temperature-end outflow port (72). The high-temperature-end inflow port (71) guides the heat medium having flowed from the high-temperature-side heat exchanger (120) into the magnetic refrigeration module (20) when the heat medium pump (130) performs the second operation. The high-temperature-end outflow port (72) guides the heat medium in the magnetic refrigeration module (20) to the high-temperature-side heat exchanger (120) when the heat medium pump (130) performs the first operation, As illustrated in FIG. 2, the high-temperature-side header (32) is disposed in contact with each housing portion (22) in the high-temperature-side header case (31). As illustrated in FIG. 2, the high-temperature-side header (32) includes the high-temperature-side header body (33), the first high-temperature-side packing (34), and the second high-temperature-side packing (35). The high-temperature-side header (32) constitutes a header structure.

High-Temperature-Side Header Body

The high-temperature-side header body (33) is formed in a slightly flat rectangular-parallelepiped shape. The high-temperature-side header body (33) is made of a nonmagnetic material (for example, resin) having a thermal conductivity of 10 W/m or less. The high-temperature-side header body (33) has a front surface (33a) in contact with the first high-temperature-side packing (34) and a back surface (33b) in contact with the second high-temperature-side packing (35). The high-temperature-side header body (33) has a high-temperature-side inflow hole (81) and a high-temperature-side outflow hole (82) that are formed to extend through the high-temperature-side header body (33) in a thickness direction (a left-right direction in FIG. 2). In the front surface (33a) of the high-temperature-side header body (33) (in other words, in a vicinity of a first surface inside the high-temperature-side header (32)), a high-temperature internal inflow groove (85), a high-temperature internal outflow groove (86), a first series connection groove (91), and a second series connection groove (92) are formed in a single layer structure.

The single layer structure is a structure in which a flow path (for example, each of grooves (85 to 88, 91 to 98)) through which the heat medium flows is formed in only one of a front surface (33a, 43a, 53a, 63a) and a back surface (33b, 43b, 53b, 63b) of each header body (33, 43, 53, 63), The high-temperature internal inflow groove (85) allows the high-temperature-side inflow hole (81) and a high-temperature-side inflow port (27a) of the first housing portion (22a) (specifically, an inlet of a high-temperature-side inflow path (27) of the first housing portion (22a)) with each other through the first high-temperature-side packing (34). The high-temperature internal inflow groove (85) has a substantially L-like shape in the front surface (33a) of the high-temperature-side header body (33). The high-temperature internal inflow groove (85) constitutes a high-temperature internal inflow path.

The high-temperature internal outflow groove (86) allows the high-temperature-side outflow hole (82) and a high-temperature-side outflow port (28a) of the first housing portion (22a) (specifically, an outlet of a high-temperature-side outflow path (28) of the first housing portion (22a)) to communicate with each other through the first high-temperature-side packing (34). The high-temperature internal outflow groove (86) has a substantially C-like shape open upward in the front surface (33a) of the high-temperature-side header body (33). The high-temperature internal outflow groove (86) constitutes a high-temperature internal outflow path.

The first series connection groove (91) allows a low-temperature-side outflow port (26a) of the first housing portion((22a) (specifically, an outlet of a low-temperature-side outflow path (26) of the first housing portion (22a)) and a high-temperature-side inflow port (27a) of the second housing portion (22b) (specifically, an inlet of a high-temperature-side inflow path (27) of the second housing portion (22b)) to communicate with each other by series connection through the first high-temperature-side packing (34). The first series connection groove (91) has a rectangular shape in the front surface (33a) of the high-temperature-side header body (33). The first series connection groove (91) constitutes a first series internal flow path.

The second series connection groove (92) allows a low-temperature-side inflow port (25a) of the first housing portion (22a) (specifically, an inlet of a low-temperature-side inflow path (25) of the first housing portion (22a)) and a high-temperature-side outflow port (28a) of the second housing portion (22b) (specifically, an outlet of a high-temperature-side outflow path (28) of the second housing portion (22b)) to communicate with each other by series connection through the first high-temperature-side packing (34). The second series connection groove (92) has a substantially C-like shape open downward in the front surface (33a) of the high-temperature-side header body (33). The second series connection move (92) constitutes a second series internal flow path.

First High-Temperature-Side Packing

The first high-temperature-side packing (34) is a rectangular plate-shaped resin member. The resin constituting the first high-temperature-side packing (34) is a nonmagnetic material having a thermal conductivity of 10 W/m or less. One side surface of the first high-temperature-side packing (34) is attached to the front surface (33*a*) of the high-temperature-side header body (33). Another side surface (34*a*) of the first high-temperature-side packing (34) is attached to each housing portion (22). As described above, the first high-temperature-side packing (34), more broadly, the high-temperature-side header (32) integrates the plurality of housing portions (22) into one body. The other side surface (34*a*) of the first high-temperature-side packing (34) constitutes a first surface of the high-temperature-side header (32) facing each housing portion (22).

First to sixth packing holes (H1 to H6) each having a vertically long rectangular shape are formed in the first high-temperature-side packing (34). The first to sixth packing holes (H1 to H6) extend through the first high-temperature-side packing (34) in the thickness direction.

The first packing hole (H1) allows the high-temperature-side outflow port (28*a*) of the second housing portion (22*b*) and the second series connection groove (92) of the high-temperature-side header body (33) to communicate with each other. The second packing hole (H2) allows the high-temperature-side inflow port (27*a*) of the second housing portion (22*b*) and the first series connection groove (91) of the high-temperature-side header body (33) to communicate with each other. The third packing hole (H3) allows the low-temperature-side outflow port (26*a*) of the first housing portion (22*a*) and the first series connection groove (91) of the high-temperature-side header body (33) to communicate with each other. The fourth packing hole (H4) allows the low-temperature-side inflow port (25*a*) of the first housing portion (22*a*) and the second series connection groove (92) of the high-temperature-side header body (33) to communicate with each other. The fifth packing hole (H5) allows the high-temperature-side outflow port (28*a*) of the first housing portion (22*a*) and the high-temperature internal outflow groove (86) of the high-temperature-side header body (33) to communicate with each other. The sixth packing hole (H6) allows the high-temperature-side inflow port (27*a*) of the first housing portion (22*a*) and the high-temperature internal inflow groove (85) of the high-temperature-side header body (33) to communicate with each other.

With such a configuration, the low-temperature-side outflow path (26) of the first housing portion (22*a*) and the high-temperature-side inflow path (27) of the second housing portion (22*b*) are connected to each other in series through the first series connection groove (91). The low-temperature-side inflow path (25) of the first housing portion (22*a*) and the high-temperature-side outflow path (28) of the second housing portion (22*b*) are connected to each other in series through the second series connection groove (92). In other words, the first housing portion (22*a*) and the second housing portion (22*b*) are connected to each other in series.

Second High-Temperature-Side Packing

The second high-temperature-side packing (35) is a rectangular plate-shaped resin member. The resin constituting the second high-temperature-side packing (35) is a nonmagnetic material having a thermal conductivity of 10 W/m or less. One side surface of the second high-temperature-side packing (35) is attached to the back surface (33*b*) of the high-temperature-side header body (33). Another side surface (35*a*) of the second high-temperature-side packing (35) constitutes a second surface on the back side of the first surface of the high-temperature-side header (32).

A high-temperature-side outflow packing hole (101) and a high-temperature-side inflow packing hole (102), each of which has a circular shape, are formed in the second high-temperature-side packing (35). The high-temperature-side outflow packing hole (101) and the high-temperature-side inflow packing hole (102) extend through the second high-temperature-side packing (35) in the thickness direction. The high-temperature-side outflow packing hole (101) allows the high-temperature-end outflow port (72) and the high-temperature-side outflow hole (82) of the high-temperature-side header body (33) to communicate with each other. The high-temperature-side inflow packing hole (102) allows the high-temperature-end inflow port (71) and the high-temperature-side inflow hole (81) of the high-temperature-side header body (33) to communicate with each other.

Low-Temperature-Side Header Case

A low-temperature-side header (42) is housed in the low-temperature-side header case (41). The low-temperature-side header case (41) includes the low-temperature-end inflow port (73) and the low-temperature-end outflow port (74). The low-temperature-end inflow port (73) guides the heat medium having flowed from the low-temperature-side heat exchanger (110) into the magnetic refrigeration module (20) when the heat medium pump (130) performs the first operation. The low-temperature-end outflow port (74) guides the heat medium in the magnetic refrigeration module (20) to the low-temperature-side heat exchanger (110) when the heat medium pump (130) performs the second operation.

Figure 2:
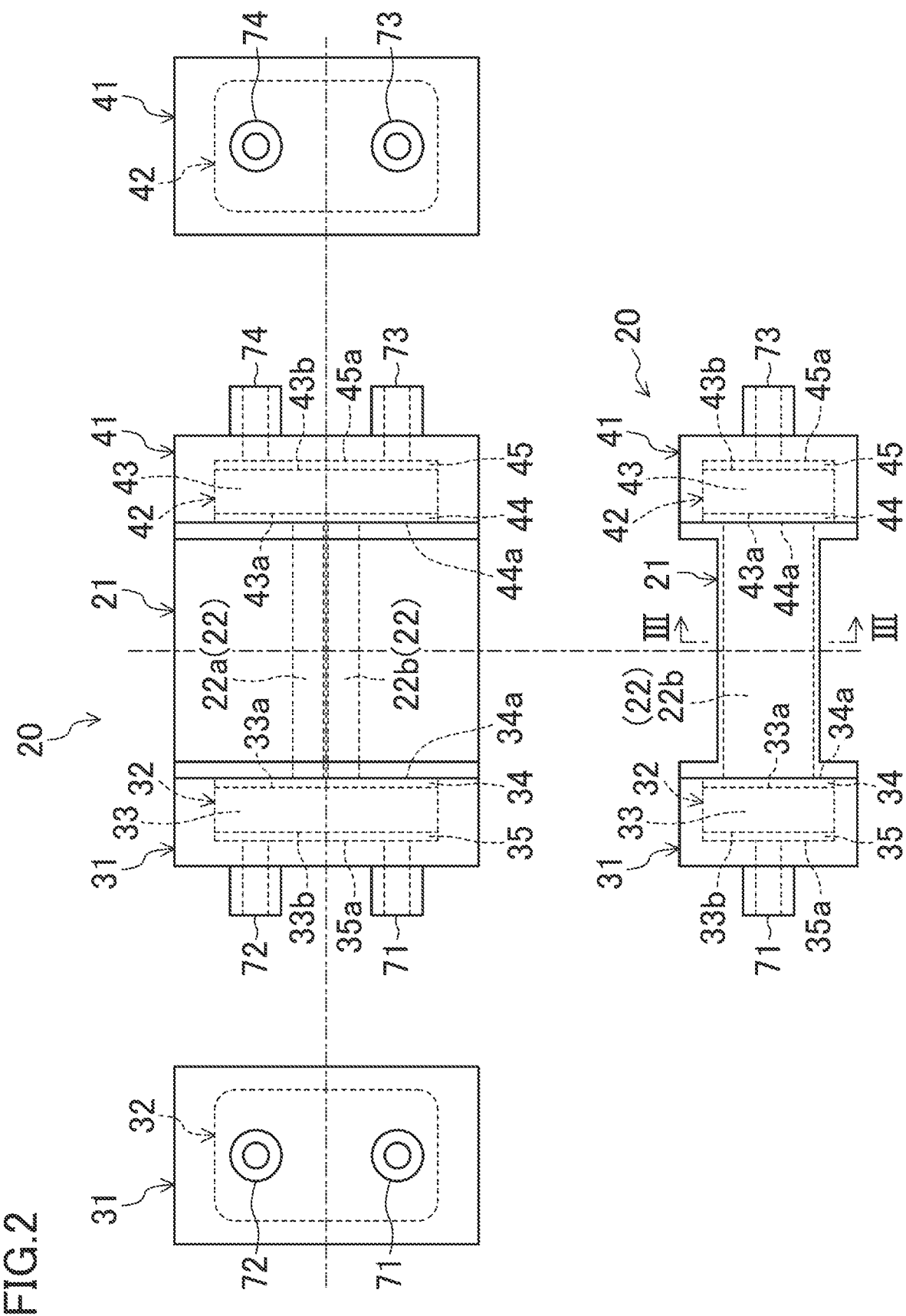
FIG. 2 is a four-side view illustrating a configuration of a magnetic refrigeration module according to Embodiment 1.

As illustrated in FIG. 2, the low-temperature-side header (42) is disposed in contact with each housing portion (22) in the low-temperature-side header case (41). As illustrated in FIG. 2, the low-temperature-side header (42) includes the low-temperature-side header body (43), the first low-temperature-side packing (44), and the second low-temperature-side packing (45). The low-temperature-side header (42) constitutes a header structure.

Low-Temperature-Side Header Body

The low-temperature-side header body (43) is formed in a slightly flat rectangular-parallelepiped shape. The low-temperature-side header body (43) is made of a nonmagnetic material (for example, resin) having a thermal conductivity of 10 W/m or less. The low-temperature-side header body (43) has a front surface (43*a*) in contact with the first low-temperature-side packing (44) and a back surface (43*b*) in contact with the second low-temperature-side packing (45). The low-temperature-side header body (43) has a low-temperature-side inflow hole (83) and a low-temperature-side outflow hole (84) that are formed to extend through the low-temperature-side header body (43) in a thickness direction (a left-right direction in FIG. 2). In the front surface (43*a*) of the low-temperature-side header body (43) (in other words, in a vicinity of a first surface inside the low-temperature-side header (42)), a low-temperature internal inflow groove (87) and a low-temperature internal outflow groove (88) are formed in a single layer structure.

The low-temperature internal inflow groove (87) allows the low-temperature-side inflow hole (83) and a low-temperature-side inflow port (25*a*) of the second housing portion (22*b*) (specifically, an inlet of a low-temperature-side inflow path (25) of the second housing portion (22*b*)) to communicate with each other through the first low-temperature-side packing (44). The low-temperature internal inflow groove (87) has a substantially C-like shape open upward in the front surface (43*a*) of the low-temperature-side header body (43). The low-temperature internal inflow groove (87) constitutes a low-temperature internal inflow path.

The low-temperature internal outflow groove (88) allows the low-temperature-side outflow hole (84) and a lowtemperature-side outflow port (26a) of the second housing portion (22b) (specifically, an outlet of a low-temperature-side outflow path (26) of the second housing portion (22b)) to communicate with each other through the first low-temperature-side packing (44). The low-temperature internal outflow groove (88) has a substantially L-like shape in the front surface (43a) of the low-temperature-side header body (43). The low-temperature internal outflow groove (88) constitutes a low-temperature internal outflow path, First Low-Temperature-Side Packing The first low-temperature-side packing (44) is a rectangular plate-shaped resin member. The resin constituting the first low-temperature-side packing (44) is a nonmagnetic material having a thermal conductivity of 10 W/m or less. One side surface of the first low-temperature-side packing (44) is attached to the front surface (43a) of the low-temperature-side header body (43), Another side surface (44a) of the first low-temperature-side packing (44) is attached to each housing portion (22). As described above, the first low-temperature-side packing (44), more broadly, the low-temperature-side header (42) integrates the plurality of housing portions (22) into one body. The other side surface (44a) of the first low-temperature-side packing (44) constitutes a first surface of the low-temperature-side header (42) facing each housing portion (22).

Seventh and eighth packing holes (H7, H8) each having a vertically long rectangular shape are formed in the first low-temperature-side packing (44). The seventh and eighth packing holes (H7, H8) extend through the first low-temperature-side packing (44) in the thickness direction. The seventh packing hole (H7) allows the low-temperature-side inflow port (25a) of the second housing portion (22b) and the low-temperature internal inflow groove (87) of the low-temperature-side header body (43) to communicate with each other. The eighth packing hole (H8) allows the low-temperature-side outflow port (26a) of the second housing portion (22b) and the low-temperature internal outflow groove (88) of the low-temperature-side header body (43) to communicate with each other.

Second Low-Temperature-Side Packing

The second low-temperature-side packing (45) is a rectangular plate-shaped resin member. The resin constituting the second low-temperature-side packing (45) is a nonmagnetic material having a thermal conductivity of 10 W/m or less. One side surface of the second low-temperature-side packing (45) is attached to the back surface (43b) of the low-temperature-side header body (43). Another side surface (45a) of the second low-temperature-side packing (45) constitutes a second surface on the back side of the first surface of the low-temperature-side header (42).

A low-temperature-side outflow packing hole (103) and a low-temperature-side inflow packing hole (104), each of which has a circular shape, are formed in the second low-temperature-side packing (45). The low-temperature-side outflow packing hole (103) and the low-temperature-side inflow packing hole (104) extend through the second low-temperature-side packing (45) in the thickness direction. The low-temperature-side outflow packing hole (103) allows the low-temperature-end outflow port (74) and the low-temperature-side outflow hole (84) of the low-temperature-side header body (43) to communicate with each other. The low-temperature-side inflow packing hole (104) allows the low-temperature-end inflow port (73) and the low-temperature-side inflow hole (83) of the low-temperature-side header body (43) to communicate with each other.

Operations

Operations of the air conditioning system (10) are described.

The air conditioning system (10) causes the heat medium pump (130) to alternately perform the first operation and the second operation, and applies and removes a magnetic field to and from each housing portion (22) of the magnetic refrigeration module (20) in accordance with both the operations, thereby supplying cooling energy to the utilization-side unit.

Specifically, first, a magnetic field is applied to each housing portion (22) of the magnetic refrigeration module (20) in a state in which the flow of the heat medium is stopped. Thus, the magnetic working substances (23) in each housing portion (22) generate heat. When the heat medium pump (130) performs the first operation in this state, the piston (134) moves to the left side in FIG. 1, and the heat medium is discharged from the first chamber (132). The heat medium discharged from the first chamber (132) passes through the second check valve (142) and flows into the housing portion (22) where the heat medium is heated through heat exchange with the magnetic working substances (23) in a heat generating state. The heated heat medium passes through the third check valve (143) and flows into the high-temperature-side heat exchanger (120) where heat is dissipated to the second refrigerant of the heat-source-side unit. The heat medium having flowed out of the high-temperature-side heat exchanger (120) is sucked into the second chamber (133) of the heat medium pump (130).

Next, the magnetic field is removed from each housing portion (22) of the magnetic refrigeration module (20) in the state in which the flow of the heat medium is stopped. Thus, the magnetic working substances (23) in each housing portion (22) absorb heat. When the heat medium pump (130) performs the second operation in this state, the piston (134) moves to the right side in FIG. 1, and the heat medium is discharged from the second chamber (133). The heat medium discharged from the second chamber (133) passes through the fourth check valve (144) and flows into the housing portion (22) where the heat medium is cooled through heat exchange with the magnetic working substances (23) in a heat absorbing state. The cooled heat medium passes through the first check valve (141) and flows into the low-temperature-side heat exchanger (110) where the heat medium cools the second refrigerant of the utilization-side unit. The heat medium having flowed out of the low-temperature-side heat exchanger (110) is sucked into the first chamber (132) of the heat medium pump (130).

By repeating the above-described operations, cooling energy can be supplied to the low-temperature-side heat exchanger (110) and heating energy can be supplied to the high-temperature-side heat exchanger (120), whereby the utilization-side unit can perform cooling in a target space. In a steady state, the low-temperature-side heat exchanger (110) and the high-temperature-side heat exchanger (120) are maintained at respective substantially constant temperatures corresponding to the magnetic working substances (23) in the housing portions 22). In the present embodiment, the magnetic working substances (23) are selected such that the temperature of the low-temperature-side heat exchanger (110) is maintained at a temperature lower than the temperature of the target space or the temperature of air around the housing portions (22).

Flow of Heat Medium in Magnetic Refrigeration Module

A description is given of a flow of the heat medium in the magnetic refrigeration module (20) when the air conditioning system (10) is operated, more specifically, when the heat medium pump (130) performs the first operation or the second operation.

As illustrated in FIGS. 5A to 5K, when the heat medium pump (130) performs the first operation, the heat medium flows from the low-temperature side to the high-temperature side in the magnetic refrigeration module (20). Specifically, in the magnetic refrigeration module (20), the heat medium having flowed in from the low-temperature-end inflow port (73) flows into the low-temperature-side inflow hole (83) of the low-temperature-side header body (43). The heat medium having flowed out of the low-temperature-side inflow hole (83) of the low-temperature-side header body (43) flows into the low-temperature-side inflow path (25) of the second housing portion (22b) through the low-temperature internal inflow groove (87) of the low-temperature-side header body (43). The heat medium having flowed out of the low-temperature-side inflow path (25) of the second housing portion (22b) flows through the magnetic working substances (23) in the second housing portion (22b) and then flows into the high-temperature-side outflow path (28) of the second housing portion (22b).

The heat medium having flowed out of the high-temperature-side outflow path (28) of the second housing portion (22b) flows into the low-temperature-side inflow path (25) of the first housing portion((22a) through the second series connection groove (92) of the high-temperature-side header body (33). The heat medium having flowed out of the low-temperature-side inflow path (25) of the first housing portion (22a) flows through the magnetic working substances (23) in the first housing portion (22a) and then flows into the high-temperature-side outflow path (28) of the first housing portion (22a). The heat medium to having flowed out of the high-temperature-side outflow path (28) of the first housing portion (22a) flows into the high-temperature-side outflow hole (82) of the high-temperature-side header body (33) through the high-temperature internal outflow groove (86) of the high-temperature-side header body (33). The heat medium having flowed out of the high-temperature-side outflow hole (82) of the high-temperature-side header body (33) flows to the outside of the magnetic refrigeration module (20) through the high-temperature-end outflow port (72).

As illustrated in FIGS. 6A to 6K, when the heat medium pump (130) performs the second operation, the heat medium flows from the high-temperature side to the low-temperature side in the magnetic refrigeration module (20). Specifically, in the magnetic refrigeration module (20), the heat medium having flowed in from the high-temperature-end inflow port (71) flows into the high-temperature-side inflow hole (81) of the high-temperature-side header body (33). The heat medium having flowed out of the high-temperature-side inflow hole (81) of the high-temperature-side header body (33) flows into the high-temperature-side inflow path (27) of the first housing portion (22a) through the high-temperature internal inflow groove (85) of the high-temperature-side header body (33). The heat medium having flowed out of the high-temperature-side inflow path (27) of the first housing portion (22a) flows through the magnetic working substances (23) in the first housing portion (22a) and then flows into the low-temperature-side outflow path (26) of the first housing portion (22a).

The heat medium having flowed out of the low-temperature-side outflow path (26) of the first housing portion (22a) flows into the high-temperature-side inflow path (27) of the second housing portion (22b) through the first series connection groove (91) of the high-temperature-side header body (33). The heat medium having flowed out of the high-temperature-side inflow path (27) of the second housing portion (22b) flows through the magnetic working substances (23) in the second housing portion (22b) and then flows into the low-temperature-side outflow path (26) of the second housing portion (22b). The heat medium having flowed out of the low-temperature-side outflow path (26) of the second housing portion (22b) flows into the low-temperature-side outflow hole (84) of the low-temperature-side header body (43) through the low-temperature internal outflow groove (88) of the low-temperature-side header body (43). The heat medium having flowed out of the low-temperature-side outflow hole (84) of the low-temperature-side header body (43) flows to the outside of the magnetic refrigeration module (20) through the low-temperature-end outflow port (74).

Advantageous Effects of Embodiment 1

A magnetic refrigeration module (20) according to the present embodiment includes a plurality of housing portions (22) each housing a magnetic working substance (23), and at least some of the plurality of housing portions (22) are connected to each other in series. With this configuration, a heat medium supplied to the magnetic refrigeration module (20) sequentially flows through the plurality of housing portions (22) connected to each other in series. Such a new type of magnetic refrigeration module (20) can be provided.

In the magnetic refrigeration module (20) according to the present embodiment, the plurality of housing portions (22) extend in a predetermined direction and are arranged in a direction intersecting with the predetermined direction (in this example, a direction orthogonal to the predetermined direction). With this configuration, the plurality of housing portions (22) spread in both of the predetermined direction and the direction intersecting with the predetermined direction as a whole, Thus, a magnetic field can be easily applied to the magnetic working substance (23).

In the magnetic refrigeration module (20) according to the present embodiment, each of the housing portions (22) includes flow paths (25 to 28) extending in the predetermined direction for allowing the heat medium to enter and exit the magnetic working substance (23); and the flow paths (25 to 28) and the magnetic working substance (23) are arranged in a direction intersecting with both of the direction in which the plurality of housing portions (22) are arranged and the predetermined direction. With this configuration, the plurality of housing portions (22) can be arranged close to each other. Thus, a magnetic field can be more easily applied to the plurality of housing portions (22).

In the magnetic refrigeration module (20) according to the present embodiment, each of the housing portions (22) has a low-temperature-side inflow port (25a), a low-temperature-side outflow port (26a), a high-temperature-side inflow port (27a), and a high-temperature-side outflow port (28a); and in each of the housing portions (22), the heat medium flows from the low-temperature-side inflow port (25a) to the high-temperature-side outflow port (28a) through the magnetic working substance (23), or the heat medium flows from the high-temperature-side inflow port (27a) to the low-temperature-side outflow port (26a) through the magnetic working substance (23). With this configuration, in each housing portion (22), heating energy or cooling energy can be generated by the magnetic refrigeration module (20) by combining two circulation paths for the heat medium and application and removal of a magnetic field to and from the magnetic working substance (23).

In the magnetic refrigeration module (20) according to the present embodiment, the low-temperature-side inflow port (25*a*) and the low-temperature-side outflow port (26*a*) of each of the housing portions (22) disposed on a most low-temperature side, and the high-temperature-side inflow port (27*a*) and the high-temperature-side outflow port (28*a*) of each of the housing portions (22) disposed on a most high-temperature side are disposed on sides opposite to each other in the magnetic refrigeration module (20). With this configuration, it is possible to suppress occurrence of unnecessary heat transport between the heat medium flowing through the low-temperature-side inflow port (25*a*) or the low-temperature-side outflow port (26*a*), and the heat medium flowing through the high-temperature-side inflow port (27*a*) or the high-temperature-side outflow port (28*a*).

The magnetic refrigeration module (20) according to the present embodiment includes a low-temperature-end inflow port (73) communicating with the low-temperature-side inflow port (25*a*) of each of the housing portions (22) disposed on the most low-temperature side; a low-temperature-end outflow port (74) communicating with the low-temperature-side outflow port (26*a*) of each of the housing portion (22) disposed on the most low-temperature side; a high-temperature-end inflow port (71) communicating with the high-temperature-side inflow port (27*a*) of each of the housing portions (22) disposed on the most high-temperature side; and a high-temperature-end outflow port (72) communicating with the high-temperature-side outflow port (28*a*) of each of the housing portions (22) disposed on the most high-temperature side. With this configuration, the heat medium flows in from the low-temperature-end inflow port (73), passes through the low-temperature-side inflow port (25*a*), exchanges heat with the magnetic working substances (23) in the plurality of housing portions (22), passes through the high-temperature-side outflow port (28*a*), and flows out from the high-temperature-end outflow port (72). Otherwise, the heat medium flows in from the high-temperature-end inflow port (71), passes through the high-temperature-side inflow port (27*a*), exchanges heat with the magnetic working substances (23) in the plurality of housing portions (22), passes through the low-temperature-side outflow port (26*a*), and flows out from the low-temperature-end outflow port (74).

The magnetic refrigeration module (20) according to the present embodiment includes a header structure (32, 42, 52, 62) having a low-temperature internal inflow path (87), a low-temperature internal outflow path (88), a high-temperature internal inflow path (85), and a high-temperature internal outflow path (86); the low-temperature internal inflow path (87) allows the low-temperature-side inflow port (25*a*) of each of the housing portions (22) disposed on the most low-temperature side and the low-temperature-end inflow port (73) to communicate with each other; the low-temperature internal outflow path (88) allows the low-temperature-side outflow port (26*a*) of each of the housing portions (22) disposed on the most low-temperature side and the low-temperature-end outflow port (74) to communicate with each other; the high-temperature internal inflow path (85) allows the high-temperature-side inflow port (27*a*) of each of the housing portions (22) disposed on the most high-temperature side and the high-temperature-end inflow port (71) to communicate with each other; and the high-temperature internal outflow path (86) allows the high-temperature-side outflow port (28*a*) of each of the housing portions (22) disposed on the most high-temperature side and the high-temperature-end outflow port (72) to communicate with each other. With this configuration, the heat medium flows in from the low-temperature-end inflow port (73), passes through the low-temperature internal inflow path (87) and the low-temperature-side inflow port (25*a*), exchanges heat with the magnetic working substances (23) in the plurality of housing portions (22), passes through the high-temperature-side outflow port (28*a*) and the high-temperature internal outflow path (86), and flows out from the high-temperature-end outflow port (72). Otherwise, the heat medium flows in from the to high-temperature-end inflow port (71), passes through the high-temperature internal inflow path (85) and the high-temperature-side inflow port (27*a*), exchanges heat with the magnetic working substances (23) in the plurality of housing portions (22), passes through the low-temperature-side outflow port (26*a*) and the low-temperature internal outflow path (88), and flows out from the low-temperature-end outflow port (74), In the magnetic refrigeration module (20) according to the present embodiment, the header structure (32, 42, 52, 62) further has a first series internal flow path (91, 93, 95, 97) and a second series internal flow path (92, 94, 96, 98); the first series internal flow path (91, 93, 95, 97) connects the low-temperature-side outflow port (26*a*) of the housing portion (22) and the high-temperature-side inflow port (27*a*) of another one of the housing portions (22) to each other in series to allow the high-temperature-end inflow port (71) and the low-temperature-end outflow port (74) to communicate with each other through the plurality of housing portions (22); and the second series internal flow path (92, 94, 96, 98) connects the high-temperature-side outflow port (28*a*) of the housing portion (22) and the low-temperature-side inflow port (25*a*) of the other one of the housing portion (22) to each other in series to allow the low-temperature-end inflow port (73) and the high-temperature-end outflow port (72) to communicate with each other through the plurality of housing portions (22). With this configuration, the first series internal flow path (91, 93, 95, 97) and the second series internal flow path (92, 94, 96, 98) enable series connection between the plurality of housing portions (22). The heat medium flows in from the low-temperature-end inflow port (73), sequentially flows through the plurality of housing portions (22), and flows out from the high-temperature-end outflow port (72). Otherwise, the heat medium flows in from the high-temperature-end inflow port (71), sequentially flows through the plurality of housing portions (22), and then flows out from the low-temperature-end outflow port (74).

In the magnetic refrigeration module (20) according to the present embodiment, the header structure (32, 42, 52, 62) includes a low-temperature-side header (42) having the low-temperature internal inflow path (87) and the low-temperature internal outflow path (88), and a high-temperature-side header (32) having the high-temperature internal inflow path (85) and the high-temperature internal outflow path (86). With this configuration, the heat medium flows from the low-temperature-side header (42) through the plurality of housing portions (22) to the high-temperature-side header (32), or flows in the opposite direction.

In the magnetic refrigeration module (20) according to the present embodiment, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) are constituted by a single layer structure provided at the low-temperature-side header (42) or the high-temperature-side header (32). With this configuration, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) are constituted by the single layer structure, and thus each header (32, 42, 52, 62) can be easily manufactured.

In the magnetic refrigeration module (20) according to the present embodiment, the header structure (32, 42, 52, 62) includes the low-temperature-side header (42) and the high-temperature-side header (32); the low-temperature internal inflow path (87) and the low-temperature internal outflow path (88) are constituted by a single layer structure provided at the low-temperature-side header (42); and the high-temperature internal inflow path (85) and the high-temperature internal outflow path (86) are constituted by a single layer structure provided at the high-temperature-side header (32). With this configuration, the heat medium flows from the low-temperature-side header (42) through the plurality of housing portions (22) to the high-temperature-side header (32), or flows in the opposite direction. When the low-temperature internal inflow path (87) and the low-temperature internal outflow path (88), or the high-temperature internal inflow path (85) and the high-temperature internal outflow path (86) are constituted by the single layer structure, the low-temperature-side header (42) or the high-temperature-side header (32) can be easily manufactured.

In the magnetic refrigeration module (20) according to the present embodiment, each of the low-temperature-side header (42) and the high-temperature-side header (32) has a first surface (34a, 44a) facing the housing portion (22) and a second surface (35a, 45a) on a back side of the first surface (34a, 44a); the low-temperature internal inflow path (87) and the low-temperature internal outflow path (88) that have the single layer structure are constituted y grooves (87, 88) formed in a vicinity of the first surface (44a) inside the low-temperature-side header (42); and the high-temperature internal inflow path (85) and the high-temperature internal outflow path (86) that have the single layer structure are constituted by grooves (85, 86) formed in a vicinity of the first surface (34a) inside the high-temperature-side header (32). With this configuration, the low-temperature internal inflow path (87), the low-temperature internal outflow path (88), the high-temperature internal inflow path (85), and the high-temperature internal outflow path (86) that have the single layer structure can be attained by a simple structure of the grooves (85 to 88) formed inside the low-temperature-side header (42) or the high-temperature-side header (32).

In the magnetic refrigeration module (20) according to the present embodiment, the plurality of housing portions (22) are integrated with each other by the header structure (32, 42, 52, 62). With this configuration, the header structure (32, 42, 52, 62) and the plurality of housing portions (22) integrated with each other by the header structure (32, 42, 52, 62) can be handled as one unit. Furthermore, since no structure such as a pipe through which the heat medium flows is present between the plurality of housing portions (22) and the header structure (32, 42, 52, 62), a pressure loss in the magnetic refrigeration module (20) can be suppressed.

In the magnetic refrigeration module (20) according to the present embodiment, at least part of the header structure (32, 42, 52, 62) is made of a material having a thermal conductivity of 10 W/mK or less. With this configuration, since the thermal conductivity of the header structure (32, 42, 52, 62)) is low, unnecessary heat transport between the magnetic refrigeration module (20) and the outside thereof through the header structure (32, 42, 52, 62) can be suppressed.

In the magnetic refrigeration module (20) according to the present embodiment, at least part of the header structure (32, 42, 52, 62) is made of a nonmagnetic material. With this configuration, since a magnetic flux is unlikely to flow through the header structure (32, 42, 52, 62), a magnetic field can be efficiently applied to the plurality of housing portions (22).

Improvement of Embodiment 1

Backflow Prevention Portion

In the magnetic refrigeration module (20) according to Embodiment 1 illustrated in FIGS. 4A to 4K and so forth, flow paths for connecting the housing portions (22) to each other in series are separated into a forward path and a return path, but in practice, the heat medium can flow in both directions. Thus, performance deteriorates due to the flow paths becoming a dead volume.

Figure 31:
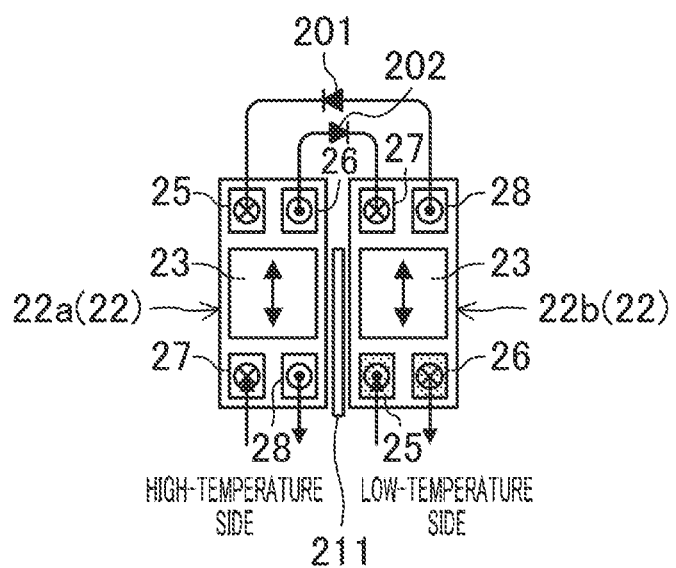
FIG. 31 is a diagram illustrating a state in which a backflow prevention portion and a heat insulating layer are further provided in the magnetic refrigeration module illustrated in FIGS. 4A to 4K.

Hence, as illustrated in FIG. 31, backflow prevention portions (201, 202) constituted by, for example, check valves may be provided in series connection portions (two portions) where the housing portions (22) are connected in series. In FIG. 31, the same components as those of Embodiment 1 illustrated in FIGS. 4A to 4K are denoted by the same reference numerals.

Specifically, a first backflow prevention portion (201) may be disposed in a portion where the low-temperature-side inflow port (25a) (the inlet of the low-temperature-side inflow path (25)) of the first housing portion (22a) and the high-temperature-side outflow port (28a) (the outlet of the high-temperature-side outflow path (28)) of the second housing portion (22b) are connected in series. A second backflow prevention portion (202) may be disposed in a portion where the low-temperature-side outflow port (26a) (the outlet of the low-temperature-side outflow path (26)) of the first housing portion (22a) and the high-temperature-side inflow port (27a) (the inlet of the high-temperature-side inflow path (27)) of the second housing portion (22b) are connected in series.

Thus, the directions in which the heat medium flows in the flow paths (25 to 28) of each housing portion (22) can be determined, thereby suppressing a deterioration in performance due to the flow paths (25 to 28) becoming a dead volume.

Although, in the configuration illustrated in FIG. 31, the backflow prevention portions (201, 202) are provided in all series connection portions where the housing portions (22) are connected in series, only one of the first backflow prevention portion (201) and the second backflow prevention portion (202) may be provided instead. Also in this case, it is possible to suppress a deterioration in performance due to the dead volume as compared with a case where the backflow prevention portion (201, 202) is not provided.

In the configuration illustrated in FIG. 31, the first backflow prevention portion (201) may be connected to at least one of the low-temperature-side inflow port (25a) (the inlet of the low-temperature-side inflow path (25)) of the first housing portion (22a) and the high-temperature-side outflow port (28a) (the outlet of the high-temperature-side outflow path (28)) of the second housing portion (22b). The second backflow prevention portion (202) may be connected to at least one of the low-temperature-side outflow port (26a) (the outlet of the low-temperature-side outflow path (26)) of the first housing portion (22a) and the high-temperature-side inflow port (27a) (the inlet of the high-temperature-side inflow path (27)) of the second housing portion (22b). In this way, for example, as illustrated in FIGS. 32 and 33A to 33C, the backflow prevention portion (201, 202) can be installed inside the header structure (32, 42) at a position located upstream of the structure for series connection (the high-temperature-side header body (33) according to Embodiment 1 illustrated in FIG. 2).

FIG. 32 is a four-side view illustrating an example of a configuration of the magnetic refrigeration module (20) provided with the backflow prevention portions (201, 202) illustrated in FIG. 31. In FIG. 32, the same components as those of Embodiment 1 illustrated in FIG. 2 are denoted by the same reference numerals.

The configuration illustrated in FIG. 32 is different from the configuration illustrated in FIG. 2 in that, in the high-temperature-side header (32), a backflow prevention structure (36) is further provided between the high-temperature-side header body (33) and the first high-temperature-side packing (34). A third high-temperature-side packing (37) is further provided between the high-temperature-side header body (33) and the backflow prevention structure (36).

FIGS. 33A to 33C are diagrams illustrating an example of a header structure (specifically, the newly added backflow prevention structure (36) and third high-temperature-side packing (37)) of the magnetic refrigeration module (20) illustrated in FIG. 32. For example, FIG. 33A is a view of the backflow prevention structure (36) seen from the right side (a side of the first high-temperature-side packing (34)) in FIG. 32, FIG. 33B is a view of the backflow prevention structure (36) seen from the near side in the direction orthogonal to the sheet of FIG. 32, and FIG. 33C is a view of the third high-temperature-side packing (37) seen from the right side (the side of the first high-temperature-side packing (34)) in FIG. 32.

Backflow Prevention Structure

The backflow prevention structure (36) has a slightly flat rectangular-parallelepiped shape. The backflow prevention structure (36) is made of a nonmagnetic material (for example, resin) having a thermal conductivity of 10 W/m or less. The backflow prevention structure (36) has a front surface (36a) in contact with the first high-temperature-side packing (34) and a back surface in contact with the third high-temperature-side packing (37). The backflow prevention structure (36) has the first backflow prevention portion (first check valve) (201) and the second backflow prevention portion (second check valve) (202) formed so as to communicate with the first packing hole (H1) and the third packing hole (H3) of the first high-temperature-side packing (34), respectively. The backflow prevention structure (36) has first to fourth connection holes (221 to 224) formed so as to communicate with the second, and fourth to sixth packing holes (H2, H4 to H6) of the first high-temperature-side packing (34), respectively. The backflow prevention portions (201, 202) and, the connection holes (221 to 224) extend through the backflow prevention structure (36) in a thickness direction (a left-right direction in FIG. 32).

Third High-Temperature-Side Packing

The third high-temperature-side packing (37) is a rectangular plate-shaped resin member. The resin constituting the third high-temperature-side packing (37) is a nonmagnetic material having a thermal conductivity of 10 W/m or less. One side surface of the third high-temperature-side packing (37) is attached to the front surface (33a) of the high-temperature-side header body (33). Another side surface (37a) of the third high-temperature-side packing (37) is attached to the backflow prevention structure (36).

Like the first high-temperature-side packing (34) (see FIG. 4C), the third high-temperature-side packing (37) has first to sixth packing holes (H1 to H6) each having a vertically long rectangular shape. The first to sixth packing holes (H1 to H6) extend through the third high-temperature-side packing (37) in the thickness direction.

The first packing hole (H1) allows the first backflow prevention portion (201) of the backflow prevention structure (36) and the second series connection groove (92) of the high-temperature-side header body (33) (see FIG. 4D to FIG. 4F) to communicate with each other. The second packing hole (H2) allows the first connection hole (221) of the backflow prevention structure (36) and the first series connection groove (91) of the high-temperature-side header body (33) to communicate with each other. The third packing hole (H3) allows the second backflow prevention portion (second check valve) (202) of the backflow prevention structure (36) and the first series connection groove (91) of the high-temperature-side header body (33) to communicate with each other. The fourth packing hole (H4) allows the second connection hole (222) of the backflow prevention structure (36) and the second series connection groove (92) of the high-temperature-side header body (33) to communicate with each other. The fifth packing hole (H5) allows the third connection hole (223) of the backflow prevention structure (36) and the high-temperature internal outflow groove (86) of the high-temperature-side header body (33) to communicate with each other. The sixth packing hole (H6) allows the fourth connection hole (224) of the backflow prevention structure (36) and the high-temperature internal inflow groove (85) of the high-temperature-side header body (33) to communicate with each other.

In the above configuration, the first packing hole (H1) of each of the first high-temperature-side packing (34) and the third high-temperature-side packing (37), and the first backflow prevention portion (201) of the backflow prevention structure (36) communicate with the high-temperature-side outflow port (28a) of the second housing portion (22b). The second packing hole (H2) of each of the first high-temperature-side packing (34) and the third high-temperature-side packing (37), and the first connection hole (221) of the backflow prevention structure (36) communicate with the high-temperature-side inflow port (27a) of the second housing portion (22b). The third packing hole (H3) of each of the first high-temperature-side packing (34) and the third high-temperature-side packing (37), and the second backflow prevention portion (202) of the backflow prevention structure (36) communicate with the low-temperature-side outflow port (26a) of the first housing portion (22a). The fourth packing hole (H4) of each of the first high-temperature-side packing (34) and the third high-temperature-side packing (37), and the second connection hole (222) of the backflow prevention structure (36) communicate with the low-temperature-side inflow port (25a) of the first housing portion (22a). The fifth packing hole (H5) of each of the first high-temperature-side packing (34) and the third high-temperature-side packing (37), and the third connection hole (223) of the backflow prevention structure (36) communicate with the high-temperature-side outflow port (28a) of the first housing portion (22a). The sixth packing hole (H6) of each of the first high-temperature-side packing (34) and the third high-temperature-side packing (37), and the fourth connection hole (224) of the backflow prevention structure (36) communicate with the high-temperature-side inflow port (27a) of the first housing portion (22a).

Accordingly, in a structure in which the low-temperature-side outflow path (26) of the first housing portion (22a) and the high-temperature-side inflow path (27) of the second housing portion (22b) are connected to each other in series through the first series connection groove (91), the second backflow prevention portion (202) is connected to the low-temperature-side outflow port (26a) of the first housing portion (22a). In a structure in which the low-temperature-side inflow path (25) of the first housing portion (22a) and the high-temperature-side outflow path (28) of the second housing portion (22b) are connected to each other in series through the second series connection groove (92), the first backflow prevention portion (201) is connected to the high-temperature-side outflow port (28a) of the second housing portion (22b), Accordingly, the backflow prevention portion (201, 202) can be installed inside the header structure (32, 42) at a position located upstream of the high-temperature-side header body (33).

Heat Insulating Layer

In the magnetic refrigeration module (20) according to the present embodiment illustrated in FIG. 4 and so forth, when the housing portions (22) or the flow paths (25 to 28) having different temperatures are adjacent to each other, a heat leakage occurs and performance deteriorates.

Hence, as illustrated in FIG. 31, a heat insulating layer (first heat insulating layer) (211) may be provided between the housing portions (22) connected in series. The heat insulating layer (211) may be constituted by a heat insulator, a slit, or the like. Part of the housing portions (22) may be constituted by a heat insulating member serving as the heat insulating layer (211). The heat insulating layer (211) may be provided entirely between the housing portions (22) connected in series or may be provided partly between the housing portions (22) connected in series. In the configuration illustrated in FIG. 31, the heat insulating layer (211) is provided between the magnetic working substances (23) in the first housing portion (22a) and the magnetic working substances (23) in the second housing portion (22b) through which the heat medium flows at different temperatures, and between the high-temperature-side outflow path (28) of the first housing portion (22a) and the low-temperature-side inflow path (25) of the second housing portion (221) through which the heat medium flows at different temperatures.

Accordingly, a deterioration in performance due to a heat leakage can be suppressed even when the housing portions (22) (magnetic working substances (23)) or the flow paths (25 to 28) having different temperatures are adjacent to each other. In other words, a deterioration in performance due to a heat leakage between the housing portions (22) through which the heat medium flows at different temperatures can be suppressed.

Modification of Embodiment 1

A modification of Embodiment 1 will be described. A magnetic refrigeration module (20) according to the present modification is different from that of Embodiment 1 described above in that the magnetic refrigeration module (20) includes a common header (52) and a connection header (62). Differences from Embodiment 1 will be mainly described below.

As illustrated in FIGS. 7 to 10I, the magnetic refrigeration module (20) includes a housing portion case (21), a common header case (51), and a connection header case (61), each of which has a rectangular-parallelepiped shape. The common header case (51) is integrally attached to one side surface (a left side surface in FIG. 7) of the housing portion case (21). The connection header case (61) is integrally attached to another side surface (a right side surface in FIG. 7) of the housing portion case (21).

Common Header Case

The common header case (51) houses the common header (52). The common header case (51) includes a high-temperature-end inflow port (71), a high-temperature-end outflow port (72), a low-temperature-end inflow port (73), and a low-temperature-end outflow port (74).

As illustrated in FIG. 7, the common header (52) is disposed in contact with each housing portion (22) in the common header case (51). As illustrated in FIG. 7, the common header (52) includes a common header body (53), a first common packing (54), and a second common packing (55). The common header (52) constitutes a header structure.

Common Header Body

The common header body (53) is formed in a slightly flat rectangular-parallelepiped shape. The common header body (53) is made of a nonmagnetic material (for example, resin) having a thermal conductivity of 10 W/m or less. The common header body (53) has a front surface (53a) in contact with the first common packing (54) and a back surface (53b) in contact with the second common packing (55). The common header body (53) has a high-temperature-side inflow hole (81), a high-temperature-side outflow hole (82), a low-temperature-side inflow hole (83), and a low-temperature-side outflow hole (84) that are formed to extend through the common header body (53) in a thickness direction (a left-right direction in FIG. 7). In the front surface (53a) of the common header body (53) (in other words, in a vicinity of a first surface inside the common header (52)), a high-temperature internal inflow groove (85), a high-temperature internal outflow groove (86), a low-temperature temperature internal inflow groove (87), and a low-temperature internal outflow groove (88) are formed in a single layer structure.

The high-temperature internal inflow groove (85) allows the high-temperature-side inflow hole (81) and a high-temperature-side inflow port (27a) of a first housing portion (22a) (specifically, an inlet of a high-temperature-side inflow path (27) of the first housing portion (22a)) to communicate with each other through the first common packing (54). The high-temperature internal inflow groove (85) has a substantially L-like shape in the front surface (53a) of the common header body (53). The high-temperature internal inflow groove (85) constitutes a high-temperature internal inflow path.

The high-temperature internal outflow groove (86) allows the high-temperature-side outflow hole (82) and a high-temperature-side outflow port (28a) of the first housing portion (22a) (specifically, an outlet of a high-temperature-side outflow path (28) of the first housing portion (22a)) to communicate with each other through the first common packing (54). The high-temperature internal outflow groove (86) has a substantially L-like shape in the front surface (53a) of the common header body (53). The high-temperature internal outflow groove (86) constitutes a high-temperature internal outflow path.

The low-temperature internal inflow groove (87) allows the low-temperature-side inflow hole (83) and a low-temperature-side inflow port (25a) of a second housing portion (22b) (specifically, an inlet of a low-temperature-side inflow path (25) of the second housing portion (22b)) to communicate with each other through the first common packing (54). The low-temperature internal inflow groove (87) has a substantially L-like shape in the front surface (53a) of the common header body (53). The low-temperature internal inflow groove (87) constitutes a low-temperature internal inflow path.

The low-temperature internal outflow groove (88) allows the low-temperature-side outflow hole (84) and a low-temperature-side outflow port (26a) of the second housing portion (22b) (specifically, an outlet of a low-temperature-side outflow path (26) of the second housing portion (22b)) to communicate with each other through the first common packing (54). The low-temperature internal outflow groove (88) has a substantially L-like shape in the front surface (53a) of the common header body (53). The low-temperature internal outflow groove (88) constitutes a low-temperature internal outflow path.

First Common Packing

The first common packing (54) is a rectangular plate-shaped resin member. The resin constituting the first common packing (54) is a nonmagnetic material having a thermal conductivity of 10 W/m or less. One side surface of the first common packing (54) is attached to the front surface (53a) of the common header body (53). Another side surface (54a) of the first common packing (54) is attached to each housing portion (22). As described above, the first common packing (54), more broadly, the common header (52) integrates the plurality of housing portions (22) with each other. The other side surface (54a) of the first common packing (54) constitutes a first surface of the common header (52) facing each housing portion (22).

First to fourth packing holes (H1 to H4) each having a vertically long rectangular shape are formed in the first common packing (54). The first to fourth packing holes (H1 to H4) extend through the first common packing (54) in the thickness direction. The first packing hole (H1) allows the low-temperature-side outflow port (26a) of the second housing portion (22b) and the low-temperature internal outflow groove (88) of the common header body (53) to communicate with each other. The second packing hole (H2) allows the low-temperature-side inflow port (25a) of the second housing portion (22b) and the low-temperature internal inflow groove (87) of the common header body (53) to communicate with each other. The third packing hole (H3) allows the high-temperature-side outflow port (28a) of the first housing portion (22a) and the high-temperature internal outflow groove (86) of the common header body (53) to communicate with each other. The fourth packing hole (H4) allows the high-temperature-side inflow port (27a) of the first housing portion (22a) and the high-temperature internal inflow groove (85) of the common header body (53) to communicate with each other.

Second Common Packing

The second common packing (55) is a rectangular plate-shaped resin member. The resin constituting the second common packing (55) is a nonmagnetic material having a thermal conductivity of 10 W/m or less. One side surface of the second common packing (55) is attached to the back surface (53b) of the common header body (53). Another side surface (55a) of the second common packing (55) constitutes a second surface on the back side of the first surface of the common header (52).

A high-temperature-side outflow packing hole (101), a high-temperature-side inflow packing hole (102), a low-temperature-side outflow packing hole (103), and a low-temperature-side inflow packing hole (104), each of which has a circular shape, are formed in the second common packing (55). The high-temperature-side outflow packing hole (101), the high-temperature-side inflow packing hole (102), the low-temperature-side outflow packing hole (103), and the low-temperature-side inflow packing hole (104) extend through the second common packing (55) in the thickness direction. The high-temperature-side outflow packing hole (101) allows the high-temperature-end outflow port (72) and the high-temperature-side outflow hole (82) of the common header body (53) to communicate with each other. The high-temperature-side inflow packing hole (102) allows the high-temperature-end inflow port (71) and the high-temperature-side inflow hole (81) of the common header body (53) to communicate with each other. The low-temperature-side outflow packing hole (103) allows the low-temperature-end outflow port (74) and the low-temperature-side outflow hole (84) of the common header body (53) to communicate with each other. The low-temperature-side inflow packing hole (104) allows the low-temperature-end inflow port (73) and the low-temperature-side inflow hole (83) of the common header body (53) to communicate with each other.

Connection Header Case

The connection header case (61) houses the connection header (62). As illustrated in FIG. 7, the connection header (62) is disposed in contact with each housing portion (22) inside the connection header case (61). As illustrated in FIG. 7, the connection header (62) includes a connection header body (63) and a connection packing (64). The connection header (62) constitutes a header structure.

Connection Header Body

The connection header body (63) has a slightly flat rectangular-parallelepiped shape. The connection header body (63) is made of a nonmagnetic material (for example, resin) having a thermal conductivity of 10 W/m or less. The connection header body (63) has a front surface (63a) in contact with the connection packing (64) and a back surface (63b) on the back side thereof. In the front surface (63a) of the connection header body (63) (in other words, in a vicinity of a first surface inside the connection header (62)), a first series connection groove (91) and a second series connection groove (92) are formed in a single layer structure. The back surface of the connection header body (63) constitutes a second surface of the connection header (62).

The first series connection groove (91) allows a low-temperature-side outflow port (26a) of the first housing portion (22a) (specifically, an outlet of a low-temperature-side outflow path (26) of the first housing portion (22a)) and a high-temperature-side inflow port (27a) of the second housing portion (22b) (specifically, an inlet of a high-temperature-side inflow path (27) of the second housing portion (22b)) to communicate with each other by series connection through the connection packing (64). The first series connection groove (91) has a rectangular shape in the front surface (63a) of the connection header body (63). The first series connection groove (91) constitutes a first series internal flow path.

The second series connection groove (92) allows a low-temperature-side inflow port (25a) of the first housing portion (22a) (specifically, an inlet of a low-temperature-side inflow path (25) of the first housing portion (22a)) and a high-temperature-side outflow port (28a) of the second housing portion (22b) (specifically, an outlet of a high-temperature-side outflow path (28) of the second housing portion (22b)) to communicate with each other by series connection through the connection packing (64). The second series connection groove (92) has a substantially C-like shape open downward in the front surface (63a) of the connection header body (63). The second series connection groove (92) constitutes a second, series internal flow path.

Connection Packing

The connection packing (64) is a rectangular plate-shaped resin member. The resin constituting the connection packing (64) is a nonmagnetic material having a thermal conductivity of 10 W/m or less. One side surface of the connection packing (64) is attached to the front surface (63a) of the connection header body (63). Another side surface (64a) of the connection packing (64) is attached to each housing portion (22). As described above, the connection packing (64), more broadly, the connection header (62) integrates the plurality of housing portions (22) with each other. The other side surface (64a) of the connection packing (64) constitutes a first surface of the connection header (62) facing each housing portion (22).

Fifth to eighth packing holes (H5 to H8) each having a vertically long rectangular shape are formed in the connection packing (64). The fifth to eighth packing holes (H5 to H8) extend through the connection packing (64) in the thickness direction. The fifth packing hole (H5) allows the low-temperature-side inflow port (25a) of the first housing portion (22a) and, the second series connection groove (92) of the connection header body (63) to communicate with each other. The sixth packing hole (H6) allows the low-temperature-side outflow port (26a) of the first housing portion (22a) and the first series connection groove (91) of the connection header body (63) to communicate with each other. The seventh packing hole (H7) allows the high-temperature-side inflow port (27a) of the second housing portion (22b) and the first series connection groove (91) of the connection header body (63) to communicate with each other. The eighth packing hole (H8) allows the high-temperature-side outflow port (28a) of the second housing portion (22b) and the second series connection groove (92) of the connection header body (63) to communicate with each other.

With such a configuration, the low-temperature-side outflow path (26) of the first housing portion (22a) and the high-temperature-side inflow path (27) of the second housing portion (22b) are connected to each other in series through the first series connection groove (91). The low-temperature-side inflow path (25) of the first housing portion (22a) and the high-temperature-side outflow path (28) of the second housing portion (22b) are connected to each other in series through the second series connection groove (92). In other words, the first housing portion (22a) and the second housing portion (22b) are connected to each other in series.

Flow of Heat Medium in Magnetic Refrigeration Module

A description is given of a flow of the heat medium in the magnetic refrigeration module (20) when the air conditioning system (10) is operated, more specifically, when the heat medium pump (130) performs the first operation or the second operation, As illustrated in FIGS. 9A to 9I, when the heat medium pump (130) performs the first operation, the heat medium flows from the low-temperature side to the high-temperature side in the magnetic refrigeration module (20). Specifically, in the magnetic refrigeration module (20), the heat medium having flowed in from the low-temperature-end inflow port (73) flows into the low-temperature-side inflow hole (83) of the common header body (53). The heat medium having flowed out of the low-temperature-side inflow hole (83) of the common header body (53) flows into the low-temperature-side inflow path (25) of the second housing portion (22b) through the low-temperature internal inflow groove (87) of the common header body (53). The heat medium having flowed out of the low-temperature-side inflow path (25) of the second housing portion (22b) flows through the magnetic working substances (23) in the second housing portion (22b) and then flows into the high-temperature-side outflow path (28) of the second housing portion (22b).

The heat medium having flowed out of the high-temperature-side outflow path (28) of the second housing portion (22b) flows into the low-temperature-side inflow path (25) of the first housing portion (22a) through the second series connection groove (92) of the connection header body (63). The heat medium having flowed out of the low-temperature-side inflow path (25) of the first housing portion (22a) flows through the magnetic working substances (23) in the first housing portion (22a) and then flows into the high-temperature-side outflow path (28) of the first housing portion (22a). The heat medium having flowed out of the high-temperature-side outflow path (28) of the first housing portion (22a) flows into the high-temperature-side outflow hole (82) of the common header body (53) through the high-temperature internal outflow groove (86) of the common header body (53). The heat medium having flowed out of the high-temperature-side outflow hole (82) of the common header body (53) flows to the outside of the magnetic refrigeration module (20) through the high-temperature-end outflow port (72).

As illustrated in FIGS. 10A to 10I, when the heat medium pump (130) performs the second operation, the heat medium flows from the high-temperature side to the low-temperature side in the magnetic refrigeration module (20). Specifically, in the magnetic refrigeration module (20), the heat medium having flowed in from the high-temperature-end inflow port (71) flows into the high-temperature-side inflow hole (81) of the common header body (53). The heat medium having flowed out of the high-temperature-side inflow hole (81) of the common header body (53) flows into the high-temperature-side inflow path (27) of the first housing portion (22a) through the high-temperature internal inflow groove (85) of the common header body (53). The heat medium having flowed out of the high-temperature-side inflow path (27) of the first housing portion (22a) flows through the magnetic working substances (23) in the first housing portion (22a) and then flows into the low-temperature-side outflow path (26) of the first housing portion (22a).

The heat medium having flowed out of the low-temperature-side outflow path (26) of the first housing portion (220 flows into the high-temperature-side inflow path (27) of the second housing portion (22b) through the first series connection groove (91) of the connection header body (63). The heat medium having flowed out of the high-temperature-side inflow path (27) of the second housing portion (22b) flows through the magnetic working substances (23) in the second housing portion (22b) and then flows into the low-temperature-side outflow path (26) of the second housing portion (22b). The heat medium having flowed out of the low-temperature-side outflow path (26) of the second housing portion (22b) flows into the low-temperature-side outflow hole (84) of the common header body (53) through the low-temperature internal outflow groove (88) of the common header body (53). The heat medium having flowed out of the low-temperature-side outflow hole (84) of the common header body (53) flows to the outside of the magnetic refrigeration module (20) through the low-temperature-end outflow port (74).

Advantageous Effects of Modification of Embodiment 1

Also with the magnetic refrigeration module (20) according to the present modification, advantageous effects similar to those of Embodiment 1 described above are obtained.

In the magnetic refrigeration module (20) according to the present modification, the low-temperature-side inflow port (25a) and the low-temperature-side outflow port (26a) of each of the housing portions (22) disposed on the most low-temperature side, and the high-temperature-side inflow port (27a) and the high-temperature-side outflow port (28a) of each of the housing portions (22) disposed on the most high-temperature side are disposed on one side in the magnetic refrigeration module (20). With this configuration, since the four ports (25a to 28a) are on the one side of the magnetic refrigeration module (20), respective pipes or the like that are connected to the four ports (25a to 28a) can be easily installed.

In the magnetic refrigeration module (20) according to the present modification, the header structure (32, 42, 52, 62) includes a common header (52) having the low-temperature internal inflow path (87), the low-temperature internal outflow path (88), the high-temperature internal inflow path (85), and the high-temperature internal outflow path (86), and a connection header (62) having the first series internal flow path (91, 93, 95, 97) and the second series internal flow path (92, 94, 96, 98). With this configuration, the heat medium flows from the common header (52) through the plurality of housing portions (22) and the connection header (62) to the common header (52).

In the magnetic refrigeration module (20) according to the present modification, the header structure (32, 42, 52, 62) includes the common header (52) and the connection header (62); the low-temperature internal inflow path (87), the low-temperature internal outflow path (88), the high-temperature internal inflow path (85), and the high-temperature internal outflow path (86) are constituted by a single layer structure provided at the common header (52); and the first series internal flow path (91, 93, 95, 97) and the second series internal flow path (92, 94, 96, 98) are constituted by a single layer structure provided at the connection header (62). With this configuration, the heat medium flows from the common header (52) through the plurality of housing portions (22) and the connection header (62) to the common header (52). When the low-temperature internal inflow path (87), the low-temperature internal outflow path (88), the high-temperature internal inflow path (85), and the high-temperature internal outflow path (86), or the first series internal flow path (91, 93, 95, 97) and the second series internal flow path (92, 94, 96, 98) are constituted by the single layer structure, the common header (52) or the connection header (62) can be easily manufactured.

In the magnetic refrigeration module (20) according to the present modification, each of the common header (52) and the connection header (62) has a first surface (54a, 64a) facing the housing portion (22) and a second surface (55a, 63b) on a back side of the first surface (54a, 64a); the low-temperature internal inflow path (87), the low-temperature internal outflow path (88), the high-temperature internal inflow path (85), and the high-temperature internal outflow path (86) that have the single layer structure are constituted by grooves (85 to 88) formed in a vicinity of the first surface (54a) inside the common header (52); and the first series internal flow path (91, 93, 95, 97) and the second series internal flow path (92, 94, 96, 98) that have the single layer structure are constituted by grooves (91 to 98) formed in a vicinity of the first surface (64a) inside the connection header (62). With this configuration, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) that have the single layer structure can be attained by a simple configuration of the grooves (85 to 88, 91 to 98) formed inside the common header (52) or the connection header (62).

Improvement of Modification of Embodiment 1
Backflow Prevention Portion

In the magnetic refrigeration module (20) according to the modification of Embodiment 1 illustrated in FIGS. 8A to 8I and so forth, flow paths for connecting the housing portions (22) to each other in series are separated into a forward path and a return path, but in practice, the heat medium can flow in both directions. Thus, performance deteriorates due to the flow paths becoming a dead volume.

Hence, as illustrated in FIG. 34, backflow prevention portions (201, 202) constituted by, for example, check valves may be provided in series connection portions (two portions) where the housing portions (22) are connected in series. In FIG. 34, the same components as those of the modification of Embodiment 1 illustrated in FIGS. 8A to 8I are denoted by the same reference numerals.

Specifically, a first backflow prevention portion (201) may be disposed in a portion where a low-temperature-side outflow port (25b) (an outlet of the low-temperature-side inflow path (25)) of the first housing portion (22a) and a high-temperature-side inflow port (28b) (an inlet of the high-temperature-side outflow path (28)) of the second housing portion (22b) are connected in series. A second backflow prevention portion (202) may be disposed in a portion where a low-temperature-side inflow port (26b) (an inlet of the low-temperature-side outflow path (26)) of the first housing portion (22a) and a high-temperature-side outflow port (27b) (an outlet of the high-temperature-side inflow path (27)) of the second housing portion (22b) are connected in series.

Thus, the directions in which the heat medium flows in the flow paths (25 to 28) of each housing portion (22) can be determined, thereby suppressing a deterioration in performance due to the flow paths (25 to 28) becoming a dead volume.

Although, in the configuration illustrated in FIG. 34, the backflow prevention portions (201, 202) are provided in all series connection portions where the housing portions (22) are connected in series, only one of the first backflow prevention portion (201) and the second backflow prevention portion (202) may be provided instead. Also in this case, it is possible to suppress a deterioration in performance due to the dead volume as compared with a case where the backflow prevention portion (201, 202) is not provided.

In the configuration illustrated in FIG. 34, the first backflow prevention portion (201) may be connected to at least one of the low-temperature-side outflow port (25b) (the outlet of the low-temperature-side inflow path (25)) of the first housing portion (22a) and the high-temperature-side inflow port (28b) (the inlet of the high-temperature-side outflow path (28)) of the second housing portion (22b). The second backflow prevention portion (202) may be connected to at least one of the low-temperature-side inflow port (26b) (the inlet of the low-temperature-side outflow path (26)) of the first housing portion (22a) and the high-temperature-side outflow port (27b) (the outlet of the high-temperature-side inflow path (27)) of the second housing portion (22b). In this way, as described in Embodiment 1 (see FIGS. 32 and 33A to 33C), the backflow prevention portion (201, 202) can be installed inside the header structure (52, 62) at a position located upstream of the structure for series connection.

Heat Insulating Layer

In the magnetic refrigeration module (20) according to the present modification illustrated in FIGS. 8A to 8I and so forth, when the housing portions (22) or the flow paths (25 to 28) having different temperatures are adjacent to each other, a heat leakage occurs and performance deteriorates.

Hence, as illustrated in FIG. 34, a heat insulating layer (first heat insulating layer) (211) may be provided between the housing portions (22) connected in series. The heat insulating layer (211) may be constituted by a heat insulator, a slit, or the like. Part of the housing portions (22) may be constituted by a heat insulating member serving as the heat insulating layer (211). The head insulating layer (211) may be provided entirely between the housing portions (22) connected in series or may be provided partly between the housing portions (22) connected in series. In the configuration illustrated in FIG. 34, the heat insulating layer (211) is provided between the magnetic working substances (23) in the first housing portion (22a) and the magnetic working substances (23) in the second housing portion (22b) through which the heat medium flows at different temperatures, and between the high-temperature-side outflow path (28) of the first housing portion (22a) and the low-temperature-side inflow path (25) of the second housing portion (22b) through which the heat medium flows at different temperatures.

Accordingly, a deterioration in performance due to a heat leakage can be suppressed even when the housing portions (22) (magnetic working substances (23)) or the flow paths (25 to 28) having different temperatures are adjacent to each other. In other words, a deterioration in performance due to a heat leakage between the housing portions (22) through which the head medium flows at different temperatures can be suppressed.

Embodiment 2

Embodiment 2 will be described. A magnetic refrigeration module (20) according to the present embodiment is different from that of Embodiment 1 in the number of housing portions (22). Differences from Embodiment 1 will be mainly described below.

Housing Portion Case

As illustrated in FIGS. 11 to 14K, three housing portions (22) are housed in a housing portion case (21). The housing portion case (21) has three through holes (21a), Each through hole (21a) houses one housing portion (22).

Figure 12A:
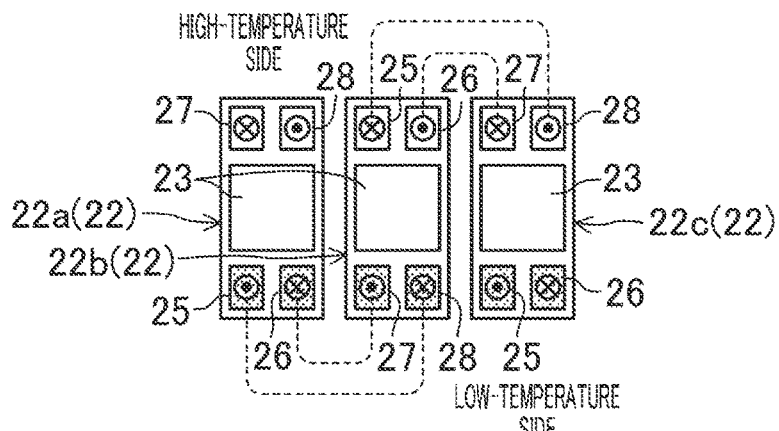
FIG. 12A, FIG. 12B, FIG. 12C, FIG. 12D, FIG. 12E, FIG. 12F, FIG. 12G, FIG. 12H, FIG. 12I, FIG. 12J and FIG. 12K are diagrams illustrating components of the magnetic refrigeration module according to Embodiment 2.
Figure 12B:
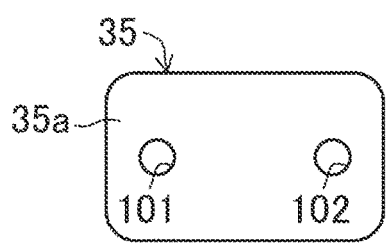
Figure 12C:
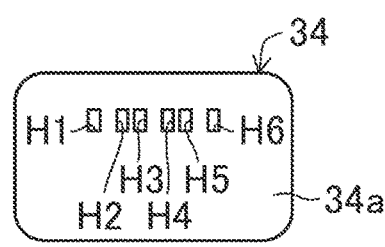
Figure 12D:
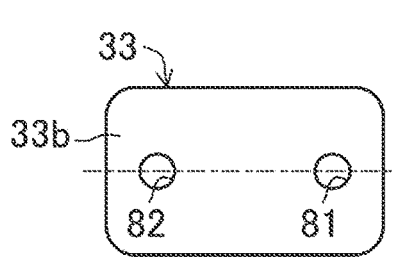
Figure 12E:
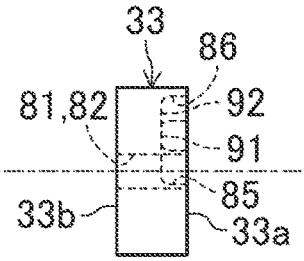
Figure 12F:
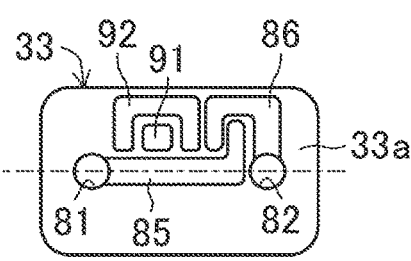
Figure 12G:
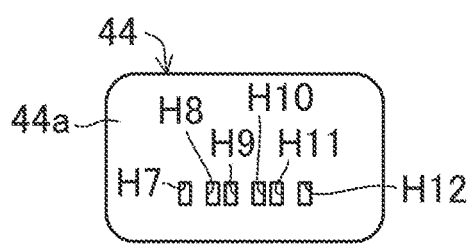
Figure 12H:
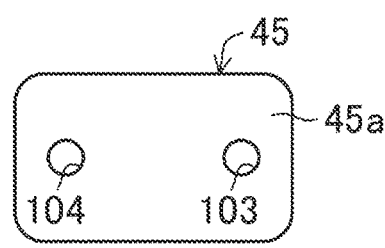
Figure 12I:
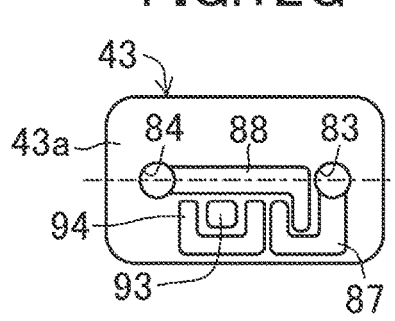
Figure 12J:
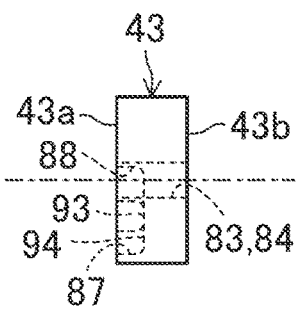
Figure 12K:
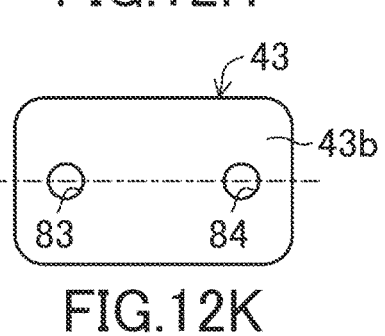
Figure 13A:
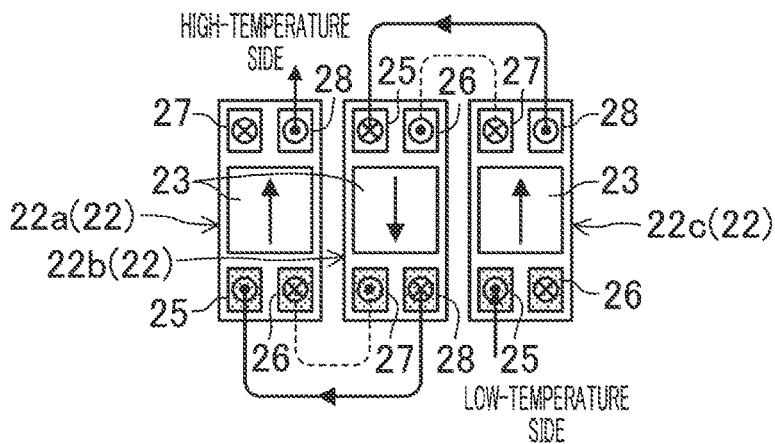
FIG. 13A, FIG. 13B, FIG. 13C, FIG. 13D, FIG. 13E, FIG. 13F, FIG. 13G, FIG. 13H, FIG. 13I, FIG. 13J and FIG. 13K are diagrams for describing a flow of a heat medium in the magnetic refrigeration module when a heat medium pump performs a first operation.
Figure 13B:
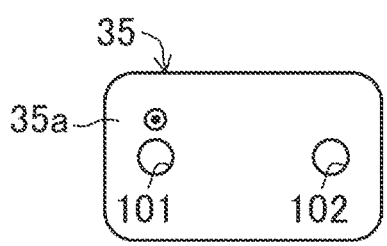
Figure 13C:
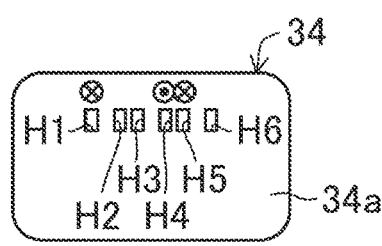
Figure 13D:
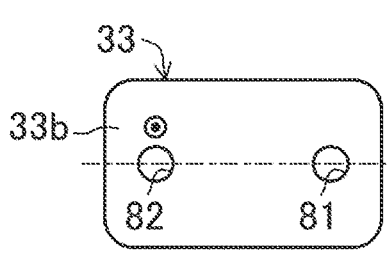
Figure 13E:
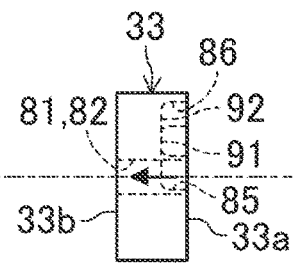
Figure 13F:
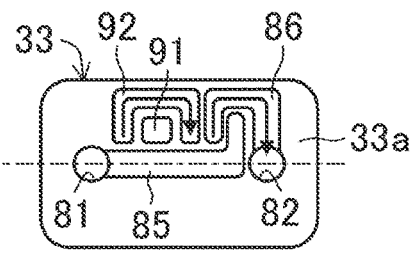
Figure 13G:
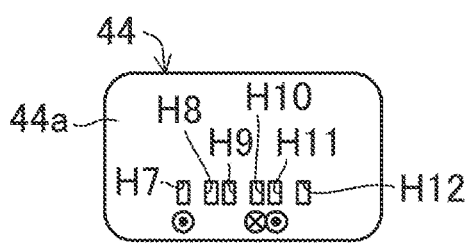
Figure 13H:
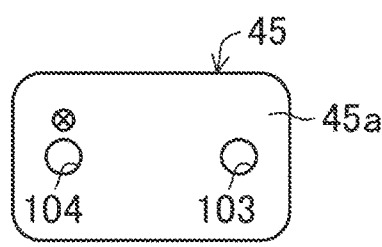
Figure 13I:
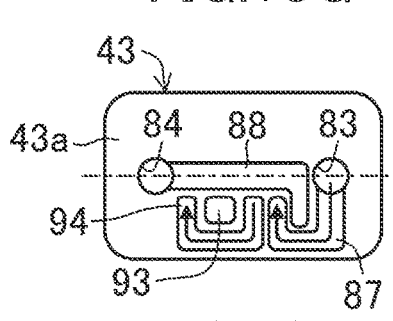
Figure 13J:
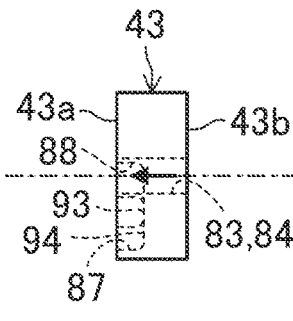
Figure 13K:
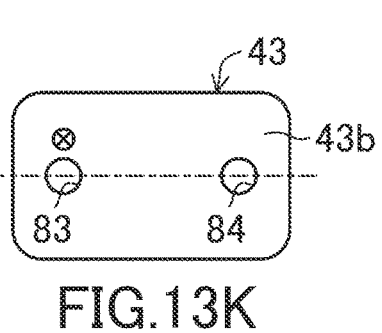
Figure 14A:
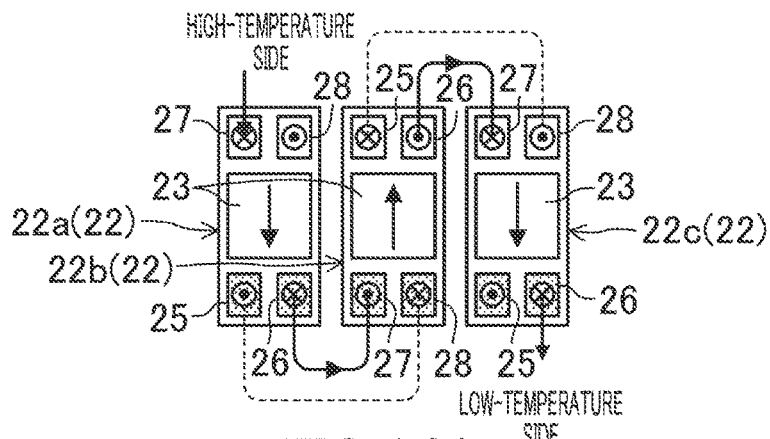
FIG. 14A, FIG. 14B, FIG. 14C, FIG. 14D, FIG. 14E, FIG. 14F, FIG. 14G, FIG. 14H, FIG. 14I, FIG. 14J and FIG. 14K are diagrams for describing a flow of the heat medium in the magnetic refrigeration module when the heat medium pump performs a second operation.
Figure 14B:
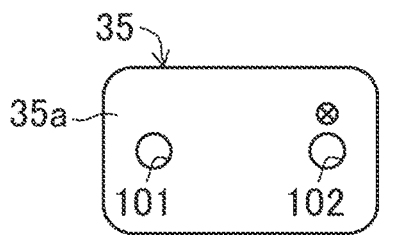
Figure 14C:
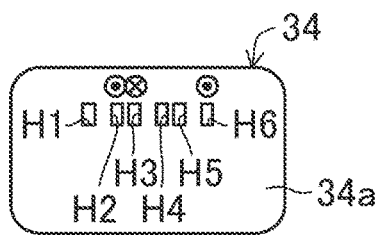
Figure 14D:
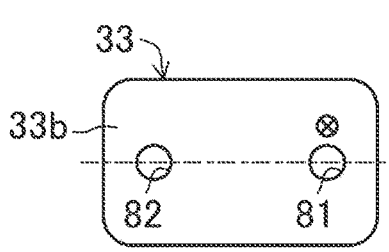
Figure 14E:
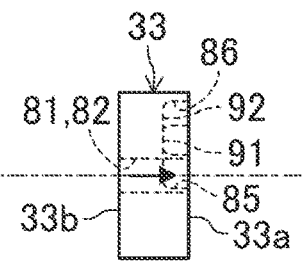
Figure 14F:
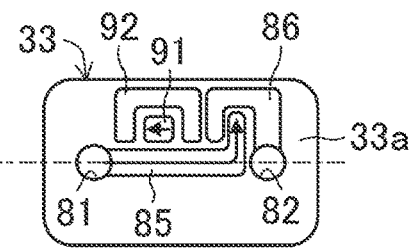
Figure 14G:
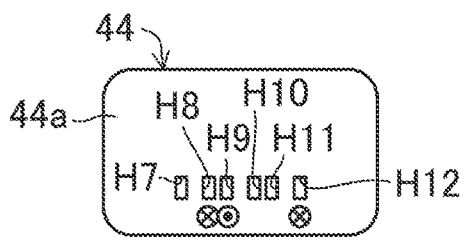
Figure 14H:
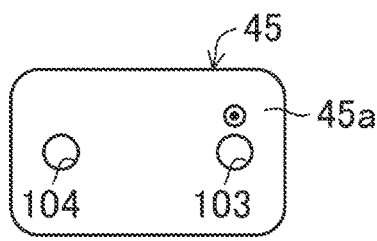
Figure 14I:
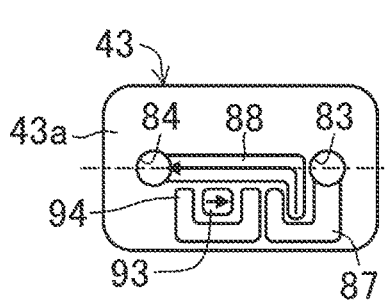
Figure 14J:
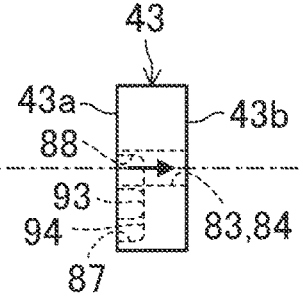
Figure 14K:
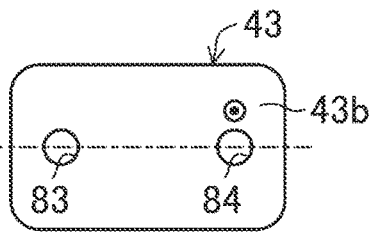

Hereinafter, the three housing portions (22) according to the present embodiment may be referred to as a first housing portion (22a), a second housing portion (22b), and a third housing portion (22c) in this order from the left side to the right side in FIG. 12A. The first housing portion (22a) constitutes a housing portion disposed on a most high-temperature side. The third housing portion (22c) constitutes a housing portion disposed on a most low-temperature side.

High-Temperature-Side Header

A high-temperature-side header (32) is different from that of Embodiment 1 described above in the configurations of a high-temperature-side header body (33) and a first high-temperature-side packing (34). The configuration of a second high-temperature-side packing (35) is the same as that of Embodiment 1 described above.

High-Temperature-Side Header Body

In a front surface (33a) of the high-temperature-side header body (33) (in other words, in a vicinity of a first surface inside the high-temperature-side header (32)), a high-temperature internal inflow groove (85), a high-temperature internal outflow groove (86), a first series connection groove (91), and a second series connection groove (92) are formed in a single layer structure.

The high-temperature internal inflow groove (85) allows a high-temperature-side inflow hole (81) and a high-temperature-side inflow port (27a) of the first housing portion (22a) (specifically, an inlet of a high-temperature-side inflow path (27) of the first housing portion (22a)) with each other through the first high-temperature-side packing (34). The high-temperature internal inflow groove (85) has a substantially L-like shape in the front surface (33a) of the high-temperature-side header body (33). The high-temperature internal inflow groove (85) constitutes a high-temperature internal inflow path.

The high-temperature internal outflow groove (86) allows a high-temperature-side outflow hole (82) and a high-temperature-side outflow port (28a) of the first housing portion (22a) (specifically, an outlet of a high-temperature-side outflow path (28) of the first housing portion (22a)) to communicate with each other through the first high-temperature-side packing (34). The high-temperature internal outflow groove (86) has a substantially C-like shape open downward in the front surface (33a) of the high-temperature-side header body (33). The high-temperature internal outflow groove (86) constitutes a high-temperature internal outflow path.

The first series connection groove (91) allows a low-temperature-side outflow port (26a) of the second housing portion (22b) (specifically, an outlet of a low-temperature-side outflow path (26) of the second housing portion (22b)) and a high-temperature-side inflow port (27a) of the third housing portion (22c) (specifically, an inlet of a high-temperature-side inflow path (27) of the third housing portion (22c)) to communicate with each other by series connection through the first high-temperature-side packing (34). The first series connection groove (91) has a rectangular shape in the front surface (33a) of the high-temperature-side header body (33). The first series connection groove (91) constitutes a first series internal flow path.

The second series connection groove (92) allows a low-temperature-side inflow port (25a) of the second housing portion (22b) (specifically, an inlet of a low-temperature-side inflow path (25) of the second housing portion (22b)) and a high-temperature-side outflow port (28a) of the third housing portion (22c) (specifically, an outlet of a high-temperature-side outflow path (28) of the third housing portion (22c)) to communicate with each other by series connection through the first high-temperature-side packing (34). The second series connection groove (92) has a substantially C-like shape open downward in the front surface (33a) of the high-temperature-side header body (33). The second series connection groove (92) constitutes a second series internal flow path.

First High-Temperature-Side Packing

First to sixth packing holes (H1 to H6) each having a vertically long rectangular shape are formed in the first high-temperature-side packing (34). The first to sixth packing holes (1-11 to 116) extend through the first high-temperature-side packing (34) in the thickness direction.

The first packing hole (H1) allows the high-temperature-side outflow port (28a) of the third housing portion (22c) and the second series connection groove (92) of the high-temperature-side header body (33) to communicate with each other. The second packing hole (H2) allows the high-temperature-side inflow port (27a) of the third housing portion (22c) and the first series connection groove (91) of the high-temperature-side header body (33) to communicate with each other. The third packing hole (H3) allows the low-temperature-side outflow port (26a) of the second housing portion (22b) and the first series connection groove (91) of the high-temperature-side header body (33) to communicate with each other. The fourth packing hole (H4) allows the low-temperature-side inflow port (25a) of the second housing portion (22b) and the second series connection groove (92) of the high-temperature-side header body (33) to communicate with each other. The fifth packing hole (H5) allows the high-temperature-side outflow port (28a) of the first housing portion (22a) and the high-temperature internal outflow groove (86) of the high-temperature-side header body (33) to communicate with each other. The sixth packing hole (H6) allows the high-temperature-side inflow port (27a) of the first housing portion (22a) and the high-temperature internal inflow groove (85) of the high-temperature-side header body (33) to communicate with each other.

With such a configuration, the low-temperature-side outflow path (26) of the second housing portion (22*b*) and the high-temperature-side inflow path (27) of the third housing portion (22*c*) are connected to each other in series through the first series connection groove (91). The low-temperature-side inflow path (25) of the second housing portion (22*b*) and the high-temperature-side outflow path (28) of the third housing portion (22*c*) are connected to each other in series through the second series connection groove (92). In other words, the second housing portion (22*b*) and the third housing portion (22*c*) are connected to each other in series.

Low-Temperature-Side Header

A low-temperature-side header (42) is different from that of Embodiment 1 described above in the configurations of a low-temperature-side header body (43) and a first low-temperature-side packing (44). The configuration of a second low-temperature-side packing (45) is the same as that of Embodiment 1 described above.

Low-Temperature-Side Header Body

In a front surface (43*a*) of the low-temperature-side header body (43) (in other words, in a vicinity of a first surface inside the low-temperature-side header (42)), a low-temperature internal inflow groove (87), a low-temperature internal outflow groove (88), a third series connection groove (93), and a fourth series connection groove (94) are formed in a single layer structure.

The low-temperature internal inflow groove (87) allows a low-temperature-side inflow hole (83) and a low-temperature-side inflow port (25*a*) of the third housing portion (22*c*) (specifically, an inlet of a low-temperature-side inflow path (25) of the third housing portion (22*c*)) to communicate with each other through the first low-temperature-side packing (44). The low-temperature internal inflow groove (87) has a substantially C-like shape open upward in the front surface (43*a*) of the low-temperature-side header body (43). The low-temperature internal inflow groove (87) constitutes a low-temperature internal inflow path.

The low-temperature internal outflow groove (88) allows a low-temperature-side outflow hole (84) and a low-temperature-side outflow port (26*a*) of the third housing portion (22*c*) (specifically, an outlet of a low-temperature-side outflow path (26) of the third housing portion (22*c*)) to communicate with each other through the first low-temperature-side packing (44). The low-temperature internal outflow groove (88) has a substantially L-like shape in the front surface (43*a*) of the low-temperature-side header body (43). The low-temperature internal outflow groove (88) constitutes a low-temperature internal outflow path.

The third series connection groove (93) allows a low-temperature-side outflow port (26*a*) of the first housing portion (22*a*) (specifically, an outlet of a low-temperature-side outflow path (26) of the first housing portion (22*a*)) and a high-temperature-side inflow port (27*a*) of the second housing portion (22*b*) (specifically, an inlet of a high-temperature-side inflow path (27) of the second housing portion (22*b*)) to communicate with each other by series connection through the first low-temperature-side packing (44). The third series connection groove (93) has a rectangular shape in the front surface (43*a*) of the low-temperature-side header body (43). The third series connection groove (93) constitutes a first series internal flow path, The fourth series connection groove (94) allows a low-temperature-side inflow port (25*a*) of the first housing portion (22*a*) (specifically, an inlet of a low-temperature-side inflow path (25) of the first housing portion (22*a*)) and a high-temperature-side outflow port (28*a*) of the second housing portion (22*b*) (specifically, an outlet of a high-temperature-side outflow path (28) of the second housing portion (22*b*)) to communicate with each other by series connection through the first low-temperature-side packing (44). The fourth series connection groove (94) has a substantially C-like shape open upward in the front surface (43*a*) of the low-temperature-side header body (43). The fourth series connection groove (94) constitutes a second series internal flow path.

First Low-Temperature-side Packing

Seventh to twelfth packing holes (H7 to H12) each having a vertically long rectangular shape are formed in the first low-temperature-side packing (44). The seventh to twelfth packing holes (H7 to H12) extend through the first low-temperature-side packing (44) in the thickness direction.

The seventh packing hole (H7) allows the low-temperature-side inflow port (25*a*) of the first housing portion (22*a*) and the fourth series connection groove (94) of the low-temperature-side header body (43) to communicate with each other. The eighth packing hole (H8) allows the low-temperature-side outflow port (26*a*) of the first housing portion (22*a*) and the third series connection groove (93) of the low-temperature-side header body (43) to communicate with each other. The ninth packing hole (H9) allows the high-temperature-side inflow port (27*a*) of the second housing portion (22*b*) and the third series connection groove (93) of the low-temperature-side header body (43) to communicate with each other. The tenth packing hole (H10) allows the high-temperature-side outflow port (28*a*) of the second housing portion (22*b*) and the fourth series connection groove (94) of the low-temperature-side header body (43) to communicate with each other. The eleventh packing hole (H11) allows the low-temperature-side inflow port (25*a*) of the third housing portion (22*c*) and the low-temperature internal inflow groove (87) of the low-temperature-side header body (43) to communicate with each other. The twelfth packing hole (H12) allows the low-temperature-side outflow port (26*a*) of the third housing portion (22*c*) and the low-temperature internal outflow groove (88) of the low-temperature-side header body (43) to communicate with each other.

With such a configuration, the low-temperature-side outflow path (26) of the first housing portion (22*a*) and the high-temperature-side inflow path (27) of the second housing portion (22*b*) are connected to each other in series through the third series connection groove (93). The low-temperature-side inflow path (25) of the first housing portion (22*a*) and the high-temperature-side outflow path (28) of the second housing portion (22*b*) are connected to each other in series through the fourth series connection groove (94). In other words, the first housing portion (22*a*) and the second housing portion (22*b*) are connected to each other in series.

Flow of Heat Medium in Magnetic Refrigeration Module

A description is given of a flow of the heat medium in the magnetic refrigeration module (20) when the air conditioning system (10) is operated, more specifically, when the heat medium pump (130) performs the first operation or the second operation.

As illustrated in FIGS. 13A to 13K, when the heat medium pump (130) performs the first operation, the heat medium flows from the low-temperature side to the high-temperature side in the magnetic refrigeration module (20). Specifically, in the magnetic refrigeration module (20), the heat medium having flowed in from the low-temperature-end inflow port (73) flows into the low-temperature-side inflow hole (83) of the low-temperature-side header body (43). The heat medium having flowed out of the low-temperature-side inflow hole (83) of the low-temperature-side header body (43) flows into the low-temperature-side inflow path (25) of the third housing portion((22c) through the low-temperature internal inflow groove (87) of the low-temperature-side header body (43). The heat medium having flowed out of the low-temperature-side inflow path (25) of the third housing portion (22c) flows through the magnetic working substances (23) in the third housing portion (22c) and then flows into the high-temperature-side outflow path (28) of the third housing portion (22c).

The heat medium having flowed out of the high-temperature-side outflow path (28) of the third housing portion (22c) flows into the low-temperature-side inflow path (25) of the second housing portion (22b) through the second series connection groove (92) of the high-temperature-side header body (33). The heat medium having flowed out of the low-temperature-side inflow path (25) of the second housing portion (22b) flows through the magnetic working substances (23) in the second housing portion (22b) and then flows into the high-temperature-side outflow path (28) of the second housing portion (22b).

The heat medium having flowed out of the high-temperature-side outflow path (28) of the second housing portion (22b) flows into the low-temperature-side inflow path (25) of the first housing portion (22a) through the fourth series connection groove (94) of the low-temperature-side header body (43). The heat medium having flowed out of the low-temperature-side inflow path (25) of the first housing portion (22a) flows through the magnetic working substances (23) in the first housing portion (22a) and then flows into the high-temperature-side outflow path (28) of the first housing portion (22a). The heat medium having flowed out of the high-temperature-side outflow path (28) of the first housing portion (22a) flows into the high-temperature-side outflow hole (82) of the high-temperature-side header body (33) through the high-temperature internal outflow groove (86) of the high-temperature-side header body (33). The heat medium having flowed out of the high-temperature-side outflow hole (82) of the high-temperature-side header body (33) flows to the outside of the magnetic refrigeration module (20) through the high-temperature-end outflow port (72).

As illustrated in FIGS. 14A to 14K, when the heat medium pump (130) performs the second operation, the heat medium flows from the high-temperature side to the low-temperature side in the magnetic refrigeration module (20). Specifically, in the magnetic refrigeration module (20), the heat medium having flowed in from the high-temperature-end inflow port (71) flows into the high-temperature-side inflow hole (81) of the high-temperature-side header body (33). The heat medium having flowed out of the high-temperature-side inflow hole (81) of the high-temperature-side header body (33) flows into the high-temperature-side inflow path (27) of the first housing portion (22a) through the high-temperature internal inflow groove (85) of the high-temperature-side header body (33). The heat medium having flowed out of the high-temperature-side inflow path (27) of the first housing portion (22a) flows through the magnetic working substances (23) in the first housing portion (22a) and then flows into the low-temperature-side outflow path (26) of the first housing portion (22a).

The heat medium having flowed out of the low-temperature-side outflow path (26) of the first housing portion (22a) flows into the high-temperature-side inflow path (27) of the second housing portion (22b) through the third series connection groove (93) of the low-temperature-side header body (43). The heat medium having flowed out of the high-temperature-side inflow path (27) of the second housing portion (22b) flows through the magnetic working substances (23) in the second housing portion (22b) and then flows into the low-temperature-side outflow path (26) of the second housing portion (22b).

The heat medium having flowed out of the low-temperature-side outflow path (26) of the second housing portion (22b) flows into the high-temperature-side inflow path (27) of the third housing portion (22c) through the first series connection groove (91) of the high-temperature-side header body (33). The heat medium having flowed out of the high-temperature-side inflow path (27) of the third housing portion (22c) flows through the magnetic working substances (23) in the third housing portion (22c) and then flows into the low-temperature-side outflow path (26) of the third housing portion (22c). The heat medium having flowed out of the low-temperature-side outflow path (26) of the third housing portion (22c) flows into the low-temperature-side outflow hole (84) of the low-temperature-side header body (43) through the low-temperature internal outflow groove (88) of the low-temperature-side header body (43). The heat medium having flowed out of the low-temperature-side outflow hole (84) of the low-temperature-side header body (43) flows to the outside of the magnetic refrigeration module (20) through the low-temperature-end outflow port (74).

Advantageous Effects of Embodiment 2

Also with the magnetic refrigeration module (20) according to the present embodiment, advantageous effects similar to those of Embodiment 1 described above are obtained.

Improvement of Embodiment 2

Backflow Prevention Portion

In the magnetic refrigeration module (20) according to Embodiment 2 illustrated in FIGS. 12A to 12K and so forth, flow paths for connecting the housing portions (22) to each other in series are separated into a forward path and a return path, but in practice, the heat medium can flow in both directions. Thus, performance deteriorates due to the flow paths becoming a dead volume.

Figure 35:
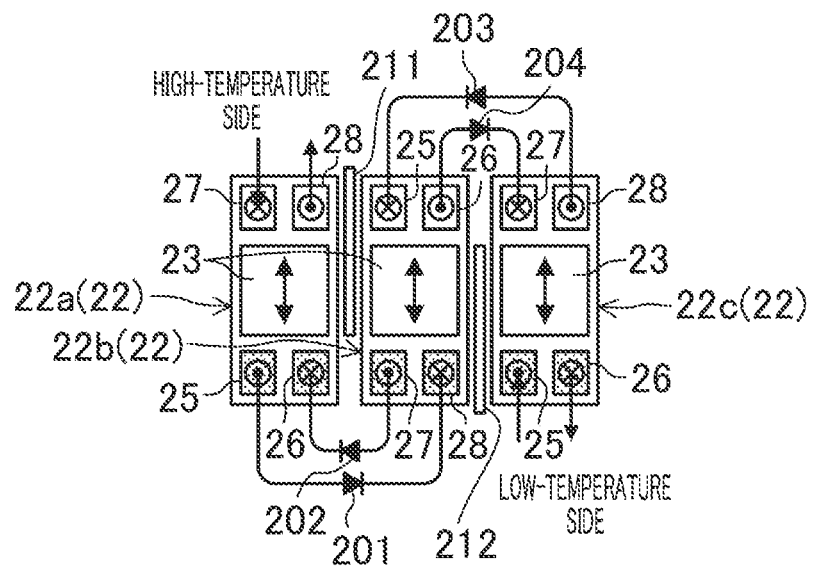
FIG. 35 is a diagram illustrating a state in which a backflow prevention portion and a heat insulating layer are further provided in the magnetic refrigeration module illustrated in FIGS. 12A to 12K.

Hence, as illustrated in FIG. 35, backflow prevention portions (201, 202, 203, 204) constituted by, for example, check valves may be provided in series connection portions (four portions) where the housing portions (22) are connected in series. In FIG. 35, the same components as those of Embodiment 2 illustrated in FIGS. 12A to 12K are denoted by the same reference numerals.

Specifically, a first backflow prevention portion (201) may be disposed in a portion where a low-temperature-side outflow port (25b) (an outlet of the low-temperature-side inflow path (25)) of the first housing portion (22a) and a high-temperature-side inflow port (28b) (an inlet of the high-temperature-side outflow path (28)) of the second housing portion (22b) are connected in series. A second backflow prevention portion (202) may be disposed in a portion where a low-temperature-side inflow port (26b) (an inlet of the low-temperature-side outflow path (26)) of the first housing portion (22a) and a high-temperature-side outflow port (27b) (an outlet of the high-temperature-side inflow path (27)) of the second housing portion (22b) are connected in series. A third backflow prevention portion (203) may be disposed in a portion where the low-temperature-side inflow port (25a) (the inlet of the low-temperature-side inflow path (25)) of the second housing portion (22b) and the high-temperature-side outflow port (28a) (the outlet of the high-temperature-side outflow path (28)) of the third housing portion are connected in series. A fourth backflow prevention portion (204) may be disposed in a portion where the low-temperature-side outflow port (26a) (the outlet of the low-temperature-side outflow path (26)) of the second housing portion (22b) and the high-temperature-side inflow port (27a) (the inlet of the high-temperature-side inflow path (27)) of the third housing portion (22c) are connected in series.

Thus, the directions in which the heat medium flows in the flow paths (25 to 28) of each housing portion (22) can be determined, thereby suppressing a deterioration in performance due to the flow paths (25 to 28) becoming a dead volume.

Although, in the configuration illustrated in FIG. 35, the backflow prevention portions (201, 202, 203, 204) are provided in all series connection portions where the housing portions (22) are connected in series, at least one of the backflow prevention portions (201, 202, 203, 204) may be provided. For example, the backflow prevention portion (201, 202, 203, 204) need not be provided between some of the housing portions (22) in the series connection structure of the three housing portions (22). Also in this case, it is possible to suppress a deterioration in performance due to the dead volume as compared with a case where the backflow prevention portions (201, 202, 203, 204) are not provided at all.

In the configuration illustrated in FIG. 35, the first backflow prevention portion (201) may be connected to at least one of the low-temperature-side outflow port (25b) (the outlet of the low-temperature-side inflow path (25)) of the first housing portion (22a) and the high-temperature-side inflow port (28b) (the inlet of the high-temperature-side outflow path (28)) of the second housing portion (22b). The second backflow prevention portion (202) may be connected to at least one of the low-temperature-side inflow port (26b) (the inlet of the low-temperature-side outflow path (26)) of the first housing portion (22a) and the high-temperature-side outflow port (27b) (the outlet of the high-temperature-side inflow path (27)) of the second housing portion (22b). The third backflow prevention portion (203) may be connected to at least one of the low-temperature-side inflow port (25a) (the inlet of the low-temperature-side inflow path (25)) of the second housing portion (22b) and the high-temperature-side outflow port (28a) (the outlet of the high-temperature-side outflow path (28)) of the third housing portion (22c). The fourth backflow prevention portion (204) may be connected to at least one of the low-temperature-side outflow port (26a) (the outlet of the low-temperature-side outflow path (26)) of the second housing portion (22b) and the high-temperature-side inflow port (27a) (the inlet of the high-temperature-side inflow path (27)) of the third housing portion (22c). In this way, as described in Embodiment 1 (see FIGS. 32 and 33A to 33C), the backflow prevention portion (201, 202, 203, 204) can be installed inside the header structure (32, 42) at a position located upstream of the structure for series connection.

Heat Insulating Layer

In the magnetic refrigeration module (20) according to the present embodiment illustrated in FIGS. 12A to 12K and so forth, when the housing portions (22) or the flow paths (25 to 28) having different temperatures are adjacent to each other, a heat leakage occurs and performance deteriorates.

Hence, as illustrated in FIG. 35, heat insulating layers (211, 212) may be provided between the housing portions (22) connected in series. The heat insulating layers (211, 212) may be constituted by heat insulators, slits, or the like. Part of the housing portions (22) may be constituted by heat insulating members serving as the heat insulating layers (211, 212). The heat insulating layers (211, 212) may be provided entirely between the housing portions (22) connected in series or may be provided partly between the housing portions (22) connected in series. In the configuration illustrated in FIG. 35, the first heat insulating layer (211) is provided between the magnetic working substances (23) in the first housing portion (22a) and the magnetic working substances (23) in the second housing portion (22b) through which the heat medium flows at different temperatures, and between the high-temperature-side outflow path (28) of the first housing portion (22a) and the low-temperature-side inflow path (25) of the second housing portion (22b) through which the heat medium flows at different temperatures. The second heat insulating layer (212) is provided between the magnetic working substances (23) in the second housing portion (22b) and the magnetic working substances (23) in the third housing portion (22c) through which the heat medium flows at different temperatures, and between the high-temperature-side outflow path (28) of the second housing portion (22b) and the low-temperature-side inflow path (25) of the third housing portion (22c) through which the heat medium flows at different temperatures.

Accordingly, a deterioration in performance due to a heat leakage can be suppressed even when the housing portions (22) (magnetic working substances (23)) or the flow paths (25 to 28) having different temperatures are adjacent to each other. In other words, a deterioration in performance due to a heat leakage between the housing portions (22) through which the heat medium flows at different temperatures can be suppressed.

Modification of Embodiment 2

A modification of Embodiment 2 will be described. A magnetic refrigeration module (20) according to the present modification is different from that of Embodiment 2 described above in that the magnetic refrigeration module (20) includes a common header (52) and a connection header (62). Differences from Embodiment 2 will be mainly described below.

As illustrated in FIGS. 15 to 18I, the magnetic refrigeration module (20) includes a housing portion case (21), a common header case (51), and a connection header case (61), each of which has a rectangular-parallelepiped shape. The common header case (51) is integrally attached to one side surface (a left side surface in FIG. 15) of the housing portion case (21). The connection header case (61) is integrally attached to another side surface (a right side surface in FIG. 15) of the housing portion case (21).

Common Header Case

The common header case (51) houses the common header (52). The common header case (51) includes a high-temperature-end inflow port (71), a high-temperature-end outflow port (72), a low-temperature-end inflow port (73), and a low-temperature-end outflow port (74).

Figure 15:
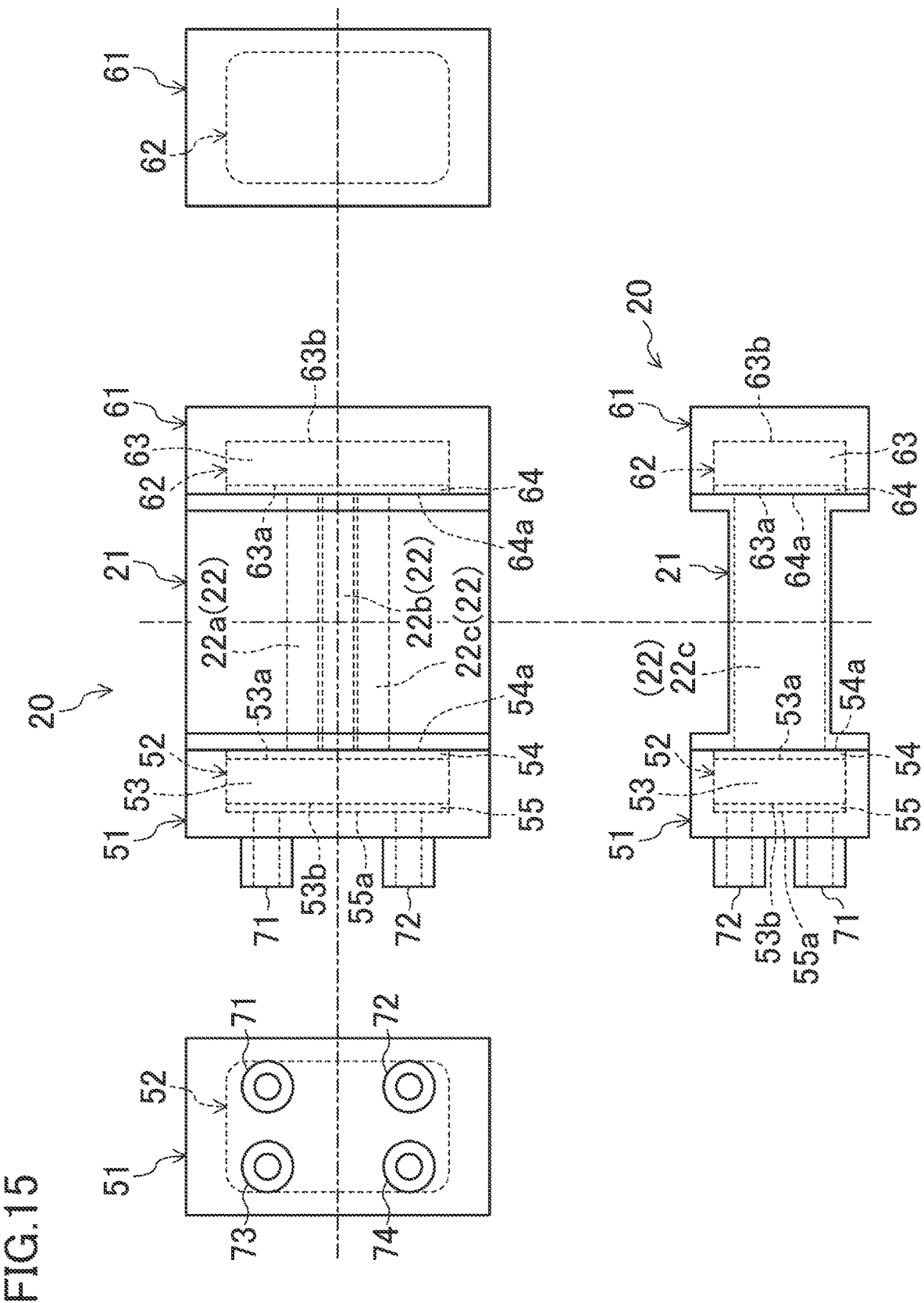
FIG. 15 is a four-side view illustrating a configuration of a magnetic refrigeration module according to a modification of Embodiment 2.
Figure 16A:
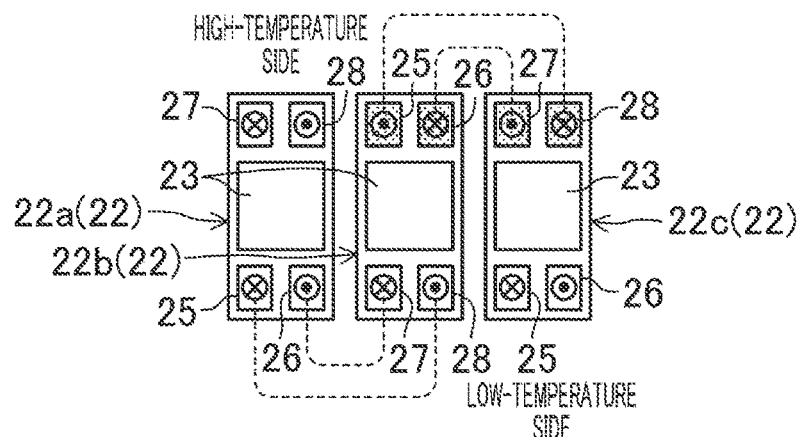
Figure 16B:
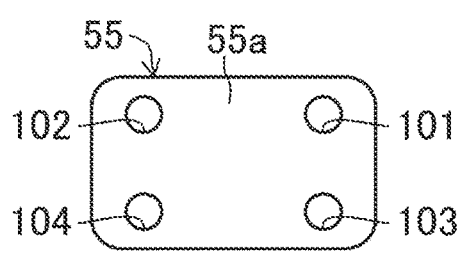
Figure 16C:
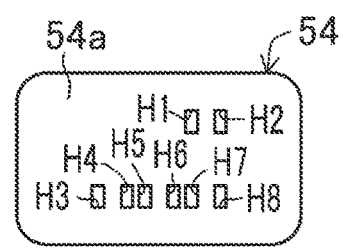
Figure 16D:
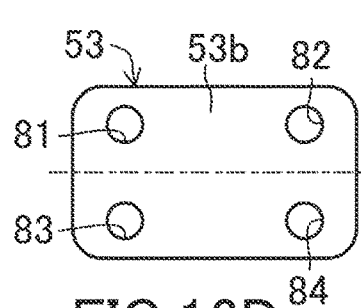
Figure 16E:
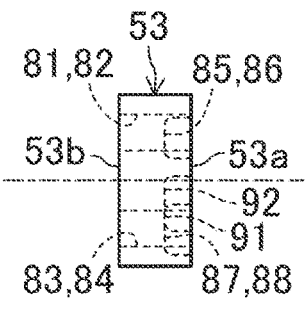
Figure 16F:
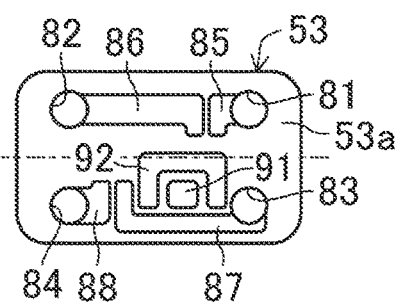
Figure 16G:
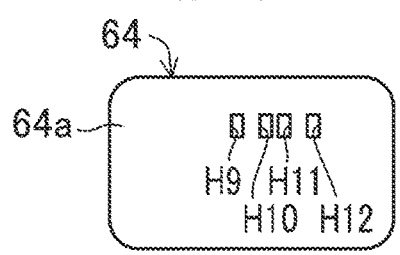
Figure 16H:
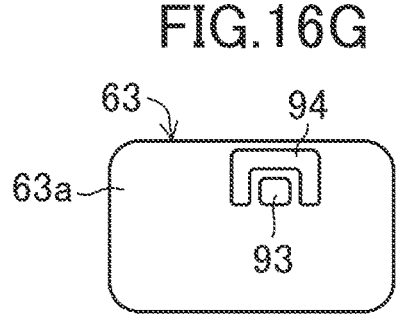
Figure 16I:
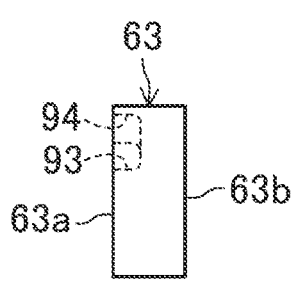
Figure 17A:
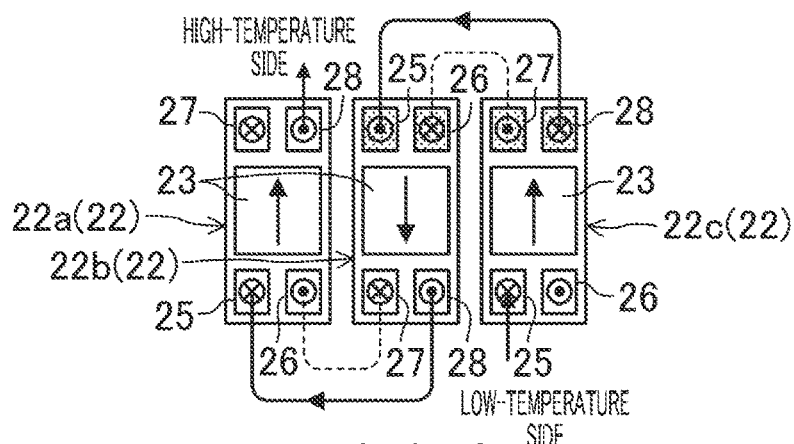
FIG. 17A, FIG. 17B, FIG. 17C, FIG. 17D, FIG. 17E, FIG. 17F, FIG. 17G, FIG. 17H and FIG. 17I are diagrams for describing a flow of a heat medium in the magnetic refrigeration module when a heat medium pump performs a first operation, FIG. 18A, FIG. 18B, FIG. 18C, FIG. 1.8D.
Figure 17B:
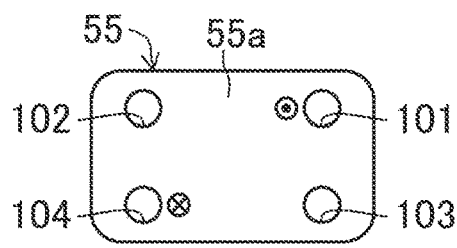
Figure 17C:
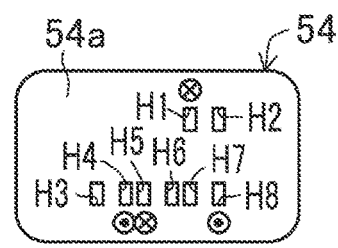
Figure 17D:
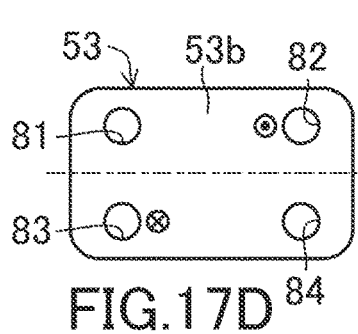
Figure 17E:
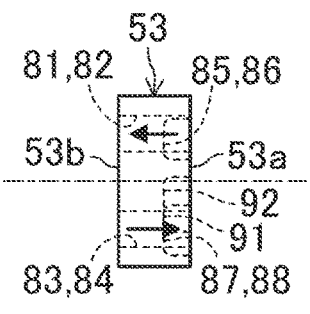
Figure 17F:
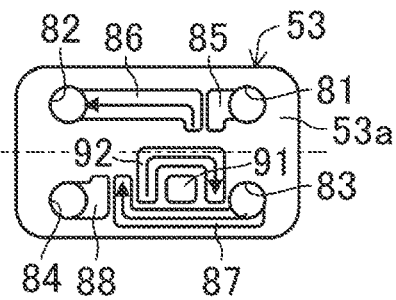
Figure 17G:
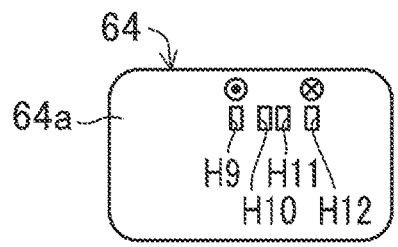
Figure 17H:
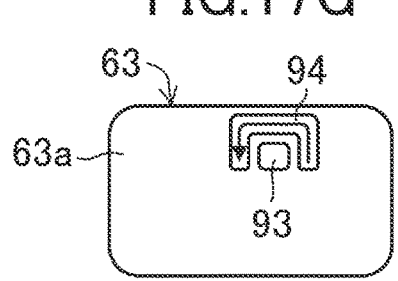
Figure 17I:
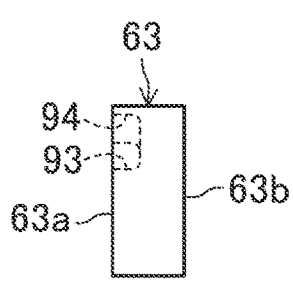
Figure 18A:
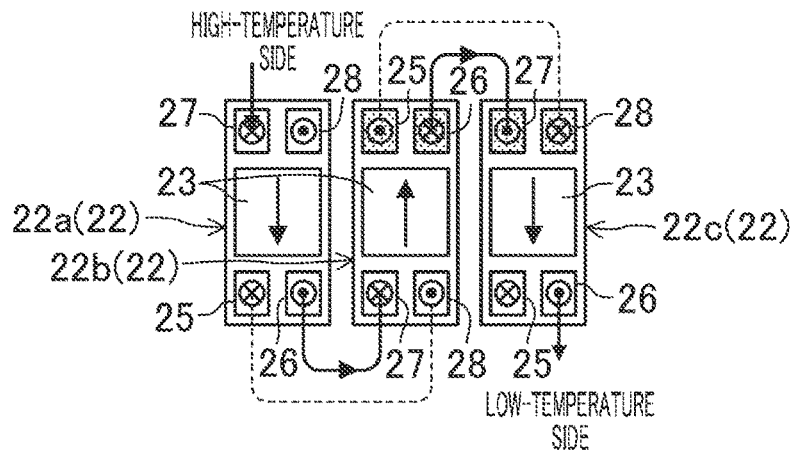
FIG. 18E, FIG. 18F FIG. 18G, FIG. 18H and FIG. 18I are diagrams for describing a flow of the heat medium in the magnetic refrigeration module when the heat medium pump performs a second operation.
Figure 18B:
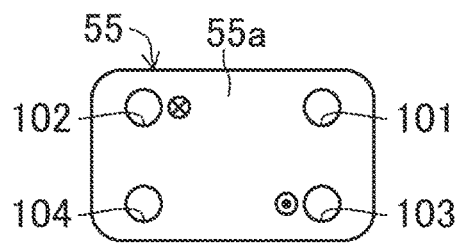
Figure 18C:
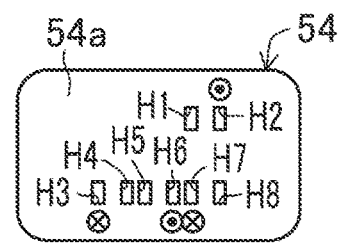
Figure 18D:
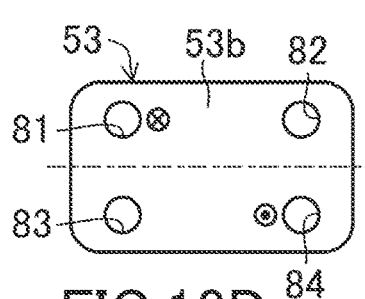
Figure 18E:
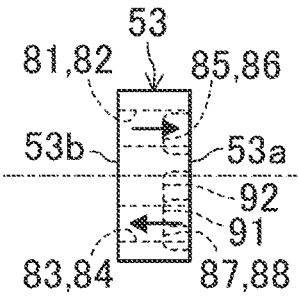
Figure 18F:
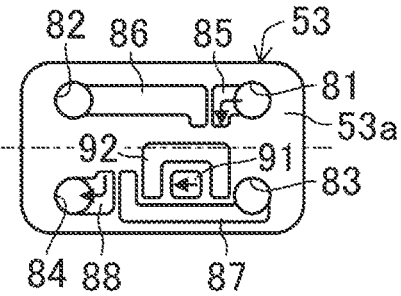
Figure 18G:
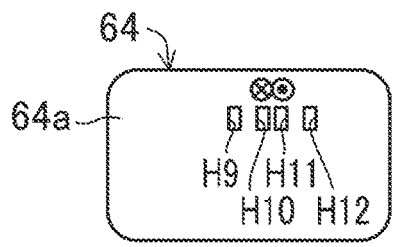
Figure 18H:
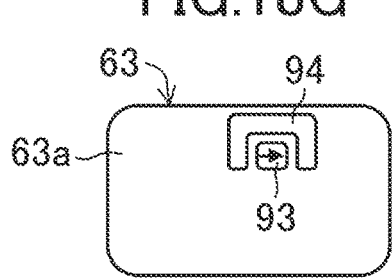
Figure 18I:
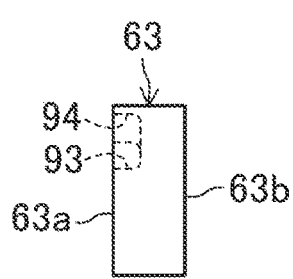
Figure 19:
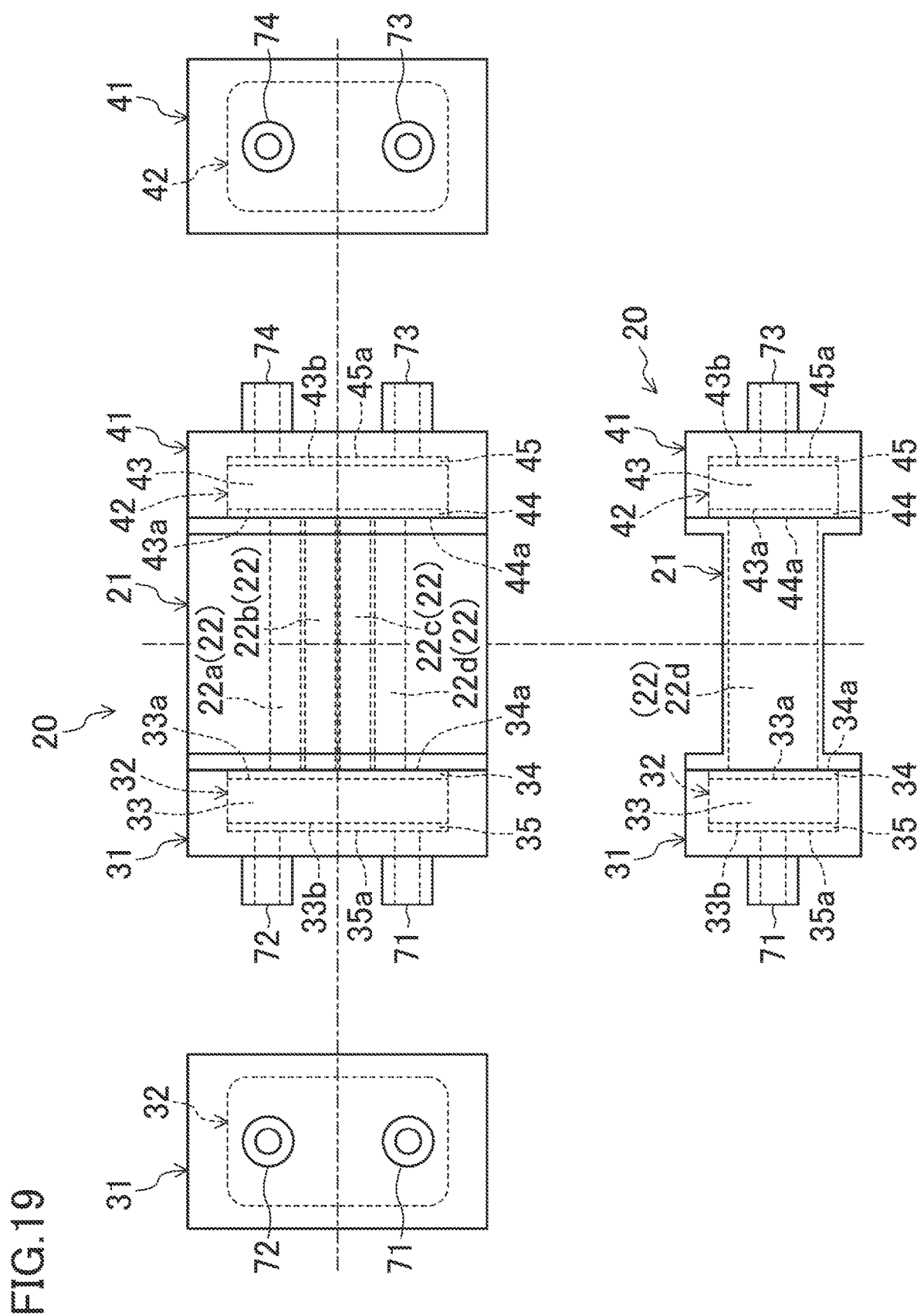
FIG. 19 is a four-side view illustrating a configuration of a magnetic refrigeration module according to Embodiment 3.
Figure 20A:
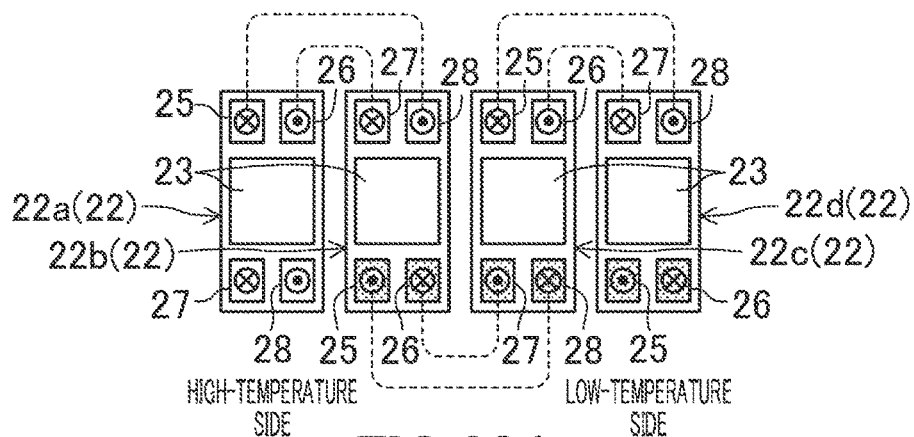
FIG. 20A, FIG. 20B, FIG. 20C, FIG. 20D, FIG. 20E, FIG. 20F, FIG. 20G, FIG. 20H, FIG. 20I, FIG. 20J and FIG. 20K are diagrams illustrating components of the magnetic refrigeration module according to Embodiment 3.
Figure 20B:
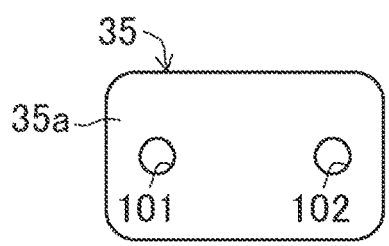
Figure 20C:
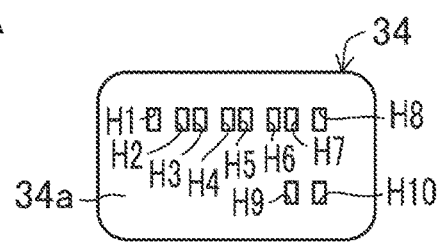
Figure 20D:
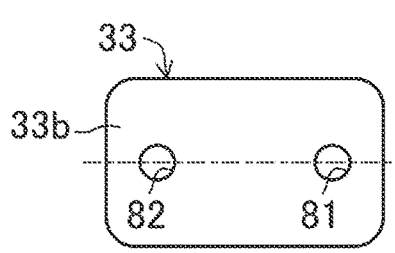
Figures 20E, 20F:
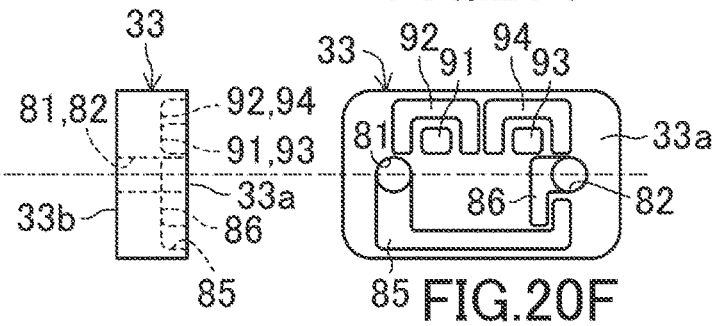
Figure 20G:
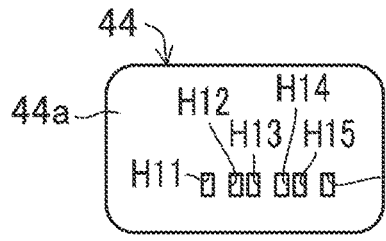
Figure 20H:
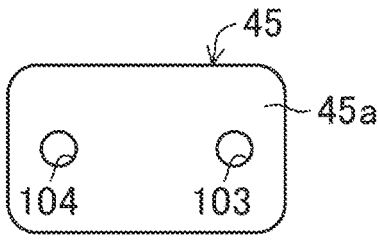
Figure 20I:
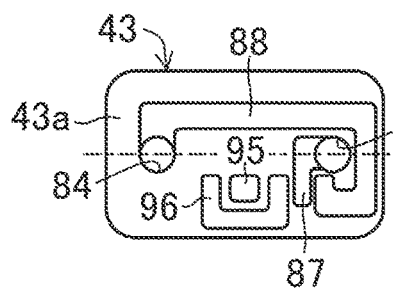
Figure 20J:
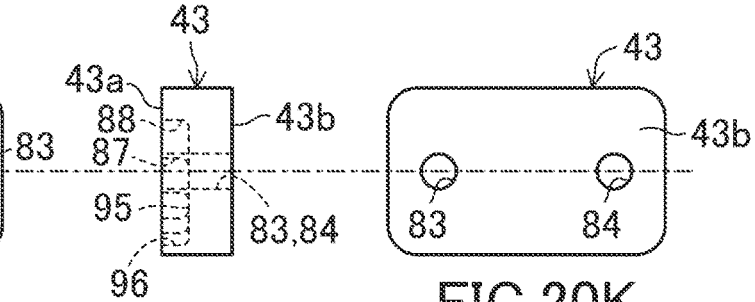
Figure 20K:
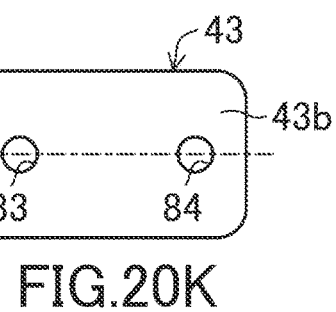
Figure 21A:
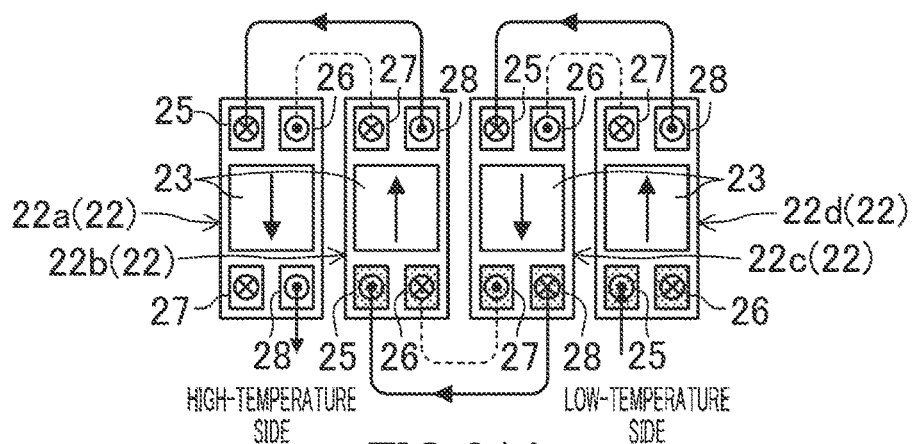
FIG. 21A, FIG. 21B, FIG. 21C, FIG. 21D, FIG. 21E, FIG. 21F, FIG. 21G, FIG. 21H, FIG. 21I, FIG. 21J and FIG. 21K are diagrams for describing a flow of a heat medium in the magnetic refrigeration module when a heat medium pump performs a first operation.
Figure 21B:
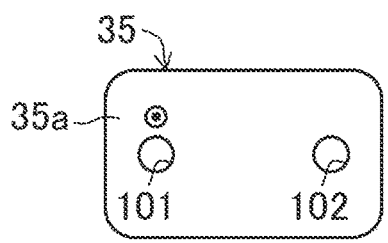
Figure 21C:
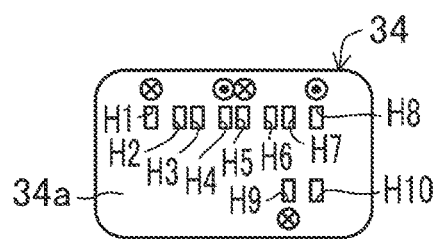
Figure 21D:
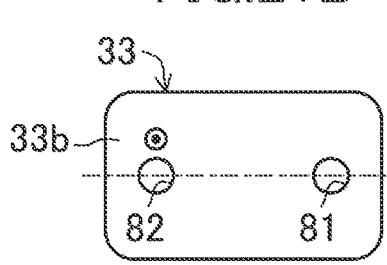
Figures 21E, 21F:
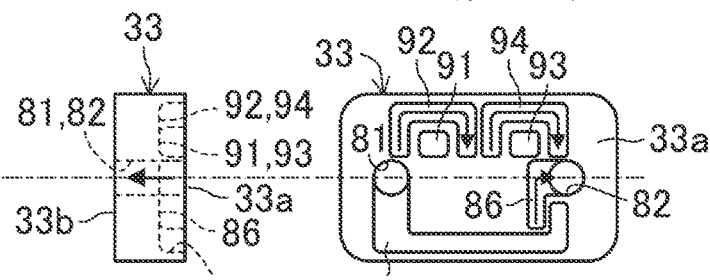
Figure 21G:
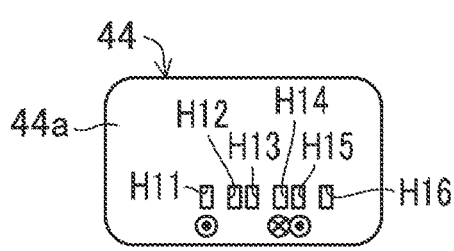
Figure 21H:
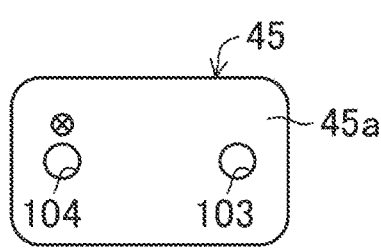
Figures 21I, 21J:
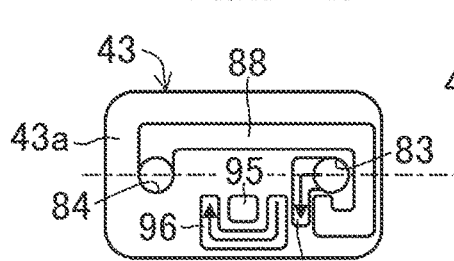
Figure 21K:
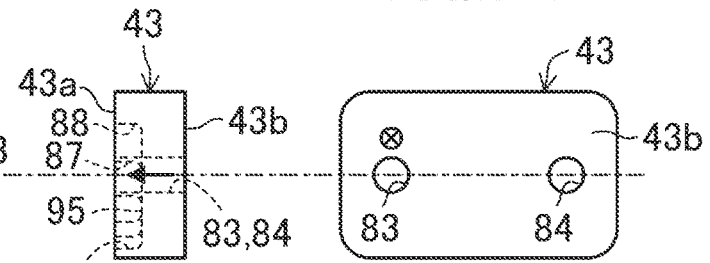
Figure 22A:
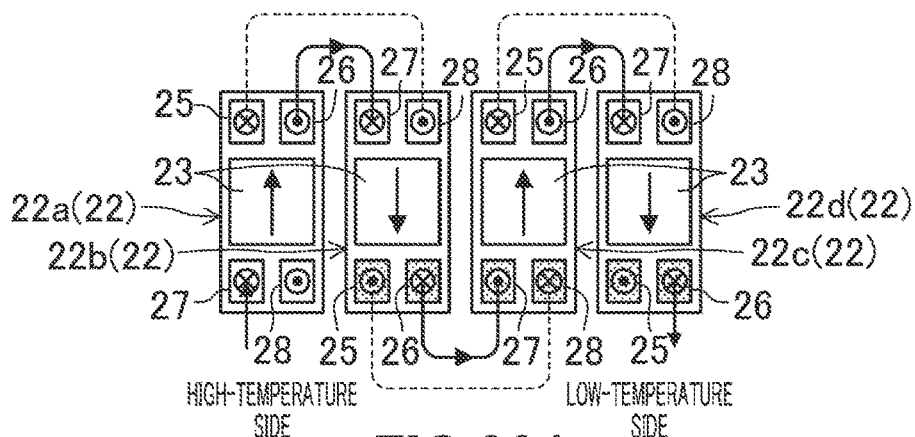
FIG. 22A, FIG. 22B, FIG. 22C, FIG. 22D, FIG. 22E, FIG. 22F, FIG. 22G, FIG. 22H, FIG. 22I, FIG. 22J and FIG. 22K are diagrams for describing a flow of the heat medium in the magnetic refrigeration module when the heat medium pump performs a second operation.
Figure 22B:
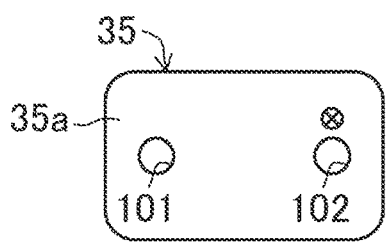
Figure 22C:
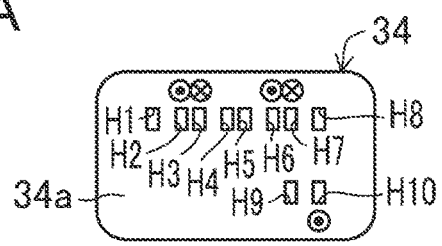
Figure 22D:
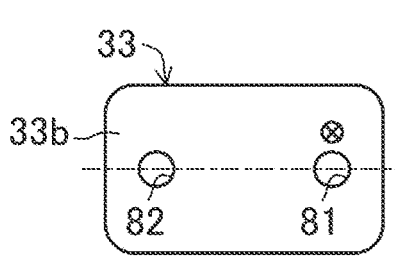
Figures 22E, 22F:
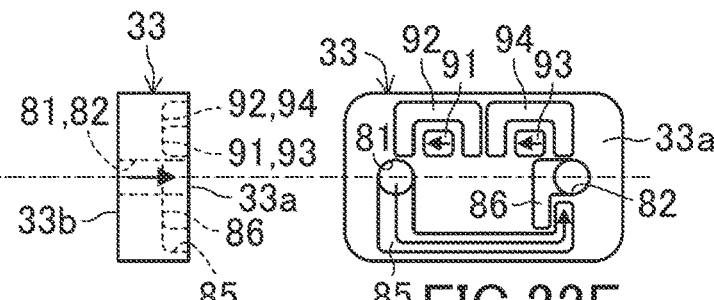
Figure 22G:
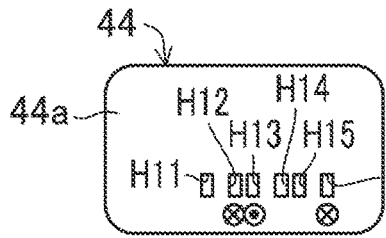
Figure 22H:
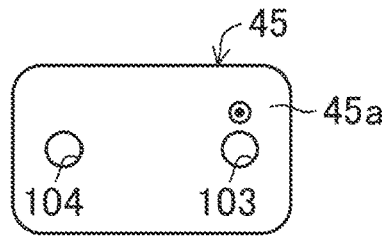
Figure 22I:
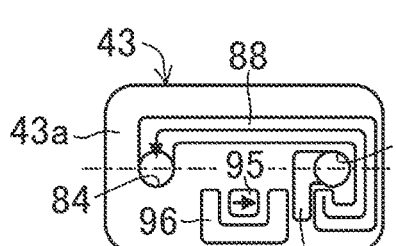
Figures 22J, 22K:
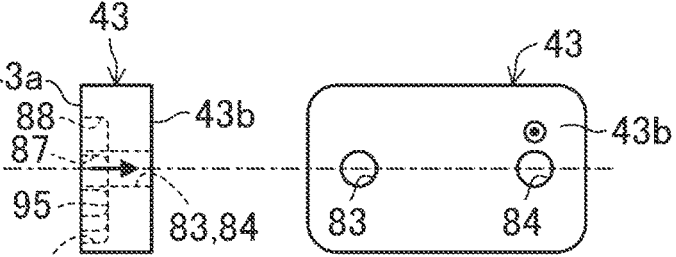

As illustrated in FIG. 15, the common header (52) is disposed in contact with each housing portion (22) in the common header case (51), As illustrated in FIG. 15, the common header (52) includes a common header body (53), a first common packing (54), and a second common packing (55). The common header (52) constitutes a header structure, Common Header Body The common header body (53) is formed in a slightly flat rectangular-parallelepiped shape. The common header body (53) is made of a nonmagnetic material (for example, resin) having a thermal conductivity of 10 W/m or less. The common header body (53) has a front surface (53a) in contact with the first common packing (54) and a back surface (53b) in contact with the second common packing (55). The common header body (53) has a high-temperature-side inflow hole (81), a high-temperature-side outflow hole (82), a low-temperature-side inflow hole (83), and a low-temperature-side outflow hole (84) that are formed to extend through the common header body (53) in a thickness direction (a left-right direction in FIG. 15). In the front surface (53a) of the common header body (53) (in other words, in a vicinity of a first surface inside the common header (52)), a high-temperature internal inflow groove (85), a high-temperature internal outflow groove (86), a low-temperature internal inflow groove (87), a low-temperature internal outflow groove (88), a first series connection groove (91), and a second series connection groove (92) are formed in a single layer structure.

The high-temperature internal inflow groove (85) allows the high-temperature-side inflow hole (81) and a high-temperature-side inflow port (27a) of a first housing portion (22a) (specifically, an inlet of a high-temperature-side inflow path (27) of the first housing portion (22a)) to communicate with each other through the first common packing (54). The high-temperature internal inflow groove (85) has a substantially L-like shape in the front surface (53a) of the common header body (53). The high-temperature internal inflow groove (85) constitutes a high-temperature internal inflow path.

The high-temperature internal outflow groove (86) allows the high-temperature-side outflow hole (82) and a high-temperature-side outflow port (28a) of the first housing portion (22a) (specifically, an outlet of a high-temperature-side outflow path (28) of the first housing portion (22a)) to communicate with each other through the first common packing (54). The high-temperature internal outflow groove (86) has a substantially L-like shape in the front surface (53a) of the common header body (53). The high-temperature internal outflow groove (86) constitutes a high-temperature internal outflow path.

The low-temperature internal inflow groove (87) allows the low-temperature-side inflow hole (83) and a low-temperature-side inflow port (25a) of a third housing portion (22c) (specifically, an inlet of a low-temperature-side inflow path (25) of the third housing portion (22c)) to communicate with each other through the first common packing (54). The low-temperature internal inflow groove (87) has a substantially L-like shape in the front surface (53a) of the common header body (53). The low-temperature internal inflow groove (87) constitutes a low-temperature internal inflow path.

The low-temperature internal outflow groove (88) allows the low-temperature-side outflow hole (84) and a low-temperature-side outflow port (26a) of the third housing portion (22c) (specifically, an outlet of a low-temperature-side outflow path (26) of the third housing portion (22c)) to communicate with each other through the first common packing (54). The low-temperature internal outflow groove (88) has a substantially L-like shape in the front surface (53a) of the common header body (53). The low-temperature internal outflow groove (88) constitutes a low-temperature internal outflow path.

The first series connection groove (91) allows a low-temperature-side outflow port (26a) of the first housing portion((22a) (specifically, an outlet of a low-temperature-side outflow path (26) of the first housing portion (22a)) and a high-temperature-side inflow port (27a) of a second housing portion (22b) (specifically, an inlet of a high-temperature-side inflow path (27) of the second housing portion (22b)) to communicate with each other by series connection through the first common packing (54). The first series connection groove (91) has a rectangular shape in the front surface (53a) of the common header body (53). The first series connection groove (91) constitutes a first series internal flow path.

The second series connection groove (92) allows a low-temperature-side inflow port (25a) of the first housing portion (22a) (specifically, an inlet of a low-temperature-side inflow path (25) of the first housing portion (220) and a high-temperature-side outflow port (28a) of the second housing portion (22b) (specifically, an outlet of a high-temperature-side outflow path (28) of the second housing portion (22b)) to communicate with each other by series connection through the first common packing (54). The second series connection groove (92) has a substantially C-like shape open downward in the front surface (53a) of the common header body (53). The second series connection groove (92) constitutes a second series internal flow path.

First Common Packing

The first common packing (54) is a rectangular plate-shaped resin member. The resin constituting the first common packing (54) is a nonmagnetic material having a thermal conductivity of 10 W/m or less. One side surface of the first common packing (54) is attached to the front surface (530 of the common header body (53). Another side surface (54a) of the first common packing (54) is attached to each housing portion (22). As described above, the first common packing (54), more broadly, the common header (52) integrates the plurality of housing portions (22) with each other. The other side surface (54a) of the first common packing (54) constitutes a first surface of the common header (52) facing each housing portion (22).

First to eighth packing holes (H1 to H8) each having a vertically long rectangular shape are formed in the first common packing (54). The first to eighth packing holes H1 to H8) extend through the first common packing (54) in the thickness direction.

The first packing hole (H1) allows the high-temperature-side outflow port (28a) of the first housing portion (22a) and the high-temperature internal outflow groove (86) of the common header body (53) to communicate with each other. The second packing hole (H2) allows the high-temperature-side inflow port (27a) of the first housing portion (22a) and the high-temperature internal inflow groove (85) of the common header body (53) to communicate with each other. The third packing hole (H3) allows the low-temperature-side outflow port (26a) of the third housing portion (22c) and the low-temperature internal outflow groove (88) of the common header body (53) to communicate with each other. The fourth packing hole (H4) allows the low-temperature-side inflow port (25a) of the third housing portion (22c) and the low-temperature internal inflow groove (87) of the common header body (53) to communicate with each other. The fifth packing hole (H5) allows the high-temperature-side outflow port (28a) of the second housing portion (22b) and the second series connection groove (92) of the common header body (53) to communicate with each other. The sixth packing hole (H6) allows the high-temperature-side inflow port (27a) of the second housing portion (22b) and the first series connection groove (91) of the common header body (53) to communicate with each other. The seventh packing hole (H7) allows the low-temperature-side outflow port (26a) of the first housing portion (22a) and the first series connection groove (91) of the common header body (53) to communicate with each other. The eighth packing hole (H8) allows the low-temperature-side inflow port (25a) of the first housing portion (22a) and the second series connection groove (92) of the common header body (53) to communicate with each other.

With such a configuration, the low-temperature-side outflow path (26) of the first housing portion (22a) and the high-temperature-side inflow path (27) of the second housing portion (22b) are connected to each other in series through the first series connection groove (91). The low-temperature-side inflow path (25) of the first housing portion (22a) and the high-temperature-side outflow path (28) of the second housing portion (22b) are connected to each other in series through the second series connection groove (92). In other words, the first housing portion (22a) and the second housing portion (22b) are connected to each other in series.

Second Common Packing

The second common packing (55) is a rectangular plate-shaped resin member. The resin constituting the second common packing (55) is a nonmagnetic material having a thermal conductivity of 10 W/m or less. One side surface of the second common packing (55) is attached to the back surface (53b) of the common header body (53). Another side surface (55a) of the second common packing (55) constitutes a second surface on the back side of the first surface of the common header (52).

A high-temperature-side outflow packing hole (101), a high-temperature-side inflow packing hole (102), a low-temperature-side outflow packing hole (103), and a low-temperature-side inflow packing hole (104), each of which has a circular shape, are formed in the second common packing (55). The high-temperature-side outflow packing hole (101), the high-temperature-side inflow packing hole (102), the low-temperature-side outflow packing hole (103), and the low-temperature-side inflow packing hole (104) extend through the second common packing (55) in the thickness direction. The high-temperature-side outflow packing hole (101) allows the high-temperature-end outflow port (72) and the high-temperature-side outflow hole (82) of the common header body (53) to communicate with each other. The high-temperature-side inflow packing hole (102) allows the high-temperature-end inflow port (71) and the high-temperature-side inflow hole (81) of the common header body (53) to communicate with each other. The low-temperature-side outflow packing hole (103) allows the low-temperature-end outflow port (74) and the low-temperature-side outflow hole (84) of the common header body (53) to communicate with each other. The low-temperature-side inflow packing hole (104) allows the low-temperature-end inflow port (73) and the low-temperature-side inflow hole (83) of the common header body (53) to communicate with each other.

Connection Header Case

The connection header case (61) houses the connection header (62). As illustrated in FIG. 15, the connection header (62) is disposed in contact with each housing portion (22) inside the connection header case (61). As illustrated in FIG. 15, the connection header (62) includes a connection header body (63) and a connection packing (64). The connection header (62) constitutes a header structure.

Connection Header Body

The connection header body (63) has a slightly flat rectangular-parallelepiped shape. The connection header body (63) is made of a nonmagnetic material (for example, resin) having a thermal conductivity of 10 W/m or less. The connection header body (63) has a front surface (63a) in contact with the connection packing (64) and a back surface (63b) on the back side thereof. In the front surface (63a) of the connection header body (63) (in other words, in a vicinity of a first surface inside the connection header (62)), a third series connection groove (93) and a fourth series connection groove (94) are formed in a single layer structure. The back surface (63c) of the connection header body (63) constitutes a second surface of the connection header (62).

The third series connection groove (93) allows a low-temperature-side outflow port (26a) of the second housing portion (22b) (specifically, an outlet of a low-temperature-side outflow path (26) of the second housing portion (22b)) and a high-temperature-side inflow port (27a) of the third housing portion (22c) (specifically, an inlet of a high-temperature-side inflow path (27) of the third housing portion (22c)) to communicate with each other by series connection through the connection packing (64). The third series connection groove (93) has a rectangular shape in the front surface (63a) of the connection header body (63). The third series connection groove (93) constitutes a first series internal flow path.

The fourth series connection groove (94) allows a low-temperature-side inflow port (25a) of the second housing portion (22b) (specifically, an inlet of a low-temperature-side inflow path (25) of the second housing portion (22b)) and a high-temperature-side outflow port (28a) of the third housing portion (22c) (specifically, an outlet of a high-temperature-side outflow path (28) of the third housing portion (22c)) to communicate with each other by series connection through the connection packing (64). The fourth series connection groove (94) has a substantially C-like shape open downward in the front surface (63a) of the connection header body (63). The fourth series connection groove (94) constitutes a second series internal flow path.

Connection Packing

The connection packing (64) is a rectangular plate-shaped resin member. The resin constituting the connection packing (64) is a nonmagnetic material having a thermal conductivity of 10 W/m or less. One side surface of the connection packing (64) is attached to the front surface (63a) of the connection header body (63). Another side surface (64a) of the connection packing (64) is attached to each housing portion (22). As described above, the connection packing (64), more broadly, the connection header (62) integrates the plurality of to housing portions (22) with each other. The other side surface (64a) of the connection packing (64) constitutes a first surface of the connection header (62) facing each housing portion (22).

Ninth to twelfth packing holes (H9 to H12) each having a vertically long rectangular shape are formed in the connection packing (64). The ninth to twelfth packing holes (H9 to H12) extend through the connection packing (64) in the thickness direction.

The ninth packing hole (H9) allows the low-temperature-side inflow port (25a) of the second housing portion (22b) and the fourth series connection groove (94) of the connection header body (63) to communicate with each other. The tenth packing hole (H10) allows the low-temperature-side outflow port (26a) of the second housing portion (22b) and the third series connection groove (93) of the connection header body (63) to communicate with each other. The eleventh packing hole (H11) allows the high-temperature-side inflow port (27a) of the third housing portion (22c) and the third series connection groove (93) of the connection header body (63) to communicate with each other. The twelfth packing hole (H12) allows the high-temperature-side outflow port (28a) of the third housing portion (22c) and the fourth series connection groove (94) of the connection header body (63) to communicate with each other.

With such a configuration, the low-temperature-side outflow path (26) of the second housing portion (22b) and the high-temperature-side inflow path (27) of the third housing portion (22c) are connected to each other in series through the third series connection groove (93). The low-temperature-side inflow path (25) of the second housing portion (22b) and the high-temperature-side outflow path (28) of the third housing portion (22c) are connected to each other in series through the fourth series connection groove (94). In other words, the second housing portion (22b) and the third housing portion (22c) are connected to each other in series.

Flow of Heat Medium in Magnetic Refrigeration Module

A description is given of a flow of the heat medium in the magnetic refrigeration module (20) when the air conditioning system (10) is operated, more specifically, when the heat medium pump (130) performs the first operation or the second operation.

As illustrated in FIGS. 17A to 17I, when the heat medium pump (130) performs the first operation, the heat medium flows from the low-temperature side to the high-temperature side in the magnetic refrigeration module (20). Specifically, in the magnetic refrigeration module (20), the heat medium having flowed in from the low-temperature-end inflow port (73) flows into the low-temperature-side inflow hole (83) of the common header body (53). The heat medium having flowed out of the low-temperature-side inflow hole (83) of the common header body (53) flows into the low-temperature-side inflow path (25) of the third housing portion (22c) through the low-temperature internal inflow groove (87) of the common header body (53). The heat medium having flowed out of the low-temperature-side inflow path (25) of the third housing portion (22c) flows through the magnetic working substances (23) in the third housing portion (22c) and then flows into the high-temperature-side outflow path (28) of the third housing portion (22c).

The heat medium having flowed out of the high-temperature-side outflow path (28) of the third housing portion (22c) flows into the low-temperature-side inflow path (25) of the second housing portion (22b) through the fourth series connection groove (94) of the connection header body (63). The heat medium having flowed out of the low-temperature-side inflow path (25) of the second housing portion (22b) flows through the magnetic working substances (23) in the second housing portion (22b) and then flows into the high-temperature-side outflow path (28) of the second housing portion (22b).

The heat medium having flowed out of the high-temperature-side outflow path (28) of the second housing portion (22b) flows into the low-temperature-side inflow path (25) of the first housing portion (22a) through the second series connection groove (92) of the common header body (53). The heat medium having flowed out of the low-temperature-side inflow path (25) of the first housing portion (22a) flows through the magnetic working substances (23) in the first housing portion (22a) and then flows into the high-temperature-side outflow path (28) of the first housing portion (22a). The heat medium having flowed out of the high-temperature-side outflow path (28) of the first housing portion (22a) flows into the high-temperature-side outflow hole (82) of the common header body (53) through the high-temperature internal outflow groove (86) of the common header body (53). The heat medium having flowed out of the high-temperature-side outflow hole (82) of the common header body (53) flows to the outside of the magnetic refrigeration module (20) through the high-temperature-end outflow port (72).

As illustrated in FIGS. 18A to 18I, when the heat medium pump (130) performs the second operation, the heat medium flows from the high-temperature side to the low-temperature side in the magnetic refrigeration module (20). Specifically, in the magnetic refrigeration module (20), the heat medium having flowed in from the high-temperature-end inflow port (71) flows into the high-temperature-side inflow hole (81) of the common header body (53). The heat medium having flowed out of the high-temperature-side inflow hole (81) of the common header body (53) flows into the high-temperature-side inflow path (27) of the first housing portion (22a) through the high-temperature internal inflow groove (85) of the common header body (53). The heat medium having flowed out of the high-temperature-side inflow path (27) of the first housing portion (22a) flows through the magnetic working substances (23) in the first housing portion (22a) and then flows into the low-temperature-side outflow path (26) of the first housing portion (22a).

The heat medium having flowed out of the low-temperature-side outflow path (26) of the first housing portion (22a) flows into the high-temperature-side inflow path (27) of the second housing portion (22b) through the first series connection groove (91) of the common header body (53). The heat medium having flowed out of the high-temperature-side inflow path (27) of the second housing portion (22b) flows through the magnetic working substances (23) in the second housing portion (22b) and then flows into the low-temperature-side outflow path (26) of the second housing portion (22b).

The heat medium having flowed out of the low-temperature-side outflow path (26) of the second housing portion (22b) flows into the high-temperature-side inflow path (27) of the third housing portion (22c) through the third series connection groove (93) of the connection header body (63). The heat medium having flowed out of the high-temperature-side inflow path (27) of the third housing portion (22c) flows through the magnetic working substances (23) in the third housing portion (22c) and then flows into the low-temperature-side outflow path (26) of the third housing portion (22c). The heat medium having flowed out of the low-temperature-side outflow path (26) of the third housing portion (22c) flows into the low-temperature-side outflow hole (84) of the common header body (53) through the low-temperature internal outflow groove (88) of the common header body (53). The heat medium having flowed out of the low-temperature-side outflow hole (84) of the common header body (53) flows to the outside of the magnetic refrigeration module (20) through the low-temperature-end outflow port (74).

Effects of Modification of Embodiment 2

Also with the magnetic refrigeration module (20) according to the present modification, advantageous effects similar to those of Embodiment 2 described above are obtained.

In the magnetic refrigeration module (20) according to the present modification, the low-temperature-side inflow port (25a) and the low-temperature-side outflow port (26a) of each of the housing portions (22) disposed on a most low-temperature side, and the high-temperature-side inflow port (27a) and the high-temperature-side outflow port (28a) of each of the housing portions (22) disposed on a most high-temperature side are disposed on one side in the magnetic refrigeration module (20). With this configuration, since the four ports (25a to 28a) are on the one side of the magnetic refrigeration module (20), respective pipes or the like that are connected to the four ports (25a to 28a) can be easily installed.

In the magnetic refrigeration module (20) according to the present modification, the header structure (32, 42, 52, 62) includes a common header (52) having the low-temperature internal inflow path (87), the low-temperature internal outflow path (88), the high-temperature internal inflow path (85), and the high-temperature internal outflow path (86); and a connection header (62) having the first series internal flow path (91, 93, 95, 97) and the second series internal flow path (92, 94, 96, 98). With this configuration, the heat medium flows from the common header (52) through the plurality of housing portions (22) and the connection header (62) to the common header (52).

In the magnetic refrigeration module (20) according to the present modification, the header structure (32, 42, 52, 62) includes the common header (52) and the connection header (62); the low-temperature internal inflow path (87), the low-temperature internal outflow path (88), the high-temperature internal inflow path (85), and the high-temperature to internal outflow path (86) are constituted by a single layer structure provided at the common header (52); and the first series internal flow path (91, 93, 95, 97) and the second series internal flow path (92, 94, 96, 98) are constituted by a single layer structure provided at the connection header (62). With this configuration, the heat medium flows from the common header (52) through the plurality of housing portions (22) and the connection header (62) to the common header (52). When the low-temperature internal inflow path (87), the low-temperature internal outflow path (88), the high-temperature internal inflow path (85), and the high-temperature internal outflow path (86), or the first series internal flow path (91, 93, 95, 97) and the second series internal flow path (92, 94, 96, 98) are constituted by the single layer structure, the common header (52) or the connection header (62) can be easily manufactured.

In the magnetic refrigeration module (20) according to the present modification, each of the common header (52) and the connection header (62) has a first surface (54a, 64a) facing the housing portion (22) and a second surface (55a, 63b) on a back side of the first surface (54a, 64a); the low-temperature internal inflow path (87), the low-temperature internal outflow path (88), the high-temperature internal inflow path (85), and the high-temperature internal outflow path (86) that have the single layer structure are constituted by grooves (85 to 88) formed in a vicinity of the first surface (54a) inside the common header (52); and the first series internal flow path (91, 93, 95, 97) and the second series internal flow path (92, 94, 96, 98) that have the single layer structure are constituted by grooves (91 to 98) formed in a vicinity of the first surface (64a) inside the connection header (62). With this configuration, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) that have the single layer structure can be attained by a simple configuration of the grooves (85 to 88, 91 to 98) formed inside the common header (52) or the connection header (62).

Improvement of Modification of Embodiment 2

Backflow Prevention Portion

In the magnetic refrigeration module (20) according to the modification of Embodiment 2 illustrated in FIGS. 16A to 16I and so forth, flow paths for connecting the housing portions (22) to each other in series are separated into a forward path and a return path, but in practice, the heat medium can flow in both directions. Thus, performance deteriorates due to the flow paths becoming a dead volume.

Figure 36:
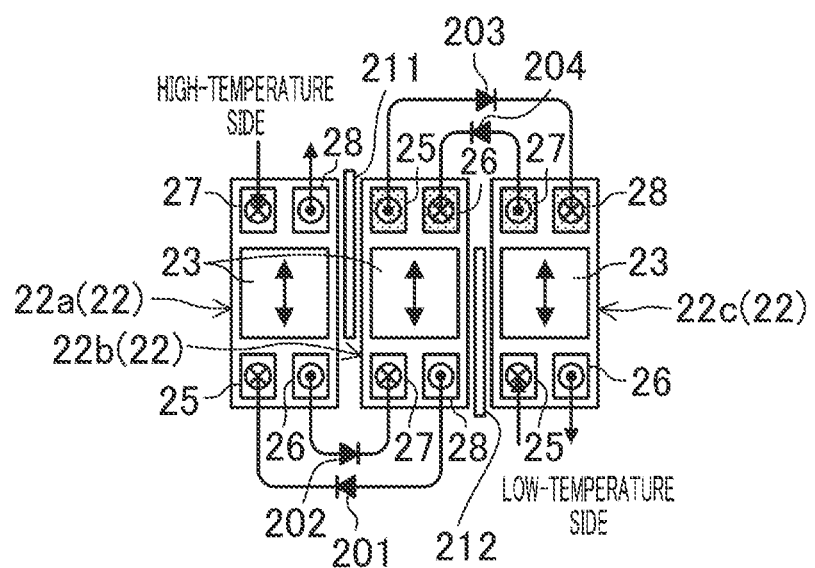
FIG. 36 is a diagram illustrating a state in which a backflow prevention portion and a heat insulating layer are further provided in the magnetic refrigeration module illustrated in FIGS. 16A to 16I.

Hence, as illustrated in FIG. 36, backflow prevention portions (201, 202, 203, 204) constituted by, for example, check valves may be provided in series connection portions (four portions) where the housing portions (22) are connected in series. In FIG. 36, the same components as those of the modification of Embodiment 2 illustrated in FIGS. 16A to 16I are denoted by the same reference numerals.

Specifically, a first backflow prevention portion (201) may be disposed in a portion where the low-temperature-side inflow port (25a) (the inlet of the low-temperature-side inflow path (25)) of the first housing portion (22a) and the high-temperature-side outflow port (28a) (the outlet of the high-temperature-side outflow path (28)) of the second housing portion (22b) are connected in series. A second backflow prevention portion (202) may be disposed in a portion where the low-temperature-side outflow port (26a) (the outlet of the low-temperature-side outflow path (26)) of the first housing portion (22a) and the high-temperature-side inflow port (27a) (the inlet of the high-temperature-side inflow path (27)) of the second housing portion (22b) are connected in series. A third backflow prevention portion (203) may be disposed in a portion where a low-temperature-side outflow port (25b) (an outlet of the low-temperature-side inflow path (25)) of the second housing portion (22b) and a high-temperature-side inflow port (28b) (an inlet of the high-temperature-side outflow path (28)) of the third housing portion are connected in series. A fourth backflow prevention portion (204) may be disposed in a portion where a low-temperature-side inflow port (26b) (an inlet of the low-temperature-side outflow path (26)) of the second housing portion (22b) and a high-temperature-side outflow port (27b) (an outlet of the high-temperature-side inflow path (27)) of the third housing portion (22c) are connected in series.

Thus, the directions in which the heat medium flows in the flow paths (25 to 28) of each housing portion (22) can be determined, thereby suppressing a deterioration in performance due to the flow paths (25 to 28) becoming a dead volume.

Although, in the configuration illustrated in FIG. 36, the backflow prevention portions (201, 202, 203, 204) are provided in all series connection portions where the housing portions (22) are connected in series, at least one of the backflow prevention portions (201, 202, 203, 204) may be provided instead. Also in this case, it is possible to suppress a deterioration in performance due to the dead volume as compared with a case where the backflow prevention portions (201, 202, 203, 204) are not provided at all.

In the configuration illustrated in FIG. 36, the first backflow prevention portion (201) may be connected to at least one of the low-temperature-side inflow port (25a) (the inlet of the low-temperature-side inflow path (25)) of the first housing portion (22a) and the high-temperature-side outflow port (28a) (the outlet of the high-temperature-side outflow path (28)) of the second housing portion (22b). The second backflow prevention portion (202) may be connected to at least one of the low-temperature-side outflow port (26a) (the outlet of the low-temperature-side outflow path (26)) of the first housing portion (22a) and the high-temperature-side inflow port (27a) (the inlet of the high-temperature-side inflow path (27)) of the second housing portion (22b). The third backflow prevention portion (203) may be connected to at least one of the low-temperature-side outflow port (25b) (the outlet of the low-temperature-side inflow path (25)) of the second housing portion (22b) and the high-temperature-side inflow port (28b) (the inlet of the high-temperature-side outflow path (28)) of the third housing portion (22c). The fourth backflow prevention portion (204) may be connected to at least one of the low-temperature-side inflow port (26b) (the inlet of the low-temperature-side outflow path (26)) of the second housing portion (22b) and the high-temperature-side outflow port (27b) (the outlet of the high-temperature-side inflow path (27)) of the third housing portion (22c). In this way, as described in Embodiment 1 (see FIGS. 32 and 33A to 33C), the backflow prevention portion (201, 202, 203, 204) can be installed inside the header structure (52, 62) at a position located upstream of the structure for series connection.

Heat Insulating Layer

In the magnetic refrigeration module (20) according to the present modification illustrated in FIGS. 16A to 16I and so forth, when the housing portions (22) or the flow paths (25 to 28) having different temperatures are adjacent to each other, a heat leakage occurs and performance deteriorates.

Hence, as illustrated in FIG. 36, heat insulating layers (211, 212) may be provided between the housing portions (22) connected in series. The heat insulating layers (211, 212) may be constituted by heat insulators, slits, or the like. Part of the housing portions (22) may be constituted by heat insulating members serving as the heat insulating layers (211, 212). The heat insulating layers (211, 212) may be provided entirely between the housing portions (22) connected in series or may be provided partly between the housing portions (22) connected in series. In the configuration illustrated in FIG. 36, the first heat insulating layer (211) is provided between the magnetic working substances (23) in the first housing portion (22a) and the magnetic working substances (23) in the second housing portion (22b) through which the heat medium flows at different temperatures, and between the high-temperature-side outflow path (28) of the first housing portion (22a) and the low-temperature-side inflow path (25) of the second housing portion (22b) through which the heat medium flows at different temperatures. The second heat insulating layer (212) is provided between the magnetic working substances (23) in the second housing portion (22b) and the magnetic working substances (23) in the third housing portion (22c) through which the heat medium flows at different temperatures, and between the high-temperature-side outflow path (28) of the second housing portion (22b) and the low-temperature-side inflow path (25) of the third housing portion (22c) through which the heat medium flows at different temperatures.

Accordingly, a deterioration in performance due to a heat leakage can be suppressed even when the housing portions (22) (magnetic working substances (23)) or the flow paths (25 to 28) having different temperatures are adjacent to each other. In other words, a deterioration in performance due to a heat leakage between the housing portions (22) through which the heat medium flows at different temperatures can be suppressed.

Embodiment 3

Embodiment 3 will be described. A magnetic refrigeration module (20) according to the present embodiment is different from that of Embodiment 1 in the number of housing portions (22), Differences from Embodiment 1 will be mainly described below, Housing Portion Case As illustrated in FIGS. 19 to 22K, four housing portions (22) are housed in a housing portion case (21). The housing portion case (21) has four through holes (21a). Each through hole (21a) houses one housing portion (22), Hereinafter, the four housing portions (22) according to the present embodiment may be referred to as a first housing portion (22a), a second housing portion (22b), a third housing portion (22c), and a fourth housing portion (22d) in this order from the left side to the right side in FIG. 20A. The first housing portion (22a) constitutes a housing portion disposed on a most high-temperature side. The fourth housing portion (22d) constitutes a housing portion disposed on a most low-temperature side.

High-Temperature-Side Header

A high-temperature-side header (32) is different from that of Embodiment 1 described above in the configurations of a high-temperature-side header body (33) and a first high-temperature-side packing (34). The configuration of a second high-temperature-side packing (35) is the same as that of Embodiment 1 described above.

High-Temperature-Side Header Body

In a front surface (33a) of the high-temperature-side header body (33) (in other words, in a vicinity of a first surface inside the high-temperature-side header (32)), a high-temperature internal inflow groove (85), a high-temperature internal outflow groove (86), a first series connection groove (91), a second series connection groove (92), a third series connection groove (93), and a fourth series connection groove (94) are formed in a single layer structure.

The high-temperature internal inflow groove (85) allows a high-temperature-side inflow hole (81) and a high-temperature-side inflow port (27a) of the first housing portion (22a) (specifically, an inlet of a high-temperature-side inflow path (27) of the first housing portion (22a)) with each other through the first high-temperature-side packing (34). The high-temperature internal inflow groove (85) has a substantially C-like shape open upward in the front surface (33a) of the high-temperature-side header body (33). The high-temperature internal inflow groove (85) constitutes a high-temperature internal inflow path.

The high-temperature internal outflow groove (86) allows a high-temperature-side outflow hole (82) and a high-temperature-side outflow port (28a) of the first housing portion (22a) (specifically, an outlet of a high-temperature-side outflow path (28) of the first housing portion (22a)) to communicate with each other through the first high-temperature-side packing (34). The high-temperature internal outflow groove (86) has a substantially L-like shape in the front surface (33a) of the high-temperature-side header body (33). The high-temperature internal outflow groove (86) constitutes a high-temperature internal outflow path.

The first series connection groove (91) allows a low-temperature-side outflow port (26a) of the third housing portion (22c) (specifically, an outlet of a low-temperature-side outflow path (26) of the third housing portion (22c)) and a high-temperature-side inflow port (27a) of the fourth housing portion (22d) (specifically, an inlet of a high-temperature-side inflow path (27) of the fourth housing portion (22d)) to communicate with each other by series connection through the first high-temperature-side packing (34). The first series connection groove (91) has a rectangular shape in the front surface (33a) of the high-temperature-side header body (33). The first series connection groove (91) constitutes a first series internal flow path.

The second series connection groove (92) allows a low-temperature-side inflow port (25a) of the third housing portion (22c) (specifically, an inlet of a low-temperature-side inflow path (25) of the third housing portion (22c)) and a high-temperature-side outflow port (28a) of the fourth housing portion (22d) (specifically, an outlet of a hightemperature-side outflow path (28) of the fourth housing portion (22d)) to communicate with each other by series connection through the first high-temperature-side packing (34). The second series connection groove (92) has a substantially C-like shape open downward in the front surface (33a) of the high-temperature-side header body (33). The second series connection groove (92) constitutes a second series internal flow path, The third series connection groove (93) allows a low-temperature-side outflow port (26a) of the first housing portion (22a) (specifically, an outlet of a low-temperature-side outflow path (26) of the first housing portion (22a)) and a high-temperature-side inflow port (27a) of the second housing portion (22b) (specifically, an inlet of a high-temperature-side inflow path (27) of the second housing portion (22b)) to communicate with each other by series connection through the first high-temperature-side packing (34). The third series connection groove (93) has a rectangular shape in the front surface (33a) of the high-temperature-side header body (33). The third series connection groove (93) constitutes a first series internal flow path, The fourth series connection groove (94) allows a low-temperature-side inflow port (25a) of the first housing portion (22a) (specifically, an inlet of a low-temperature-side inflow path (25) of the first housing portion (22a)) and a high-temperature-side outflow port (28a) of the second housing portion (22b) (specifically, an outlet of a high-temperature-side outflow path (28) of the second housing portion (22b)) to communicate with each other by series connection through the first high-temperature-side packing (34). The fourth series connection groove (94) has a substantially C-like shape open downward in the front surface (33a) of the high-temperature-side header body (33). The fourth series connection groove (94) constitutes a second series internal flow path, First High-Temperature-Side Packing First to tenth packing holes (H1 to H10) each having a vertically long rectangular shape are formed in the first high-temperature-side packing (34). The first to tenth packing holes (H1 to H10) extend through the first high-temperature-side packing (34) in the thickness direction.

The first packing hole (H1) allows the high-temperature-side outflow port (28a) of the fourth housing portion (22d) and the second series connection groove (92) of the high-temperature-side header body (33) to communicate with each other. The second packing hole (H2) allows the high-temperature-side inflow port (27a) of the fourth housing portion (22d) and the first series connection groove (91) of the high-temperature-side header body (33) to communicate with each other. The third packing hole (H3) allows the low-temperature-side outflow port (26a) of the third housing portion (22c) and the first series connection groove (91) of the high-temperature-side header body (33) to communicate with each other. The fourth packing hole (H4) allows the low-temperature-side inflow port (25a) of the third housing portion (22c) and the second series connection groove (92) of the high-temperature-side header body (33) to communicate with each other, With such a configuration, the low-temperature-side outflow path (26) of the third housing portion (22c) and the high-temperature-side inflow path (27) of the fourth housing portion (22d) are connected to each other in series through the first series connection groove (91). The low-temperature-side inflow path (25) of the third housing portion (22c) and the high-temperature-side outflow path (28) of the fourth housing portion (22d) are connected to each other in series through the second series connection groove (92). In other words, the third housing portion (22c) and the fourth housing portion (22d) are connected to each other in series.

The fifth packing hole (H5) allows the high-temperature-side outflow port (28a) of the second housing portion (22b) and the fourth series connection groove (94) of the high-temperature-side header body (33) to communicate with each other. The sixth packing hole (H6) allows the high-temperature-side inflow port (27a) of the second housing portion (22b) and the third series connection groove (93) of the high-temperature-side header body (33) to communicate with each other. The seventh packing hole (H7) allows the low-temperature-side outflow port (26a) of the first housing portion (22a) and the third series connection groove (93) of the high-temperature-side header body (33) to communicate with each other. The eighth packing hole (H8) allows the low-temperature-side inflow port (25a) of the first housing portion (22a) and the fourth series connection groove (94) of the high-temperature-side header body (33) to communicate with each other. The ninth packing hole (H9) allows the high-temperature-side outflow port (28a) of the first housing portion (22a) and the high-temperature internal outflow groove (86) of the high-temperature-side header body (33) to communicate with each other. The tenth packing hole (H10) allows the high-temperature-side inflow port (27a) of the first housing portion (22a) and the high-temperature internal inflow groove (85) of the high-temperature-side header body (33) to communicate with each other.

With such a configuration, the low-temperature-side outflow path (26) of the first housing portion (22a) and the high-temperature-side inflow path (27) of the second housing portion (22b) are connected to each other in series through the third series connection groove (93). The low-temperature-side inflow path (25) of the first housing portion (22a) and the high-temperature-side outflow path (28) of the second housing portion (22b) are connected to each other in series through the fourth series connection groove (94). In other words, the first housing portion (22a) and the second housing portion (22b) are connected to each other in series.

Low-Temperature-Side Header

A low-temperature-side header (42) is different from that of Embodiment 1 described above in the configurations of a low-temperature-side header body (43) and a first low-temperature-side packing (44). The configuration of a second low-temperature-side packing (45) is the same as that of Embodiment 1 described above.

Low-Temperature-Side Header Body

In a front surface (43a) of the low-temperature-side header body (43) (in other words, in a vicinity of a first surface inside the low-temperature-side header (42)), a low-temperature internal inflow groove (87), a low-temperature internal outflow groove (88), a fifth series connection groove (95), and a sixth series connection groove (96) are formed in a single layer structure.

The low-temperature internal inflow groove (87) allows a low-temperature-side inflow hole (83) and a low-temperature-side inflow port (25a) of the fourth housing portion (22d) (specifically, an inlet of a low-temperature-side inflow path (25) of the fourth housing portion (22d)) to communicate with each other through the first low-temperature-side packing (44). The low-temperature internal inflow groove (87) has a substantially L-like shape in the front surface (43a) of the low-temperature-side header body (43). The low-temperature internal inflow groove (87) constitutes a low-temperature internal inflow path.

The low-temperature internal outflow groove (88) allows a low-temperature-side outflow hole (84) and a low-temperature-side outflow port (26a) of the fourth housing portion (22d) (specifically, an outlet of a low-temperature-side outflow path (26) of the fourth housing portion (22d)) to communicate with each other through the first low-temperature-side packing (44). The low-temperature internal outflow groove (88) has a substantially J-like shape in the front surface (43a) of the low-temperature-side header body (43). The low-temperature internal outflow groove (88) constitutes a low-temperature internal outflow path.

The fifth series connection groove (95) allows a low-temperature-side outflow port (26a) of the second housing portion (22b) (specifically, an outlet of a low-temperature-side outflow path (26) of the second housing portion (22b)) and a high-temperature-side inflow port (27a) of the third housing portion (22c) (specifically, an inlet of a high-temperature-side inflow path (27) of the third housing portion (22c)) to communicate with each other by series connection through the first low-temperature-side packing (44). The fifth series connection groove (95) has a rectangular shape in the front surface (43a) of the low-temperature-side header body (43). The fifth series connection groove (95) constitutes a first series internal flow path.

The sixth series connection groove (96) allows a low-temperature-side inflow port (25a) of the second housing portion (22b) (specifically, an inlet of a low-temperature-side inflow path (25) of the second housing portion (22b)) and a high-temperature-side outflow port (28a) of the third housing portion (22c) (specifically, an outlet of a high-temperature-side outflow path (28) of the third housing portion (22c)) to communicate with each other by series connection through the first low-temperature-side packing (44). The sixth series connection groove (96) has a substantially C-like shape open upward in the front surface (43a) of the low-temperature-side header body (43). The sixth series connection groove (96) constitutes a second series internal flow path, First Low-Temperature-Side Packing Eleventh to sixteenth packing holes (H11 to H16) each having a vertically long rectangular shape are formed in the first low-temperature-side packing (44). The eleventh to sixteenth packing holes (H11 to H16) extend through the first low-temperature-side packing (44) in the thickness direction. The eleventh packing hole (H11) allows the low-temperature-side inflow port (25a) of the second housing portion (22b) and the sixth series connection groove (96) of the low-temperature-side header body (43) to communicate with each other. The twelfth packing hole (H12) allows the low-temperature-side outflow port (26a) of the second housing portion (22b) and the fifth series connection groove (95) of the low-temperature-side header body (43) to communicate with each other. The thirteenth packing hole (H13) allows the high-temperature-side inflow port (27a) of the third housing portion (22c) and the fifth series connection groove (95) of the low-temperature-side header body (43) to communicate with each other. The fourteenth packing hole (H14) allows the high-temperature-side outflow port (28a) of the third housing portion (22c) and the sixth series connection groove (96) of the low-temperature-side header body (43) to communicate with each other. The fifteenth packing hole (H15) allows the low-temperature-side inflow port (25a) of the fourth housing portion (22d) and the low-temperature internal inflow groove (87) of the low-temperature-side header body (43) to communicate with each other. The sixteenth packing hole (H16) allows the low-temperature-side outflow port (26a) of the fourth housing portion (22d) and the low-temperature internal outflow groove (88) of the low-temperature-side header body (43) to communicate with each other, With such a configuration, the low-temperature-side outflow path (26) of the second housing portion (22b) and the high-temperature-side inflow path (27) of the third housing portion (22c) are connected to each other in series through the fifth series connection groove (95). The low-temperature-side inflow path (25) of the second housing portion (22b) and the high-temperature-side outflow path (28) of the third housing portion (22c) are connected to each other in series through the sixth series connection groove (96). In other words, the second housing portion (22b) and the third housing portion (22c) are connected to each other in series.

Flow of Heat Medium in Magnetic Refrigeration Module

A description is given of a flow of the heat medium in the magnetic refrigeration module (20) when the air conditioning system (10) is operated, more specifically, when the heat medium pump (130) performs the first operation or the second operation.

As illustrated in FIGS. 21A to 21K, when the heat medium pump (130) performs the first operation, the heat medium flows from the low-temperature side to the high-temperature side in the magnetic refrigeration module (20). Specifically, in the magnetic refrigeration module (20), the heat medium having flowed in from the low-temperature-end inflow port (73) flows into the low-temperature-side inflow hole (83) of the low-temperature-side header body (43). The heat medium having flowed out of the low-temperature-side inflow hole (83) of the low-temperature-side header body (43) flows into the low-temperature-side inflow path (25) of the fourth housing portion (22d) through the low-temperature internal inflow groove (87) of the low-temperature-side header body (43). The heat medium having flowed out of the low-temperature-side inflow path (25) of the fourth housing portion (22d) flows through the magnetic working substances (23) in the fourth housing portion (22d) and then flows into the high-temperature-side outflow path (28) of the fourth housing portion (22d).

The heat medium having flowed out of the high-temperature-side outflow path (28) of the fourth housing portion (22d) flows into the low-temperature-side inflow path (25) of the third housing portion (22c) through the second series connection groove (92) of the high-temperature-side header body (33). The heat medium having flowed out of the low-temperature-side inflow path (25) of the third housing portion (22c) flows through the magnetic working substances (23) in the third housing portion (22c) and then flows into the high-temperature-side outflow path (28) of the third housing portion (22c).

The heat medium having flowed out of the high-temperature-side outflow path (28) of the third housing portion (22c) flows into the low-temperature-side inflow path (25) of the second housing portion (22b) through the sixth series connection groove (96) of the low-temperature-side header body (43). The heat medium having flowed out of the low-temperature-side inflow path (25) of the second housing portion (22b) flows through the magnetic working substances (23) in the second housing portion (22b) and then flows into the high-temperature-side outflow path (28) of the second housing portion (22b).

The heat medium having flowed out of the high-temperature-side outflow path (28) of the second housing portion (22b) flows into the low-temperature-side inflow path (25) of the first housing portion (22a) through the fourth series connection groove (94) of the high-temperature-side header body (33). The heat medium having flowed out of the low-temperature-side inflow path (25) of the first housing portion (22a) flows through the magnetic working substances (23) in the first housing portion (22a) and then flows into the high-temperature-side outflow path (28) of the first housing portion (22a). The heat medium having flowed out of the high-temperature-side outflow path (28) of the first housing portion (22a) flows into the high-temperature-side outflow hole (82) of the high-temperature-side header body (33) through the high-temperature internal outflow groove (86) of the high-temperature-side header body (33). The heat medium having flowed out of the high-temperature-side outflow hole (82) of the high-temperature-side header body (33) flows to the outside of the magnetic refrigeration module (20) through the high-temperature-end outflow port (72).

As illustrated in FIGS. 22A to 22K, when the heat medium pump (130) performs the second operation, the heat medium flows from the high-temperature side to the low-temperature side in the magnetic refrigeration module (20). Specifically, in the magnetic refrigeration module (20), the heat medium having flowed in from the high-temperature-end inflow port (71) flows into the high-temperature-side inflow hole (81) of the high-temperature-side header body (33). The heat medium having flowed out of the high-temperature-side inflow hole (81) of the high-temperature-side header body (33) flows into the high-temperature-side inflow path (27) of the first housing portion (22a) through the high-temperature internal inflow groove (85) of the high-temperature-side header body (33). The heat medium having flowed out of the high-temperature-side inflow path (27) of the first housing portion (22a) flows through the magnetic working substances (23) in the first housing portion (22a) and then flows into the low-temperature-side outflow path (26) of the first housing portion (22a).

The heat medium having flowed out of the low-temperature-side outflow path (26) of the first housing portion (22a) flows into the high-temperature-side inflow path (27) of the second housing portion (22b) through the third series connection groove (93) of the high-temperature-side header body (33). The heat medium having flowed out of the high-temperature-side inflow path (27) of the second housing portion (22b) flows through the magnetic working substances (23) in the second housing portion (22b) and then flows into the low-temperature-side outflow path (26) of the second housing portion (22b).

The heat medium having flowed out of the low-temperature-side outflow path (26) of the second housing portion (22b) flows into the high-temperature-side inflow path (27) of the third housing portion (22c) through the fifth series connection groove (95) of the low-temperature-side header body (43). The heat medium having flowed out of the high-temperature-side inflow path (27) of the third housing portion (22c) flows through the magnetic working substances (23) in the third housing portion (22c) and then flows into the low-temperature-side outflow path (26) of the third housing portion (22c).

The heat medium having flowed out of the low-temperature-side outflow path (26) of the third housing portion (22c) flows into the high-temperature-side inflow path (27) of the fourth housing portion (22d) through the first series connection groove (91) of the high-temperature-side header body (33). The heat medium having flowed out of the high-temperature-side inflow path (27) of the fourth housing portion (22d) flows through the magnetic working substances (23) in the fourth housing portion (22d) and then flows into the low-temperature-side outflow path (26) of the fourth housing portion (22d). The heat medium having flowed out of the low-temperature-side outflow path (26) of the fourth housing portion (22d) flows into the low-temperature-side outflow hole (84) of the low-temperature-side header body (43) through the low-temperature internal outflow groove (88) of the low-temperature-side header body (43). The heat medium having flowed out of the low-temperature-side outflow hole (84) of the low-temperature-side header body (43) flows to the outside of the magnetic refrigeration module (20) through the low-temperature-end outflow port (74).

Advantageous Effects of Embodiment 3

Also with the magnetic refrigeration module (20) according to the present embodiment, advantageous effects similar to those of Embodiment 1 described above are obtained.

Improvement of Embodiment 3

In the magnetic refrigeration module (20) according to Embodiment 3 illustrated in FIGS. 20A to 20K and so forth, flow paths for connecting the housing portions (22) to each other in series are separated into a forward path and a return path, but in practice, the heat medium can flow in both directions. Thus, performance deteriorates due to the flow paths becoming a dead volume.

Hence, as illustrated in FIG. 37, backflow prevention portions (201, 202, 203, 204, 205, 206) constituted by, for example, check valves may be provided in series connection portions (six portions) where the housing portions (22) are connected in series. In FIG. 37, the same components as those of Embodiment 3 illustrated in FIGS. 20A to 20K are denoted by the same reference numerals.

Specifically, a first backflow prevention portion (201) may be disposed in a portion where the low-temperature-side inflow port (25a) (the inlet of the low-temperature-side inflow path (25)) of the first housing portion (22a) and the high-temperature-side outflow port (28a) (the outlet of the high-temperature-side outflow path (28)) of the second housing portion (22b) are connected in series. A second backflow prevention portion (202) may be disposed in a portion where the low-temperature-side outflow port (26a) (the outlet of the low-temperature-side outflow path (26)) of the first housing portion (22a) and the high-temperature-side inflow port (27a) (the inlet of the high-temperature-side inflow path (27)) of the second housing portion (22b) are connected in series. A third backflow prevention portion (203) may be disposed in a portion where a low-temperature-side outflow port (25b) (at outlet of the low-temperature-side inflow path (25)) of the second housing portion (22b) and a high-temperature-side inflow port (28b) (an inlet of the high-temperature-side outflow path (28)) of the third housing portion (22c) are connected in series. A fourth backflow prevention portion (204) may be disposed in a portion where a low-temperature-side inflow port (26b) (an inlet of the low-temperature-side outflow path (26)) of the second housing portion (22b) and a high-temperature-side outflow port (27b) (an outlet of the high-temperature-side inflow path (27)) of the third housing portion (22c) are connected in series. A fifth backflow prevention portion (205) may be disposed in a portion where the low-temperature-side inflow port (25a) (the inlet of the low-temperature-side inflow path (25)) of the third housing portion (22c) and the high-temperature-side outflow port (28a) (the outlet of the high-temperature-side outflow path (28)) of the fourth housing portion (22d) are connected in series. A sixth backflow prevention portion (206) may be disposed in a portion where the low-temperature-side outflow port (26a) (the outlet of the low-temperature-side outflow path (26)) of the third housing portion (22c) and the high-temperature-side inflow port (27a) (the inlet of the high-temperature-side inflow path (27)) of the fourth housing portion (22d) are connected in series.

Thus, the directions in which the heat medium flows in the flow paths (25 to 28) of each housing portion (22) can be determined, thereby suppressing a deterioration in performance due to the flow paths (25 to 28) becoming a dead volume.

Although, in the configuration illustrated in FIG. 37, the backflow prevention portions (201, 202, 203, 204, 205, 206) are provided in all series connection portions where the housing portions (22) are connected in series, at least one of the backflow prevention portions (201, 202, 203, 204, 205, 206) may be provided instead. Also in this case, it is possible to suppress a deterioration in performance due to the dead volume as compared with a case where the backflow prevention portions (201, 202, 203, 204, 205, 206) are not provided at all.

In the configuration illustrated in FIG. 37, the first backflow prevention portion (201) may be connected to at least one of the low-temperature-side inflow port (25a) (the inlet of the low-temperature-side inflow path (25)) of the first housing portion (22a) and the high-temperature-side outflow port (28a) (the outlet of the high-temperature-side outflow path (28)) of the second housing portion (22b). The second backflow prevention portion (202) may be connected to at least one of the low-temperature-side outflow port (26a) (the outlet of the low-temperature-side outflow path (26)) of the first housing portion (22a) and the high-temperature-side inflow port (27a) (the inlet of the high-temperature-side inflow path (27)) of the second housing portion (22b). The third backflow prevention portion (203) may be connected to at least one of the low-temperature-side outflow port (25b) (the outlet of the low-temperature-side inflow path (25)) of the second housing portion (22b) and the high-temperature-side inflow port (28b) (the inlet of the high-temperature-side outflow path (28)) of the third housing portion (22c). The fourth backflow prevention portion (204) may be connected to at least one of the low-temperature-side inflow port (26b) (the inlet of the low-temperature-side outflow path (26)) of the second housing portion (22b) and the high-temperature-side outflow port (27b) (the outlet of the high-temperature-side inflow path (27)) of the third housing portion (22c). The fifth backflow prevention portion (205) may be connected to at least one of the low-temperature-side inflow port (25a) (the inlet of the low-temperature-side inflow path (25)) of the third housing portion (22c) and the high-temperature-side outflow port (28a) (the outlet of the high-temperature-side outflow path (28)) of the fourth housing portion (22d). The sixth backflow prevention portion (206) may be connected to at least one of the low-temperature-side outflow port (26a) (the outlet of the low-temperature-side outflow path (26)) of the third housing portion (22c) and the high-temperature-side inflow port (27a) (the inlet of the high-temperature-side inflow path (27)) of the fourth housing portion (22d). In this way, as described in Embodiment 1 (see FIGS. 32 and 33A to 33C), the backflow prevention portion (201, 202, 203, 204, 205, 206) can be installed inside the header structure (32, 42) at a position located upstream of the structure for series connection.

Heat Insulating Layer

In the magnetic refrigeration module (20) according to the present embodiment illustrated in FIGS. 20A to 20K and so forth, when the housing portions (22) or the flow paths (25 to 28) having different temperatures are adjacent to each other, a heat leakage occurs and performance deteriorates.

Hence, as illustrated in FIG. 37, heat insulating layers (211, 212, 213) may be provided between the housing portions (22) connected in series. The heat insulating layers (211, 212, 213) may be constituted by heat insulators, slits, or the like. Part of the housing portions (22) may be constituted by heat insulating members serving as the heat insulating layers (211, 212, 213). The heat insulating layers (211, 212, 213) may be provided entirely between the housing portions (22) connected in series or may be provided partly between the housing portions (22) connected in series. In the configuration illustrated in FIG. 37, the first heat insulating layer (211) is provided between the magnetic working substances (23) in the first housing portion (22a) and the magnetic working substances (23) in the second housing portion (22b) through which the heat medium flows at different temperatures, and between the high-temperature-side outflow path (28) of the first housing portion (22a) and the low-temperature-side inflow path (25) of the second housing portion (22b) through which the heat medium flows at different temperatures. The second heat insulating layer (212) is provided between the magnetic working substances (23) in the second housing portion (22b) and the magnetic working substances (23) in the third housing portion (22c) through which the heat medium flows at different temperatures, and between the high-temperature-side outflow path (28) of the second housing portion (22b) and the low-temperature-side inflow path (25) of the third housing portion (22c) through which the heat medium flows at different temperatures. The third heat insulating layer (213) is provided between the magnetic working substances (23) in the third housing portion (22c) and the magnetic working substances (23) in the fourth housing portion (22d) through which the heat medium flows at different temperatures, and between the high-temperature-side outflow path (28) of the third housing portion (22c) and the low-temperature-side inflow path (25) of the fourth housing portion (22d) through which the heat medium flows at different temperatures.

Accordingly, a deterioration in performance due to a heat leakage can be suppressed even when the housing portions (22) (magnetic working substances (23)) or the flow paths (25 to 28) having different temperatures are adjacent to each other. In other words, a deterioration in performance due to a heat leakage between the housing portions (22) through which the heat medium flows at different temperatures can be suppressed.

Modification of Embodiment 3

A modification of Embodiment 3 will be described. A magnetic refrigeration module (20) according to the present modification is different from that of Embodiment 3 described above in that the magnetic refrigeration module (20) includes a common header (52) and a connection header (62). Differences from Embodiment 3 will be mainly described below, As illustrated in FIGS. 23 to 26I, the magnetic refrigeration module (20) includes a housing portion case (21), a common header case (51), and a connection header case (61), each of which has a rectangular-parallelepiped shape. The common header case (51) is integrally attached to one side surface (a left side surface in FIG. 23) of the housing portion case (21). The connection header case (61) is integrally attached to another side surface (a right side surface in FIG. 23) of the housing portion case (21).

Common Header Case

The common header case (51) houses the common header (52). The common header case (51) includes a high-temperature-end inflow port (71), a high-temperature-end outflow port (72), a low-temperature-end inflow port (73), and a low-temperature-end outflow port (74).

Figure 23:
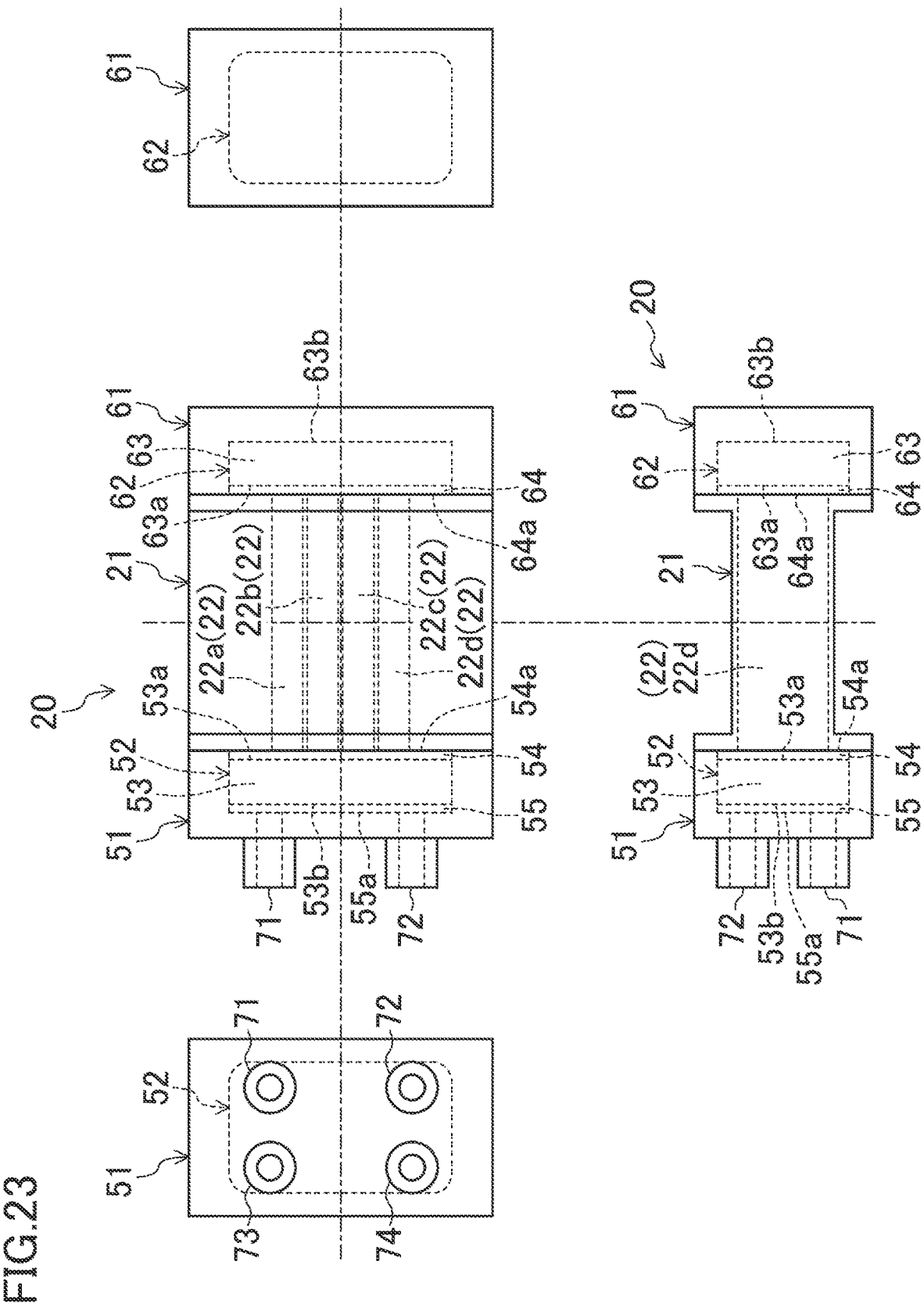
FIG. 23 is a four-side view illustrating a configuration of a magnetic refrigeration module according to a modification of Embodiment 3.
Figure 24A:
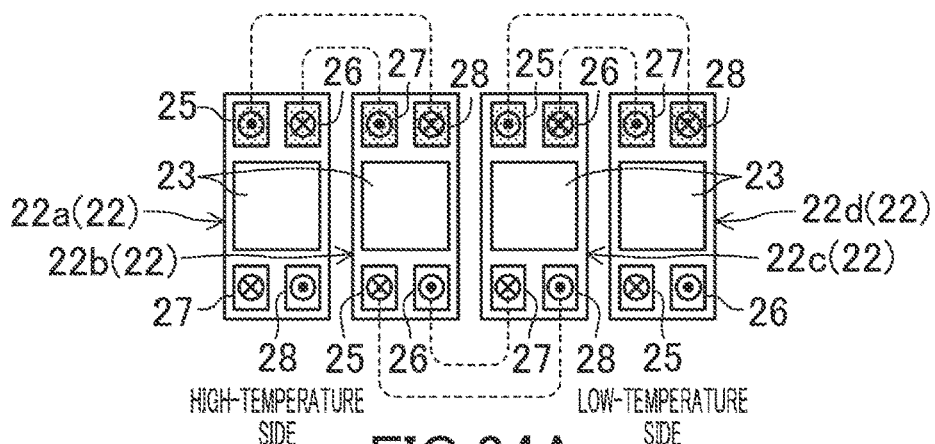
FIG. 24A, FIG. 24B, FIG. 24C, FIG. 24D, FIG. 24E, FIG. 24F, FIG. 24G, FIG. 24H and FIG. 24I are diagrams illustrating components of the magnetic refrigeration module according to the modification of Embodiment 3.
Figure 24B:
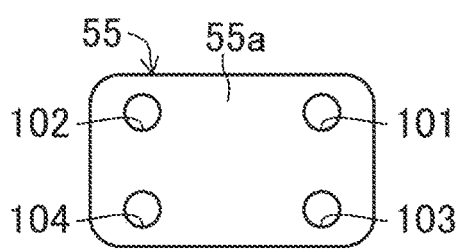
Figure 24C:
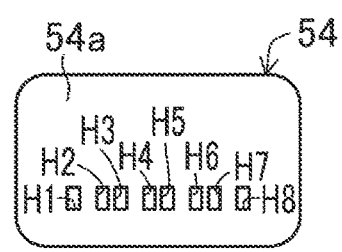
Figure 24D:
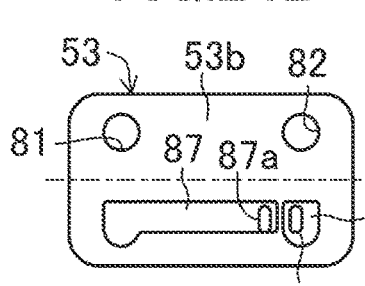
Figure 24E:
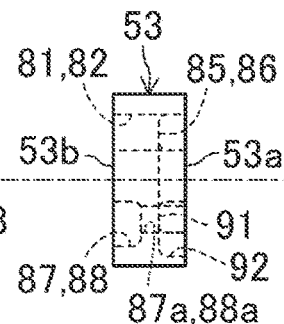
Figure 24F:
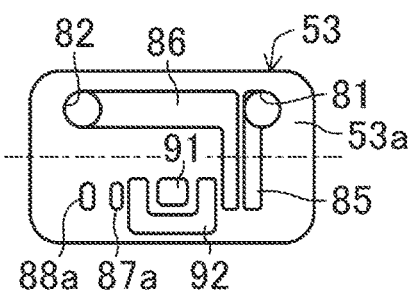
Figure 24G:
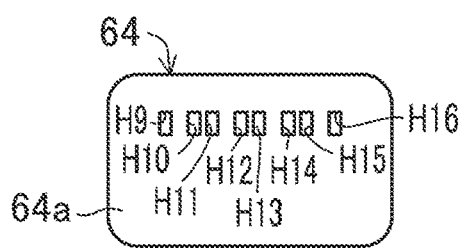
Figure 24H:
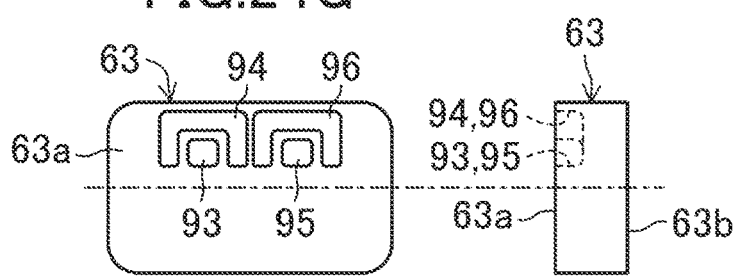
Figure 24I:
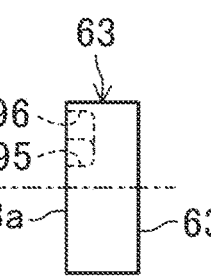
Figure 25A:
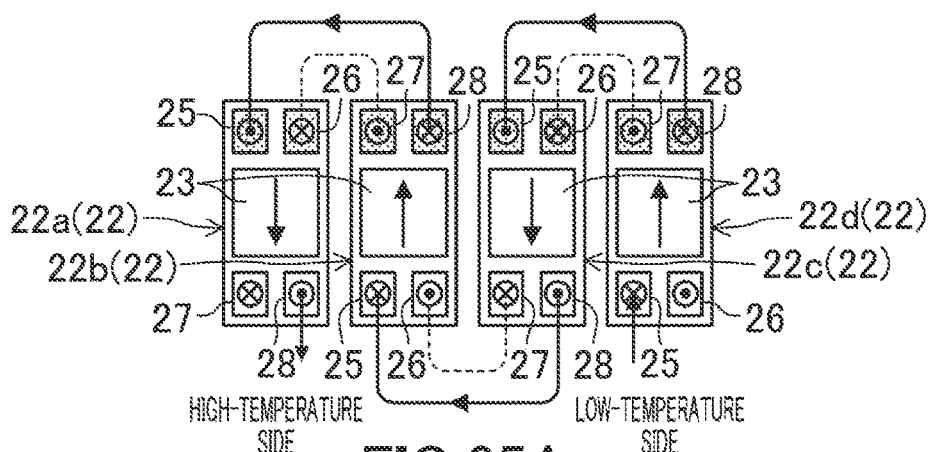
FIG. 25A, FIG. 25B, FIG. 25C, FIG. 25D, FIG. 25E, FIG. 25F, FIG. 25G, FIG. 25H and FIG. 25I are diagrams for describing a flow of a heat medium in the magnetic refrigeration module when a heat medium pump performs a first operation.
Figure 25B:
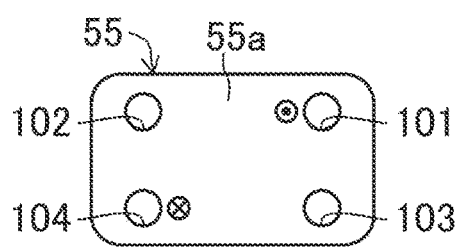
Figure 25C:
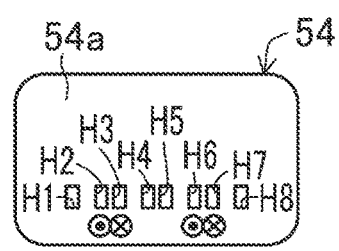
Figure 25D:
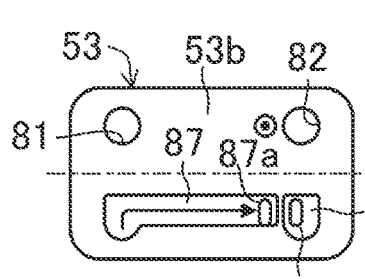
Figure 25E:
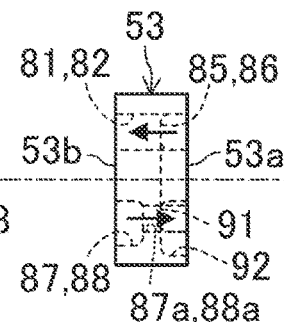
Figure 25F:
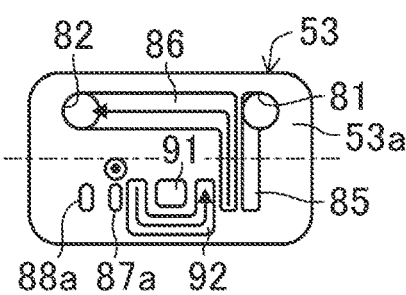
Figure 25G:
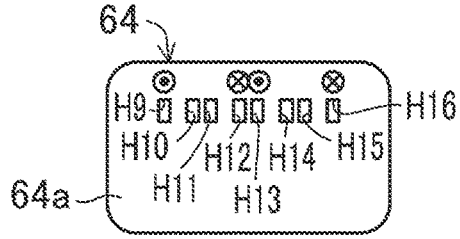
Figure 25H:
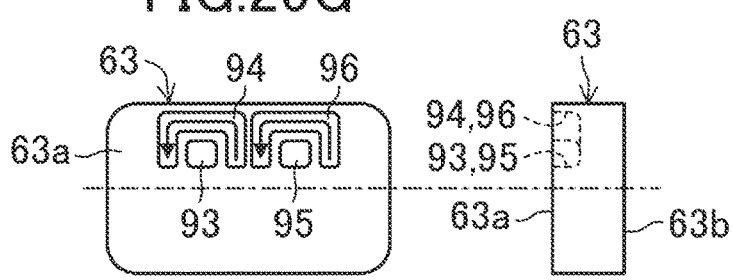
Figure 25I:
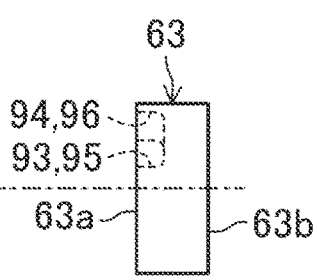
Figure 26A:
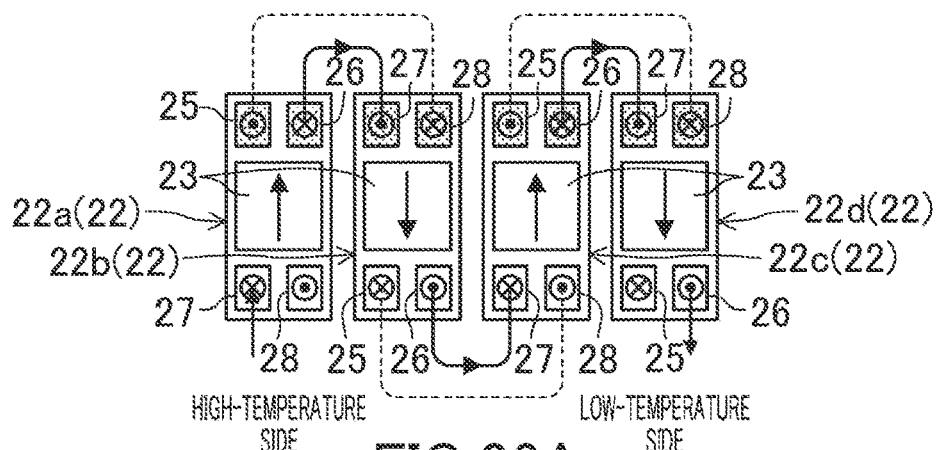
FIG. 26A, FIG. 26B, FIG. 26C, FIG. 26D, FIG. 26E, FIG. 26F, FIG. 26G, FIG. 26H and FIG. 26I are diagrams for describing a flow of the heat medium in the magnetic refrigeration module when the heat medium pump performs a second operation.
Figure 26B:
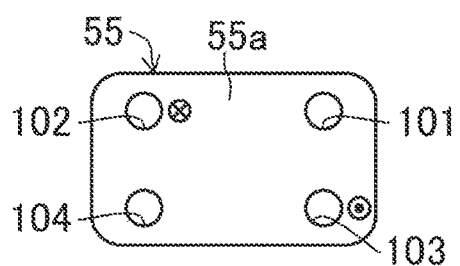
Figure 26C:
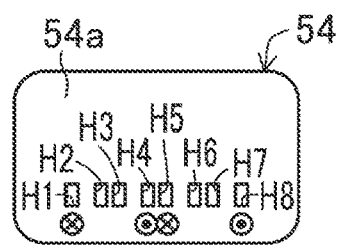
Figure 26D:
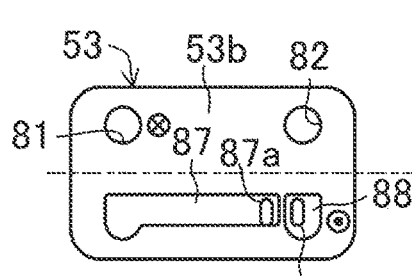
Figure 26E:
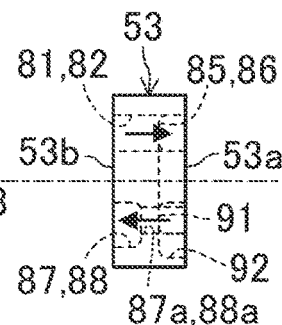
Figure 26F:
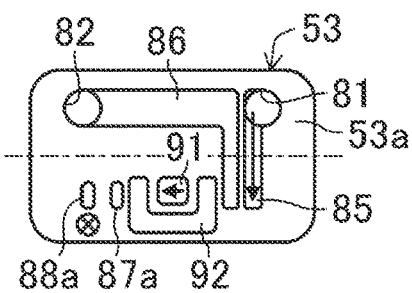
Figure 26G:
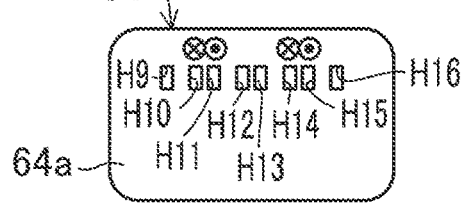
Figure 26H:
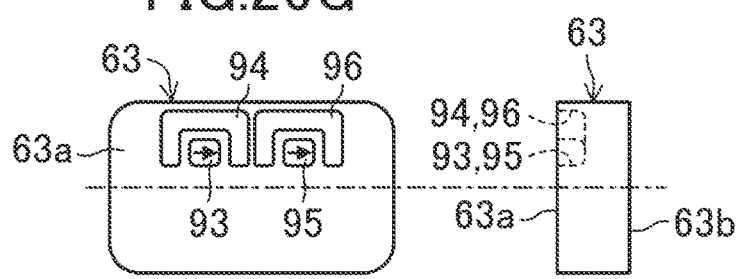
Figure 26I:
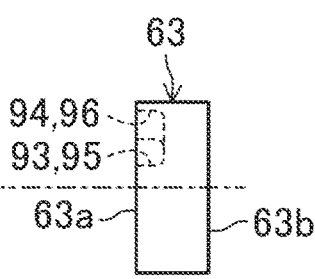
Figure 27:
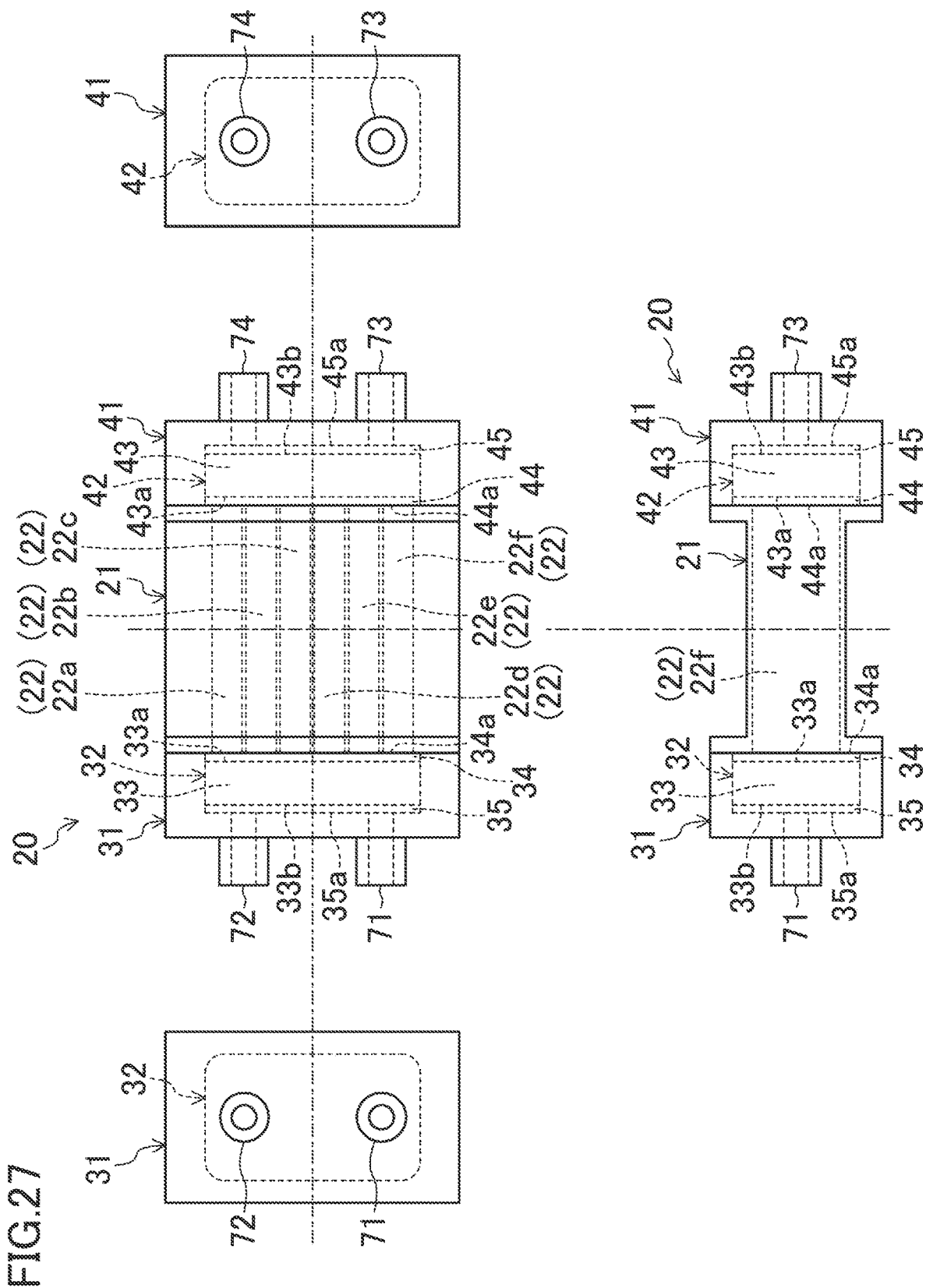
FIG. 27 is a four-side view illustrating a configuration of a magnetic refrigeration module according to Embodiment 4.

As illustrated in FIG. 23, the common header (52) is disposed in contact with each housing portion (22) in the common header case (51), As illustrated in FIG. 23, the common header (52) includes a common header body (53), a first common packing (54), and a second common packing (55). The common header (52) constitutes a header structure, Common Header Body The common header body (53) is formed in a slightly flat rectangular-parallelepiped shape. The common header body (53) is made of a nonmagnetic material (for example, resin) having a thermal conductivity of 10 W/m or less. The common header body (53) has a front surface (53a) in contact with the first common packing (54) and a back surface (53b) in contact with the second common packing (55). The common header body (53) has a high-temperature-side inflow hole (81) and a high-temperature-side outflow hole (82) that are formed to extend through the common header body (53) in a thickness direction (a left-right direction in FIG. 23). In the front surface (53a) or the back surface (53b) of the common header body (53) (in other words, in at least one of a vicinity of a first surface and a vicinity of a second surface inside the common header (52)), a high-temperature internal inflow groove (85), a high-temperature internal outflow groove (86), a low-temperature internal inflow groove (87), a low-temperature internal outflow groove (88), a first series connection groove (91), and a second series connection groove (92) are formed in a multilayer structure.

Here, the multilayer structure is a structure in which flow paths (for example, grooves (85 to 88, 91 to 98)) through which a heat medium flows are formed in both of a front surface (33a, 43a, 53a, 63a) and a back surface (33b, 43b, 53b, 63b) of each header main body (33, 43, 53, 63) or in addition inside each header main body (33, 43, 53, 63).

The high-temperature internal inflow groove (85) allows the high-temperature-side inflow hole (81) and a high-temperature-side inflow port (27a) of a first housing portion (22a) (specifically, an inlet of a high-temperature-side inflow path (27) of the first housing portion (22a)) to communicate with each other through the first common packing (54). The high-temperature internal inflow groove (85) has a substantially L-like shape in the front surface (53a) of the common header body (53). The high-temperature internal inflow groove (85) constitutes a high-temperature internal inflow path.

The high-temperature internal outflow groove (86) allows the high-temperature-side outflow hole (82) and a high-temperature-side outflow port (28a) of the first housing portion (22a) (specifically, an outlet of a high-temperature-side outflow path (28) of the first housing portion (22a)) to communicate with each other through the first common packing (54). The high-temperature internal outflow groove (86) has a substantially L-like shape in the front surface (53a) of the common header body (53). The high-temperature internal outflow groove (86) constitutes a high-temperature internal outflow path.

The low-temperature internal inflow groove (87) communicates with a low-temperature-side inflow port (25a) of a fourth housing portion (22d) (specifically, an inlet of a low-temperature-side inflow path (25) of the fourth housing portion (22d)) through a through hole (87a) formed in the bottom of the low-temperature internal inflow groove (87) and the first common packing (54). The low-temperature internal inflow groove (87) has a substantially L-like shape in the back surface (53b) of the common header body (53). The low-temperature internal inflow groove (87) constitutes a low-temperature internal inflow path.

The low-temperature internal outflow groove (88) communicates with a low-temperature-side outflow port (26a) of the fourth housing portion (22d) (specifically, an outlet of a low-temperature-side outflow path (26) of the fourth housing portion (22d)) through a through hole (88a) formed in the bottom of the low-temperature internal outflow groove (88) and the first common packing (54). The low-temperature internal outflow groove (88) has a substantially rectangular shape in the back surface (53b) of the common header body (53). The low-temperature internal outflow groove (88) constitutes a low-temperature internal outflow path, The first series connection groove (91) allows a low-temperature-side outflow port (26a) of a second housing portion (22b) (specifically, an outlet of a low-temperature-side outflow path (26) of the second housing portion (22b)) and a high-temperature-side inflow port (27a) of a third housing portion (22c) (specifically, an inlet of a high-temperature-side inflow path (27) of the third housing portion (22c)) to communicate with each other by series connection through the first common packing (54). The first series connection groove (91) has a rectangular shape in the front surface (53a) of the common header body (53). The first series connection groove (91) constitutes a first series internal flow path.

The second series connection groove (92) allows a low-temperature-side inflow port (25a) of the second housing portion (22b) (specifically, an inlet of a low-temperature-side inflow path (25) of the second housing portion (22b)) and a high-temperature-side outflow port (28a) of the third housing portion (22c) (specifically, an outlet of a high-temperature-side outflow path (28) of the third housing portion (22c)) to communicate with each other by series connection through the first common packing (54). The second series connection groove (92) has a substantially C-like shape open upward in the front surface (53a) of the common header body (53). The second series connection groove (92) constitutes a second series internal flow path.

First Common Packing

The first common packing (54) is a rectangular plate-shaped resin member. The resin constituting the first common packing (54) is a nonmagnetic material having a thermal conductivity of 10 W/m or less. One side surface of the first common packing (54) is attached to the front surface (53a) of the common header body (53), Another side surface (54a) of the first common packing (54) is attached to each housing portion (22). As described above, the first common packing (54), more broadly, the common header (52) integrates the plurality of housing portions (22) with each other. The other side surface (54a) of the first common packing (54) constitutes a first surface of the common header (52) facing each housing portion (22), First to eighth packing holes (H1 to H8) each having a vertically long rectangular shape are formed in the first common packing (54). The first to eighth packing holes (H1 to H8) extend through the first common packing (54) in the thickness direction.

The first packing hole (H1) allows the low-temperature-side outflow port (26a) of the fourth housing portion (22d) and the low-temperature internal outflow groove (88) of the common header body (53) to communicate with each other. The second packing hole (H2) allows the low-temperature-side inflow port (25a) of the fourth housing portion (22d) and the low-temperature internal inflow groove (87) of the common header body (53) to communicate with each other. The third packing hole (H3) allows the high-temperature-side outflow port (28a) of the third housing portion (22c) and the second series connection groove (92) of the common header body (53) to communicate with each other. The fourth packing hole (H4) allows the high-temperature-side inflow port (27a) of the third housing portion (22c) and the first series connection groove (91) of the common header body (53) to communicate with each other. The fifth packing hole (H5) allows the low-temperature-side outflow port (26a) of the second housing portion (22b) and the first series connection groove (91) of the common header body (53) to communicate with each other. The sixth packing hole (H6) allows the low-temperature-side inflow port (25a) of the second housing portion (22b) and the second series connection groove (92) of the common header body (53) to communicate with each other. The seventh packing hole (H7) allows the high-temperature-side outflow port (28a) of the first housing portion (22a) and the high-temperature internal outflow groove (86) of the common header body (53) to communicate with each other. The eighth packing hole (H8) allows the high-temperature-side inflow port (27a) of the first housing portion (22a) and the high-temperature internal inflow groove (85) of the common header body (53) to communicate with each other.

With such a configuration, the low-temperature-side outflow path (26) of the second housing portion (22b) and the high-temperature-side inflow path (27) of the third housing portion (22c) are connected to each other in series through the first series connection groove (91). The low-temperature-side inflow path (25) of the second housing portion (22b) and the high-temperature-side outflow path (28) of the third housing portion (22c) are connected to each other in series through the second series connection groove (92). In other words, the second housing portion (22b) and the third housing portion (22c) are connected to each other in series.

Second Common Packing

The second common packing (55) is a rectangular plate-shaped resin member. The resin constituting the second common packing (55) is a nonmagnetic material having a thermal conductivity of 10 W/m or less. One side surface of the second common packing (55) is attached to the back surface (53b) of the common header body (53). Another side surface (55a) of the second common packing (55) constitutes a second surface on the back side of the first surface of the common header (52).

A high-temperature-side outflow packing hole (101), a high-temperature-side inflow packing hole (102), a low-temperature-side outflow packing hole (103), and a low-temperature-side inflow packing hole (104), each of which has a circular shape, are formed in the second common packing (55). The high-temperature-side outflow packing hole (101), the high-temperature-side inflow packing hole (102), the low-temperature-side outflow packing hole (103), and the low-temperature-side inflow packing hole (104) extend through the second common packing (55) in the thickness direction. The high-temperature-side outflow packing hole (101) allows the high-temperature-end outflow port (72) and the high-temperature-side outflow hole (82) of the common header body (53) to communicate with each other. The high-temperature-side inflow packing hole (102) allows the high-temperature-end inflow port (71) and the high-temperature-side inflow hole (81) of the common header body (53) to communicate with each other. The low-temperature-side outflow packing hole (103) allows the low-temperature-end outflow port (74) and the low-temperature internal outflow groove (88) of the common header body (53) to communicate with each other. The low-temperature-side inflow packing hole (104) allows the low-temperature-end inflow port (73) and the low-temperature internal inflow groove (87) of the common header body (53) to communicate with each other.

Connection Header Case

The connection header case (61) houses the connection header (62). As illustrated in FIG. 23, the connection header (62) is disposed in contact with each housing portion (22) inside the connection header case (61). As illustrated in FIG. 23, the connection header (62) includes a connection header body (63) and a connection packing (64). The connection header (62) constitutes a header structure.

Connection Header Body

The connection header body (63) has a slightly flat rectangular-parallelepiped shape. The connection header body (63) is made of a nonmagnetic material (for example, resin) having a thermal conductivity of 10 W/m or less. The connection header body (63) has a front surface (63a) in contact with the connection packing (64) and a back surface (63b) on the back side thereof. In the front surface (63a) of the connection header body (63) (in other words, in a vicinity of a first surface inside the connection header (62)), a third series connection groove (93), a fourth series connection groove (94), a fifth series connection groove (95), and a sixth series connection groove (96) are formed in a single layer structure. The back surface of the connection header body (63) constitutes a second surface of the connection header (62).

The third series connection groove (93) allows a low-temperature-side outflow port (26a) of the first housing portion (22a) (specifically, an outlet of a low-temperature-side outflow path (26) of the first housing portion (22a)) and a high-temperature-side inflow port (27a) of the second housing portion (22b) (specifically, an inlet of a high-temperature-side inflow path (27) of the second housing portion (22b)) to communicate with each other through the connection packing (64). The third series connection groove (93) has a rectangular shape in the front surface (63a) of the connection header body (63). The third series connection groove (93) constitutes a first series internal flow path.

The fourth series connection groove (94) allows a low-temperature-side inflow port (25a) of the first housing portion (22a) (specifically, an inlet of a low-temperature-side inflow path (25) of the first housing portion (22a)) and a high-temperature-side outflow port (28a) of the second housing portion (22b) (specifically, an outlet of a high-temperature-side outflow path (28) of the second housing portion (22b)) to communicate with each other through the connection packing (64). The fourth series connection groove (94) has a substantially C-like shape open downward in the front surface (63a) of the connection header body (63). The fourth series connection groove (94) constitutes a second series internal flow path.

The fifth series connection groove (95) allows a low-temperature-side outflow port (26a) of the third housing portion (22c) (specifically, an outlet of a low-temperature-side outflow path (26) of the third housing portion (22c)) and a high-temperature-side inflow port (27a) of the fourth housing portion (22d) (specifically, an inlet of a high-temperature-side inflow path (27) of the fourth housing portion (22d)) to communicate with each other through the connection packing (64). The fifth series connection groove (95) has a rectangular shape in the front surface (63a) of the connection header body (63). The fifth series connection groove (95) constitutes a first series internal flow path.

The sixth series connection groove (96) allows a low-temperature-side inflow port (25a) of the third housing portion (22c) (specifically, an inlet of a low-temperature-side inflow path (25) of the third housing portion (22c)) and a high-temperature-side outflow port (28a) of the fourth housing portion (22d) (specifically, an outlet of a hightemperature-side outflow path (28) of the fourth housing portion (22d)) to communicate with each other through the connection packing (64). The sixth series connection groove (96) has a substantially C-like shape open downward in the front surface (63a) of the connection header body (63). The sixth series connection groove (96) constitutes a second series internal flow path.

Connection Packing

The connection packing (64) is a rectangular plate-shaped resin member. The resin constituting the connection packing (64) is a nonmagnetic material having a thermal conductivity of 10 W/m or less. One side surface of the connection packing (64) is attached to the front surface (63a) of the connection header body (63). Another side surface (64a) of the connection packing (64) is attached to each housing portion (22). As described above, the connection packing (64), more broadly, the connection header (62) integrates the plurality of housing portions (22) with each other. The other side surface (64a) of the connection packing (64) constitutes a first surface of the connection header (62) facing each housing portion (22), Ninth to sixteenth packing holes (H9 to H16) each having a vertically long rectangular shape are formed in the connection packing (64). The ninth to sixteenth packing holes (H9 to H16) extend through the connection packing (64) in the thickness direction.

The ninth packing hole (H9) allows the low-temperature-side inflow port (25a) of the first housing portion (22a) and the fourth series connection groove (94) of the connection header body (63) to communicate with each other. The tenth packing hole (H10) allows the loin-temperature-side outflow port (26a) of the first housing portion (22a) and the third series connection groove (93) of the connection header body (63) to communicate with each other. The eleventh packing hole (H11) allows the high-temperature-side inflow port (27a) of the second housing portion (22b) and the third series connection groove (93) of the connection header body (63) to communicate with each other. The twelfth packing hole (H12) allows the high-temperature-side outflow port (28a) of the second housing portion (22b) and the fourth series connection groove (94) of the connection header body (63) to communicate with each other.

With such a configuration, the low-temperature-side outflow path (26) of the first housing portion (22a) and the high-temperature-side inflow path (27) of the second housing portion (22b) are connected to each other in series through the third series connection groove (93). The low-temperature-side inflow path (25) of the first housing portion (22a) and the high-temperature-side outflow path (28) of the second housing portion (22b) are connected to each other in series through the fourth series connection groove (94). In other words, the first housing portion (22a) and the second housing portion (22b) are connected to each other in series.

The thirteenth packing hole (H13) allows the low-temperature-side inflow port (25a) of the third housing portion (22c) and the sixth series connection groove (96) of the connection header body (63) to communicate with each other. The fourteenth packing hole (H14) allows the low-temperature-side outflow port (26a) of the third housing portion (22c) and the fifth series connection groove (95) of the connection header hod (63) to communicate with each other. The fifteenth packing hole (HI5) allows the high-temperature-side inflow port (27a) of the fourth housing portion (22d) and the fifth series connection groove (95) of the connection header body (63) to communicate with each other. The sixteenth packing hole (H16) allows the high-temperature-side outflow port (28a) of the fourth housing portion (22d) and the sixth series connection groove (96) of the connection header body (63) to communicate with each other.

With such a configuration, the low-temperature-side outflow path (26) of the third housing portion (22c) and the high-temperature-side inflow path (27) of the fourth housing portion (22d) are connected to each other in series through the fifth series connection groove (95). The low-temperature-side inflow path (25) of the third housing portion (22c) and the high-temperature-side outflow path (28) of the fourth housing portion (22d) are connected to each other in series through the sixth series connection groove (96). In other words, the third housing portion (22c) and the fourth housing portion (22d) are connected to each other in series.

Flow of Heat Medium in Magnetic Refrigeration Module

A description is given of a flow of the heat medium in the magnetic refrigeration module (20) when the air conditioning system (10) is operated, more specifically, when the heat medium pump (130) performs the first operation or the second operation.

As illustrated in FIGS. 25A to 25I, when the heat medium pump (130) performs the first operation, the heat medium flows from the low-temperature side to the high-temperature side in the magnetic refrigeration module (20). Specifically, in the magnetic refrigeration module (20), the heat medium having flowed in from the low-temperature-end inflow port (73) flows into the low-temperature internal inflow groove (87) of the common header body (53). The heat medium having flowed out of the low-temperature internal inflow groove (87) flows into the low-temperature-side inflow path (25) of the fourth housing portion (22d). The heat medium having flowed out of the low-temperature-side inflow path (25) of the fourth housing portion (22d) flows through the magnetic working substances (23) in the fourth housing portion (22d) and then flows into the high-temperature-side outflow path (28) of the fourth housing portion (22d).

The heat medium having flowed out of the high-temperature-side outflow path (28) of the fourth housing portion (22d) flows into the low-temperature-side inflow path (25) of the third housing portion (22c) through the sixth series connection groove (96) of the connection header body (63). The heat medium having flowed out of the low-temperature-side inflow path (25) of the third housing portion (22c) flows through the magnetic working substances (23) in the third housing portion (22c) and then flows into the high-temperature-side outflow path (28) of the third housing portion (22c).

The heat medium having flowed out of the high-temperature-side outflow path (28) of the third housing portion (22c) flows into the low-temperature-side inflow path (25) of the second housing portion (22b) through the second series connection groove (92) of the common header body (53). The heat medium having flowed out of the low-temperature-side inflow path (25) of the second housing portion (22b) flows through the magnetic working substances (23) in the second housing portion (22b) and then flows into the high-temperature-side outflow path (28) of the second housing portion (22b).

The heat medium having flowed out of the high-temperature-side outflow path (28) of the second housing portion (22b) flows into the low-temperature-side inflow path (25) of the first housing portion (22a) through the fourth series connection groove (94) of the connection header body (63). The heat medium having flowed out of the low-temperature-side inflow path (25) of the first housing portion (22a) flows through the magnetic working substances (23) in the first housing portion (22a) and then flows into the high-temperature-side outflow path (28) of the first housing portion (22*a*). The heat medium having flowed out of the high-temperature-side outflow path (28) of the first housing portion (22*a*) flows into the high-temperature-side outflow hole (82) of the common header body (53) through the high-temperature internal outflow groove (86) of the common header body (53). The heat medium having flowed out of the high-temperature-side outflow hole (82) of the common header body (53) flows to the outside of the magnetic refrigeration module (20) through the high-temperature-end outflow port (72).

As illustrated in FIGS. 26A to 26I, when the heat medium pump (130) performs the second operation, the heat medium flows from the high-temperature side to the low-temperature side in the magnetic refrigeration module (20). Specifically, in the magnetic refrigeration module (20), the heat medium having flowed in from the high-temperature-end inflow port (71) flows into the high-temperature-side inflow hole (81) of the common header body (53). The heat medium having flowed out of the high-temperature-side inflow hole (81) of the common header body (53) flows into the high-temperature-side inflow path (27) of the first housing portion (22*a*) through the high-temperature internal inflow groove (85) of the common header body (53). The heat medium having flowed out of the high-temperature-side inflow path (27) of the first housing portion (22*a*) flows through the magnetic working substances (23) in the first housing portion (22*a*) and then flows into the low-temperature-side outflow path (26) of the first housing portion (22*a*).

The heat medium having flowed out of the low-temperature-side outflow path (26) of the first housing portion (22*a*) flows into the high-temperature-side inflow path (27) of the second housing portion (22*b*) through the third series connection groove (93) of the connection header body (63). The heat medium having flowed out of the high-temperature-side inflow path (27) of the second housing portion (22*b*) flows through the magnetic working substances (23) in the second housing portion (22*b*) and then flows into the low-temperature-side outflow path (26) of the second housing portion (22*b*).

The heat medium having flowed out of the low-temperature-side outflow path (26) of the second housing portion (22*b*) flows into the high-temperature-side inflow path (27) of the third housing portion (22*c*) through the first series connection groove (91) of the common header body (53). The heat medium having flowed out of the high-temperature-side inflow path (27) of the third housing portion (22*c*) flows through the magnetic working substances (23) in the third housing portion (22*c*) and then flows into the low-temperature-side outflow path (26) of the third housing portion (22*c*).

The heat medium having flowed out of the low-temperature-side outflow path (26) of the third housing portion (22*c*) flows into the high-temperature-side inflow path (27) of the fourth housing portion (22*d*) through the fifth series connection groove (95) of the connection header body (63). The heat medium having flowed out of the high-temperature-side inflow path (27) of the fourth housing portion (22*d*) flows through the magnetic working substances (23) in the fourth housing portion (22*d*) and then flows into the low-temperature-side outflow path (26) of the fourth housing portion (22*d*). The heat medium having flowed out of the low-temperature-side outflow path (26) of the fourth housing portion (22*d*) passes through the low-temperature internal outflow groove (88) of the low-temperature-side header body (43) and then flows to the outside of the magnetic refrigeration module (20) through the low-temperature-end outflow port (74).

Advantageous Effects of Modification of Embodiment 3

Also with the magnetic refrigeration module (20) according to the present modification, advantageous effects similar to those of Embodiment 3 described above are obtained.

In the magnetic refrigeration module (20) according to the present modification, the low-temperature-side inflow port (25*a*) and the low-temperature-side outflow port (26*a*) of each of the housing portions (22) disposed on a most low-temperature side, and the high-temperature-side inflow port (27*a*) and the high-temperature-side outflow port (28*a*) of each of the housing portions (22) disposed on a most high-temperature side are disposed on one side in the magnetic refrigeration module (20). With this configuration, since the four ports (25*a* to 28*a*) are on the one side of the magnetic refrigeration module (20), respective pipes or the like that are connected to the four ports (25*a* to 28*a*) can be easily installed.

In the magnetic refrigeration module (20) according to the present modification, the header structure (32, 42, 52, 62) includes a common header (52) having the low-temperature internal inflow path (87), the low-temperature internal outflow path (88), the high-temperature internal inflow path (85), and the high-temperature internal outflow path (86), and a connection header (62) having the first series internal flow path (91, 93, 95, 97) and the second series internal flow path (92, 94, 96, 98). With this configuration, the heat medium flows from the common header (52) through the plurality of housing portions (22) and the connection header (62) to the common header (52).

In the magnetic refrigeration module (20) according to the present modification, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) are constituted by a single layer structure or a multilayer structure provided at the common header (52) or the connection header (62). With this configuration, when the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) are constituted by the single layer structure, each header (32, 42, 52, 62) can be easily manufactured. In contrast, when those are constituted by the multilayer structure, each header (32, 42, 52, 62) can be downsized.

In the magnetic refrigeration module (20) according to the present modification, the header structure (32, 42, 52, 62) includes the common header (52) and the connection header (62); the low-temperature internal inflow path (87), the low-temperature internal outflow path (88), the high-temperature internal inflow path (85), and the high-temperature internal outflow path (86) are constituted by a multilayer structure provided at the common header (52); and the first series internal flow path (91, 93, 95, 97) and the second series internal flow path (92, 94, 96, 98) are constituted by a single layer structure provided at the connection header (62). With this configuration, the heat medium flows from the common header (52) through the plurality of housing portions (22) and the connection header (62) to the common header (52). When the low-temperature internal inflow path (87), the low-temperature internal outflow path (88), the high-temperature internal inflow path (85), and the high-temperature internal outflow path (86), or the first series internal flow path (91, 93, 95, 97) and the second series internal flow path (92, 94, 96, 98) are constituted by the single layer structure, the common header (52) can be easily manufactured. In contrast, when those are constituted by the multilayer structure, the connection header (62) can be downsized.

In the magnetic refrigeration module (20) according to the present modification, each of the common header (52) and the connection header (62) has a first surface (54a. 64a) facing the housing portion (22) and a second surface (55a, 63b) on a back side of the first surface (54a, 64a); the low-temperature internal inflow path (87), the low-temperature internal outflow path (88), the high-temperature internal inflow path (85), and the high-temperature internal outflow path (86) that have the multilayer structure are constituted by grooves (85 to 88) formed in at least one of a vicinity of the first surface (54a) and a vicinity of the second surface (55a) inside the common header (52), and the first series internal flow path (91, 93, 95, 97) and the second series internal flow path (92, 94, 96, 98) that have the single layer structure are constituted by grooves (91 to 98) formed in a vicinity of the first surface (64a) inside the connection header (62), whereas the first series internal flow path (91, 93, 95, 97) and the second series internal flow path (92, 94, 96, 98) that have the multilayer structure are constituted by grooves (91 to 98) formed in the vicinity of the first surface (64a) or a vicinity of the second surface (63b) inside the connection header (62). With this configuration, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) that have the single layer structure or the multilayer structure can be attained by a simple configuration of the grooves (85 to 88, 91 to 98) formed inside the common header (52) or the connection header (62).

Improvement of Modification of Embodiment 3

In the magnetic refrigeration module (20) according to the modification of Embodiment 3 illustrated in FIGS. 24A to 24I and so forth, flow paths for connecting the housing portions (22) to each other in series are separated into a forward path and a return path, but in practice, the heat medium can flow in both directions. Thus, performance deteriorates due to the flow paths becoming a dead volume.

Hence, as illustrated in FIG. 38, backflow prevention portions (201, 202, 203, 204, 205, 206) constituted by, for example, check valves may be provided in series connection portions (six portions) where the housing portions (22) are connected in series. In FIG. 38, the same components as those of the modification of Embodiment 3 illustrated in FIGS. 24A to 24I are denoted by the same reference numerals.

Specifically, a first backflow prevention portion (201) may be disposed in a portion where a low-temperature-side outflow port (25b) (an outlet of the low-temperature-side inflow path (25)) of the first housing portion (22a) and a high-temperature-side inflow port (28b) (an inlet of the high-temperature-side outflow path (28)) of the second housing portion (22b) are connected in series, A second backflow prevention portion (202) may be disposed in a portion where a low-temperature-side inflow port (26b) (an inlet of the low-temperature-side outflow path (26)) of the first housing portion (22a) and a high-temperature-side outflow port (27b) (an outlet of the high-temperature-side inflow path (27)) of the second housing portion (22b) are connected in series. A third backflow prevention portion (203) may be disposed in a portion where the low-temperature-side inflow port (25a) (the inlet of the low-temperature-side inflow path (25)) of the second housing portion (22b) and the high-temperature-side outflow port (28a) (the outlet of the high-temperature-side outflow path (28)) of the third housing portion (22c) are connected in series. A fourth backflow prevention portion (204) may be disposed in a portion where the low-temperature-side outflow port (26a) (the outlet of the low-temperature-side outflow path (26)) of the second housing portion (22b) and the high-temperature-side inflow port (27a) (the inlet of the high-temperature-side inflow path (27)) of the third housing portion (22c) are connected in series. A fifth backflow prevention portion (205) may be disposed in a portion where a low-temperature-side outflow port (25b) (an outlet of the low-temperature-side inflow path (25)) of the third housing portion (22c) and a high-temperature-side inflow port (28b) (an inlet of the high-temperature-side outflow path (28)) of the fourth housing portion (22d) are connected in series. A sixth backflow prevention portion (206) may be disposed in a portion where a low-temperature-side inflow port (26b) (an inlet of the low-temperature-side outflow path (26)) of the third housing portion (22c) and a high-temperature-side outflow port (27b) (an outlet of the high-temperature-side inflow path (27)) of the fourth housing portion (22d) are connected in series.

Thus, the directions in which the heat medium flows in the flow paths (25 to 28) of each housing portion (22) can be determined, thereby suppressing a deterioration in performance due to the flow paths (25 to 28) becoming a dead volume.

Although, in the configuration illustrated in FIG. 38, the backflow prevention portions (201, 202, 203, 204, 205, 206) are provided in all series connection portions where the housing portions (22) are connected in series, at least one of the backflow prevention portions (201, 202, 203, 204, 205, 206) may be provided instead. Also in this case, it is possible to suppress a deterioration in performance due to the dead volume as compared with a case where the backflow prevention portions (201, 202, 203, 204, 205, 206) are not provided at all.

In the configuration illustrated in FIG. 38, the first backflow prevention portion (201) may be connected to at least one of the low-temperature-side outflow port (25b) (the outlet of the low-temperature-side inflow path (25)) of the first housing portion (22a) and the to high-temperature-side inflow port (28b) (the inlet of the high-temperature-side outflow path (28)) of the second housing portion (22b). The second backflow prevention portion (202) may be connected to at least one of the low-temperature-side inflow port (26b) (the inlet of the low-temperature-side outflow path (26)) of the first housing portion (22a) and the high-temperature-side outflow port (27b) (the outlet of the high-temperature-side inflow path (27)) of the second housing portion (22b). The third backflow prevention portion (203) may be connected to at least one of the low-temperature-side inflow port (25a) (the inlet of the low-temperature-side inflow path (25)) of the second housing portion (22b) and the high-temperature-side outflow port (28a) (the outlet of the high-temperature-side outflow path (28)) of the third housing portion (22c). The fourth backflow prevention portion (204) may be connected to at least one of the low-temperature-side outflow port (26a) (the outlet of the low-temperature-side outflow path (26)) of the second housing portion (22b) and the high-temperature-side inflow port (27a) (the inlet of the high-temperature-side inflow path (27)) of the third housing portion (22c). The fifth backflow prevention portion (205) may be connected to at least one of the low-temperature-side outflow port (25b) (the outlet of the low-temperature-side inflow path (25)) of the third housing portion (22c) and the high-temperature-side inflow port (28b) (the inlet of the high-temperature-side outflow path (28)) of the fourth housing portion (22d). The sixth backflow prevention portion (206) may be connected to at least one of the low-temperature-side inflow port (26b) (the inlet of the low-temperature-side outflow path (26)) of the third housing portion (22c) and the high-temperature-side outflow port (27b) (the outlet of the high-temperature-side inflow path (27)) of the fourth housing portion (22d). In this way, as described in Embodiment 1 (see FIGS. 32 and 33A to 33C), the backflow prevention portion (201, 202, 203, 204, 205, 206) can be installed inside the header structure (52, 62) at a position located upstream of the structure for series connection.

Heat Insulating Layer

In the magnetic refrigeration module (20) according to the present modification illustrated in FIGS. 24A to 24I and so forth, when the housing portions (22) or the flow paths (25 to 28) having different temperatures are adjacent to each other, a heat leakage occurs and performance deteriorates.

Hence, as illustrated in FIG. 38, heat insulating layers (211, 212, 213) may be provided between the housing portions (22) connected in series. The heat insulating layers (211, 212, 213) may be constituted by heat insulators, slits, or the like. Part of the housing portions (22) may be constituted by heat insulating members serving as the heat insulating layers (211, 212, 213). The heat insulating layers (211, 212, 213) may be provided entirely between the housing portions (22) connected in series or may be provided partly between the housing portions (22) connected in series. In the configuration illustrated in FIG. 38, the first heat insulating layer (211) is provided between the magnetic working substances (23) in the first housing portion (22a) and the magnetic working substances (23) in the second housing portion (22b) through which the heat medium flows at different temperatures, and between the high-temperature-side outflow path (28) of the first housing portion (22a) and the low-temperature-side inflow path (25) of the second housing portion (22b) through which the heat medium flows at different temperatures. The second heat insulating layer (212) is provided between the magnetic working substances (23) in the second housing portion (22b) and the magnetic working substances (23) in the third housing portion (22c) through which the heat medium flows at different temperatures, and between the high-temperature-side outflow path (28) of the second housing portion (22b) and the low-temperature-side inflow path (25) of the third housing portion (22c) through which the heat medium flows at different temperatures. The third heat insulating layer (213) is provided between the magnetic working substances (23) in the third housing portion (22c) and the magnetic working substances (23) in the fourth housing portion (22d) through which the heat medium flows at different temperatures, and between the high-temperature-side outflow path (28) of the third housing portion (22c) and the low-temperature-side inflow path (25) of the fourth housing portion (22d) through which the heat medium flows at different temperatures, Accordingly, a deterioration in performance due to a heat leakage can be suppressed even when the housing portions (22) (magnetic working substances (23)) or the flow paths (25 to 28) having different temperatures are adjacent to each other. In other words, a deterioration in performance due to a heat leakage between the housing portions (22) to through which the heat medium flows at different temperatures can be suppressed.

Embodiment 4

Embodiment 4 will be described. A magnetic refrigeration module (20) according to the present embodiment is different from that of Embodiment 1 described above in that the magnetic refrigeration module (20) according to the present embodiment includes, for example, a plurality of parallel blocks (29a, 29b). Differences from Embodiment 1 will be mainly described below.

Housing Portion Case

As illustrated in FIGS. 27 to 30K, six housing portions (22) are housed in a housing portion case (21). The housing portion case (21) has six through holes (21a). Each through hole (21a) houses one housing portion (22).

Figure 28A:
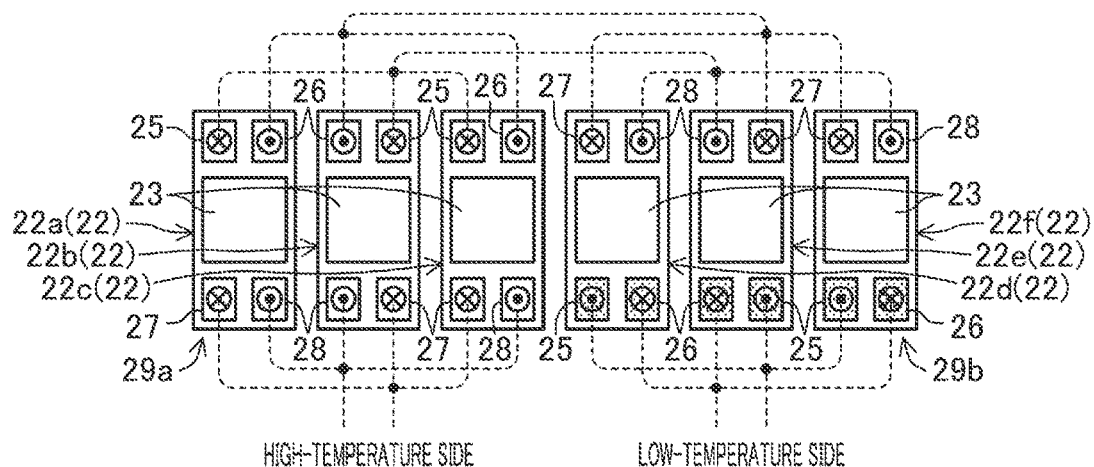
FIG. 28A, FIG. 28B, FIG. 28C, FIG. 28D, FIG. 28E, FIG. 28F, FIG. 28G, FIG. 28H, FIG. 28I, FIG. 28J and FIG. 28K are diagrams illustrating components of the magnetic refrigeration module according to Embodiment 4.
Figure 28B:
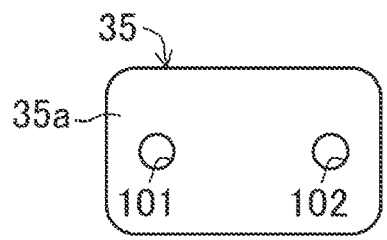
Figure 28C:
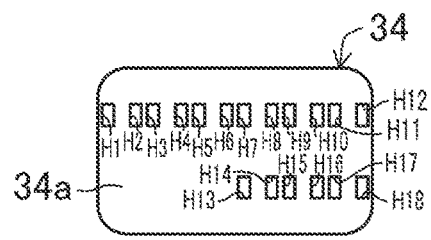
Figure 28D:
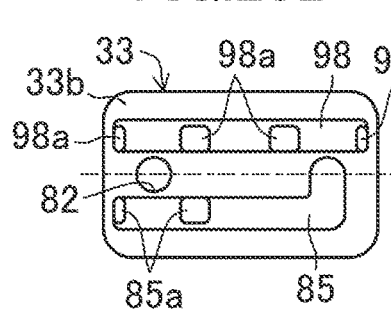
Figure 28E:
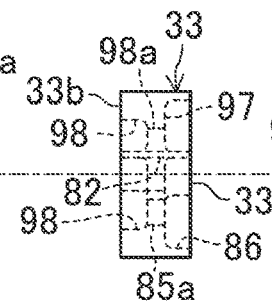
Figure 28F:
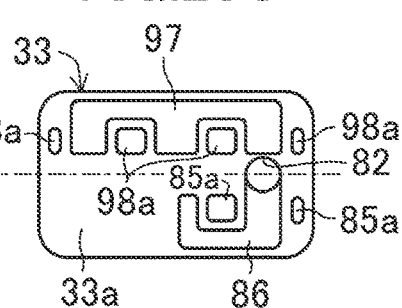
Figure 28G:
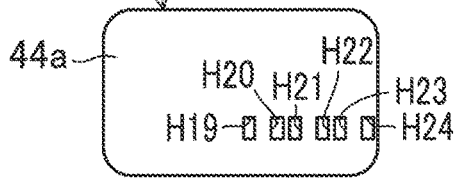
Figure 28H:
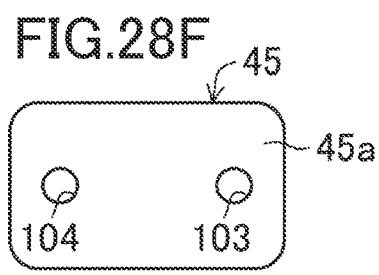
Figure 28I:
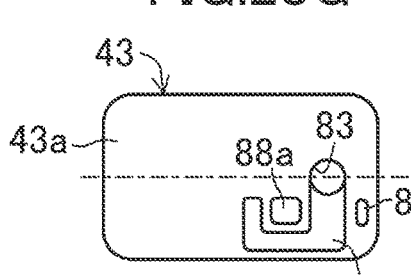
Figure 28J:
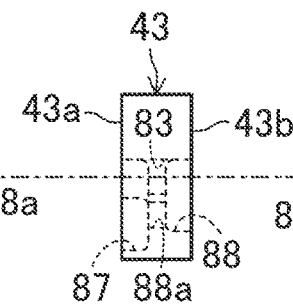
Figure 28K:
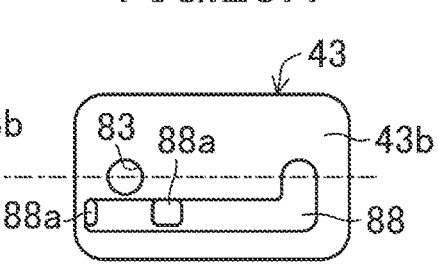
Figure 29A:
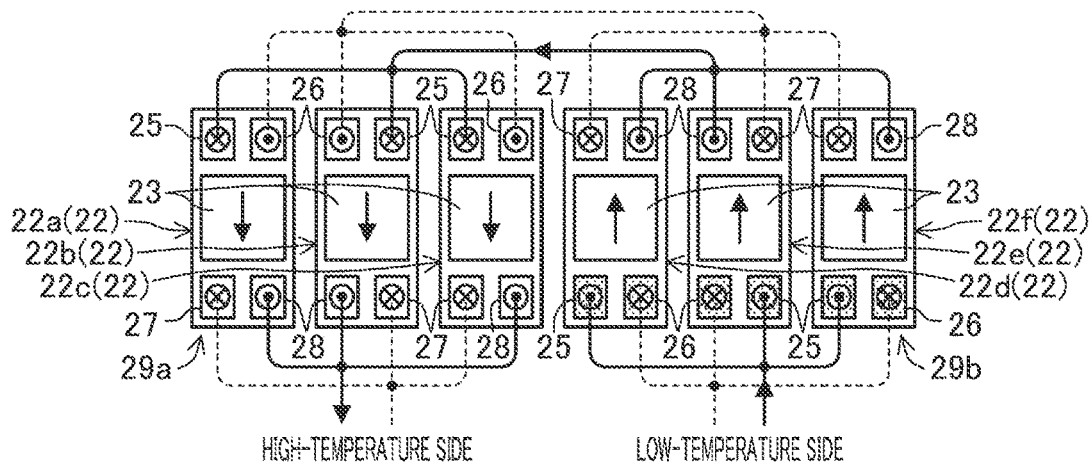
FIG. 29A, FIG. 29B, FIG. 29C, FIG. 29D, FIG. 29E, FIG. 29F, FIG. 29G, FIG. 29H, FIG. 29I, FIG. 29J and FIG. 29K are diagrams for describing a flow of a heat medium in the magnetic refrigeration module when a heat medium pump performs a first operation.
Figure 29B:
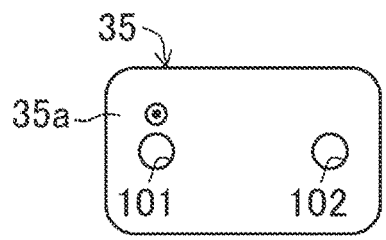
Figure 29C:
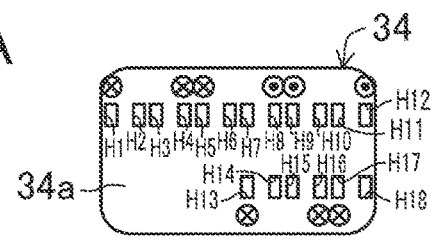
Figure 29D:
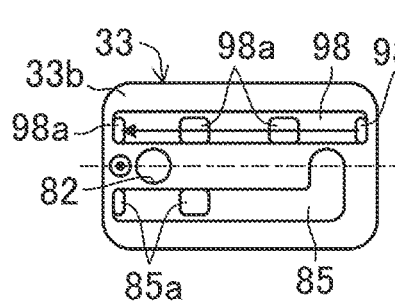
Figure 29E:
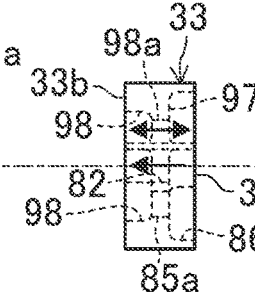
Figure 29F:
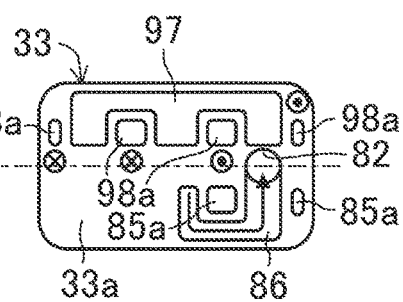
Figure 29G:
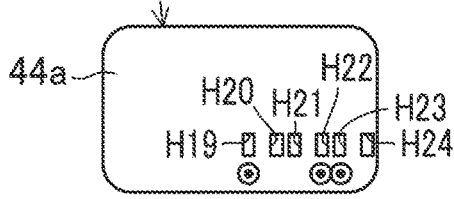
Figure 29H:
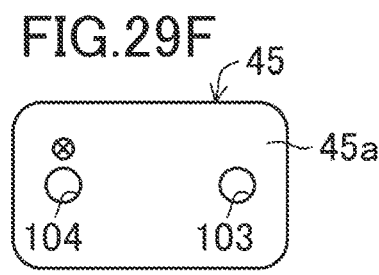
Figure 29I:
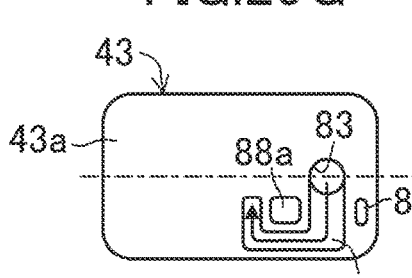
Figure 29J:
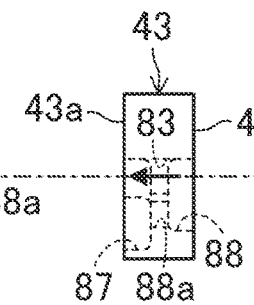
Figure 29K:
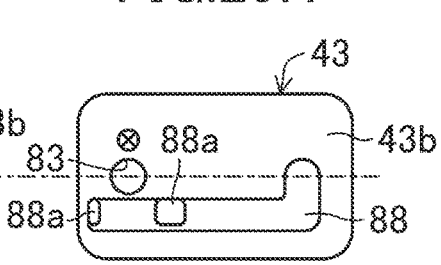
Figure 30A:
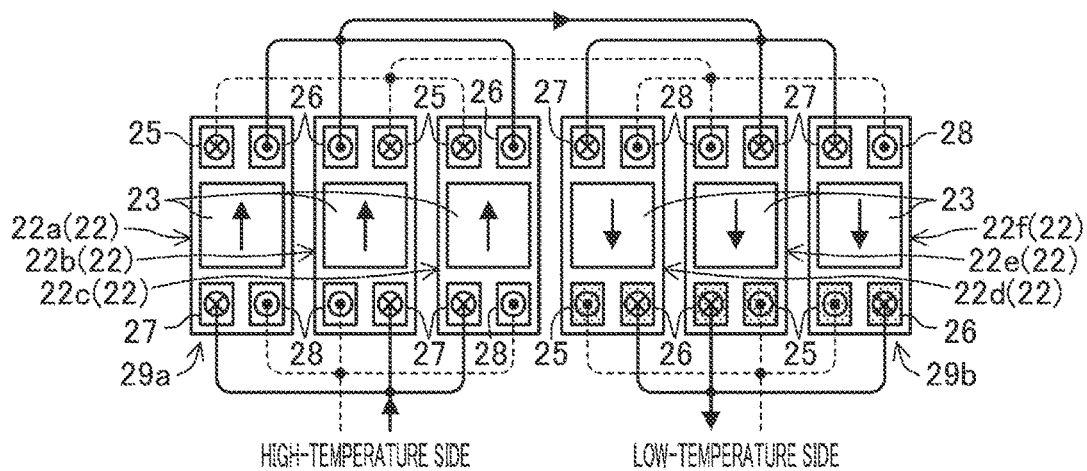
FIG. 30A, FIG. 30B, FIG. 30C, FIG. 30D, FIG. 30E, FIG. 30F, FIG. 30G, FIG. 30H, FIG. 30I, FIG. 30J and FIG. 30K are diagrams for describing a flow of the heat medium in the magnetic refrigeration module when the heat medium pump performs a second operation.
Figure 30B:
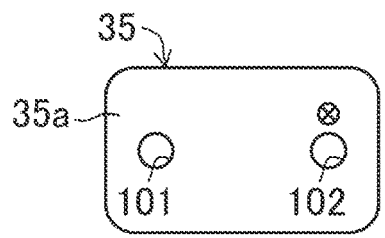
Figure 30C:
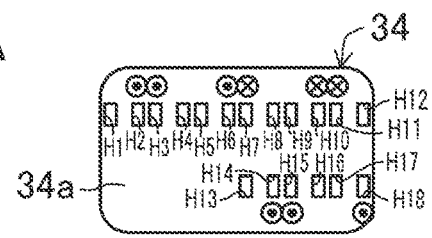
Figure 30D:
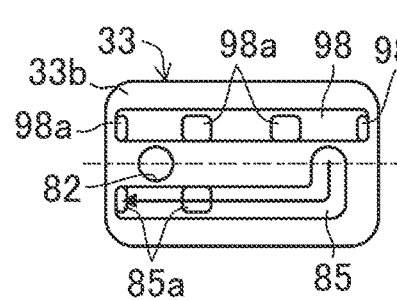
Figure 30E:
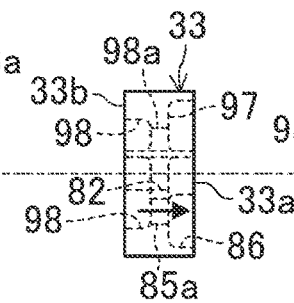
Figure 30F:
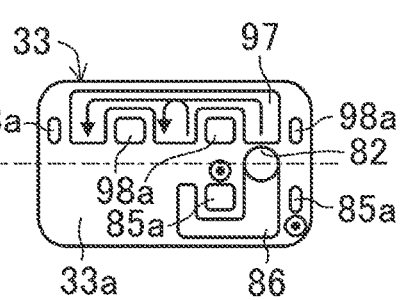
Figure 30G:
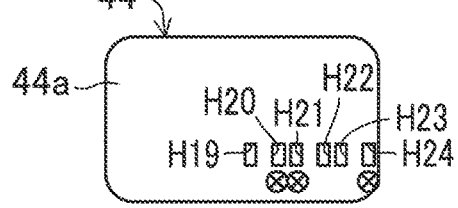
Figure 30H:
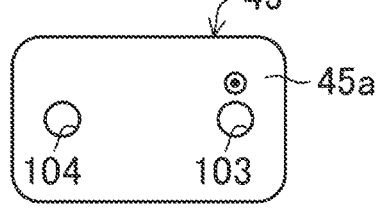
Figure 30I:
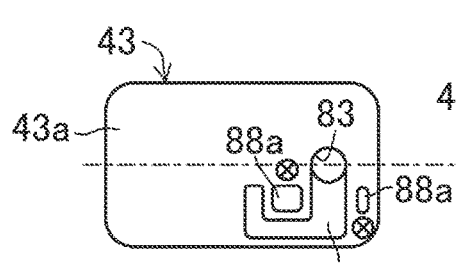
Figure 30J:
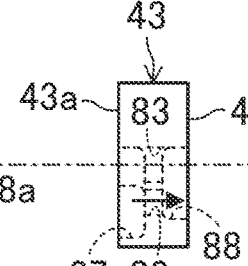
Figure 30K:
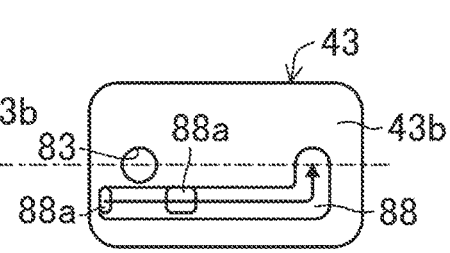

Hereinafter, the six housing portions (22) according to the present embodiment may be referred to as a first housing portion (22a), a second housing portion (22b), a third housing portion (22c), a fourth housing portion (22d), a fifth housing portion (22e), and a sixth housing portion (22f) in this order from the left side to the right side in FIG. 28A. Each of the first to third housing portions (22a to 22c) constitutes a housing portion disposed on a most high-temperature side. Each of the fourth to sixth housing portions (22d to 22f) constitutes a housing portion disposed on a most low-temperature side.

High-Temperature-Side Header

A high-temperature-side header (32) is different from that of Embodiment 1 described above in the configurations of a high-temperature-side header body (33) and a first high-temperature-side packing (34). The configuration of a second high-temperature-side packing (35) is the same as that of Embodiment 1 described above.

High-Temperature-Side Header Body

In a front surface (33a) or a back surface (33b) of the high-temperature-side header body (33) (in other words, in at least one of a vicinity of a first surface and a vicinity of a second surface inside the high-temperature-side header body (33)), a high-temperature internal inflow groove (85), a high-temperature internal outflow groove (86), a first series-parallel connection groove (97), and a second series-parallel connection groove (98) are formed in a multilayer structure.

The high-temperature internal inflow groove (85) communicates with a high-temperature-side inflow port (27a) of each of the first to third housing portions (22a to 22c) (specifically, an inlet of a high-temperature-side inflow path (27) of each of the first to third housing portions (22a to 22c)) through through holes (85a) formed in the bottom of the high-temperature internal inflow groove (85) and the first high-temperature-side packing (34). The high-temperature internal inflow groove (85) communicates with a high-temperature-end inflow port (71) through the second high-temperature-side packing (35). The high-temperature internal inflow groove (85) allows the respective high-temperature-side inflow ports (27a) of the first to third housing portions (22a to 22c) to communicate with each other through the first high-temperature-side packing (34) by parallel connection. The high-temperature internal inflow groove (85) has a substantially L-like shape in the back surface (33b) of the high-temperature-side header body (33). The high-temperature internal inflow groove (85) constitutes a high-temperature internal inflow path. The high-temperature internal inflow groove (85) constitute a parallel internal flow path.

The high-temperature internal outflow groove (86) allows a high-temperature-side outflow hole (82) and a high-temperature-side outflow port (28*a*) of each of the first to third housing portions (22*a* to 22*c*) (specifically, an outlet of a high-temperature-side outflow path (28) of each of the first to third housing portions (22*a* to 22*c*)) to communicate with each other through the first high-temperature-side packing (34). The high-temperature internal outflow groove (86) allows the respective high-temperature-side outflow ports (28*a*) of the first to third housing portions (22*a* to 22*c*) to communicate with each other by parallel connection through the first high-temperature-side packing (34). The high-temperature internal outflow groove (86) has a substantially C-like shape open upward in the front surface (33*a*) of the high-temperature-side header body (33). The high-temperature internal outflow groove (86) constitutes a high-temperature internal outflow path. The high-temperature internal outflow groove (86) constitute a parallel internal flow path.

The first series-parallel connection groove (97) allows respective low-temperature-side outflow ports (26*a*) of the first to third housing portions (22*a* to 22*c*) (specifically, outlets of respective low-temperature-side outflow paths (26) of the first to third housing portions (22*a* to 22*c*)) to communicate with each other by parallel connection through the first high-temperature-side packing (34), Similarly, the first series-parallel connection groove (97) allows respective high-temperature-side inflow ports (27*a*) of the fourth to sixth housing portions (22*d* to 22*f*) (specifically, inlets of respective high-temperature-side inflow paths (27) of the fourth to sixth housing portions (22*d* to 22*f*)) to communicate with each other by parallel connection. Similarly, the first series-parallel connection groove (97) allows the respective low-temperature-side outflow ports (26*a*) of the first to third housing portions (22*a* to 22*c*) and the respective high-temperature-side inflow ports (27*a*) of the fourth to sixth housing portions (22*d* to 22*f*) to communicate with each other by series connection. The first series-parallel connection groove (97) has a substantially E-like shape in the front surface (33*a*) of the high-temperature-side header body (33). The first series-parallel connection groove (97) constitutes a first series internal flow path. The first series-parallel connection groove (97) constitutes a parallel internal flow path.

The second series-parallel connection groove (98) allows respective low-temperature-side inflow ports (25*a*) of the first to third housing portions (22*a* to 22*c*) (specifically, inlets of respective low-temperature-side inflow paths (25) of the first to third housing portions (22*a* to 22*c*)) to communicate with each other by parallel connection through through holes (98*a*) formed in the bottom of the second series-parallel connection groove (98) and the first high-temperature-side packing (34). Similarly, the second series-parallel connection groove (98) allows respective high-temperature-side outflow ports (28*a*) of the fourth to sixth housing portions (22*d* to 22*f*) (specifically, outlets of respective high-temperature-side outflow paths (28) of the fourth to sixth housing portions (22*d* to 22*f*)) to communicate with each other by parallel connection. Similarly, the second series-parallel connection groove (98) allows the respective low-temperature-side inflow ports (25*a*) of the first to third housing portions (22*a* to 22*c*) and the respective high-temperature-side outflow ports (28*a*) of the fourth to sixth housing portions (22*d* to 22*f*) to communicate with each other by series connection. The second series-parallel connection groove (98) has a substantially I-like shape in the back surface (33*b*) of the high-temperature-side header body (33). The second series-parallel connection groove (98) constitutes a second series internal flow path. The second series-parallel connection groove (98) constitutes a parallel internal flow path.

First High-Temperature-Side Packing

First to eighteenth packing holes (H1 to H18) each having a vertically long rectangular shape are formed in the first high-temperature-side packing (34). The first to eighteenth packing holes (H1 to H18) extend through the first high-temperature-side packing (34) in the thickness direction.

The first packing hole (H1) allows the high-temperature-side outflow port (28*a*) of the sixth housing portion (22*f*) and the second series-parallel connection groove (98) of the high-temperature-side header body (33) to communicate with each other. The second packing hole (H2) allows the high-temperature-side inflow port (27*a*) of the sixth housing portion (22l) and the first series-parallel connection groove (97) of the high-temperature-side header body (33) to communicate with each other. The third packing hole (H3) allows the high-temperature-side inflow port (27*a*) of the fifth housing portion (22*e*) and the first series-parallel connection groove (97) of the high-temperature-side header body (33) to communicate with each other. The fourth packing hole (H4) allows the high-temperature-side outflow port (28*a*) of the fifth housing portion (22*e*) and the second series-parallel connection groove (98) of the high-temperature-side header body (33) to communicate with each other. The fifth packing hole (H5) allows the high-temperature-side outflow port (28*a*) of the fourth housing portion (22*d*) and the second series-parallel connection groove (98) of the high-temperature-side header body (33) to communicate with each other. The sixth packing hole (H6) allows the high-temperature-side inflow port (27*a*) of the fourth housing portion (22*d*) and the first series-parallel connection groove (97) of the high-temperature-side header body (33) to communicate with each other.

With such a configuration, the respective high-temperature-side outflow paths (28) of the fourth to sixth housing portions (22*d* to 22*f*) are connected to each other in parallel through the second series-parallel connection groove (98). The respective high-temperature-side inflow paths (27) of the fourth to sixth housing portions (22*d* to 22*f*) are connected to each other in parallel through the first series-parallel connection groove (97). As described later, respective low-temperature-side outflow paths (26) of the fourth to sixth housing portions (22*d* to 22*f*) are connected to each other in parallel, and respective low-temperature-side inflow paths (25) of the fourth to sixth housing portions (22*d* to 22*f*) are connected to each other in parallel. In other words, the fourth to sixth housing portions (22*d* to 22*f*) are connected to each other in parallel to constitute the second parallel block (29*b*).

The seventh packing hole (H7) allows the low-temperature-side outflow port (26*a*) of the third housing portion (22*c*) and the first series-parallel connection groove (97) of the high-temperature-side header body (33) to communicate with each other. The eighth packing hole (H8) allows the low-temperature-side inflow port (25*a*) of the third housing portion (22*c*) and the second series-parallel connection groove (98) of the high-temperature-side header body (33) to communicate with each other. The ninth packing hole (H9) allows the low-temperature-side inflow port (25*a*) of the second housing portion (22*b*) and the second series-parallel connection groove (98) of the high-temperature-side header body (33) to communicate with each other. The tenth packing hole (H10) allows the low-temperature-side outflow port (26a) of the second housing portion (22b) and the first series-parallel connection groove (97) of the high-temperature-side header body (33) to communicate with each other. The eleventh packing hole (H11) allows the low-temperature-side outflow port (26a) of the first housing portion (22a) and the first series-parallel connection groove (97) of the high-temperature-side header body (33) to communicate with each other. The twelfth packing hole (H12) allows the low-temperature-side inflow port (25a) of the first housing portion (22a) and the second series-parallel connection groove (98) of the high-temperature-side header body (33) to communicate with each other. The thirteenth packing hole (H13) allows the high-temperature-side outflow port (28a) of the third housing portion (22c) and the high-temperature internal outflow groove (86) of the high-temperature-side header body (33) to communicate with each other. The fourteenth packing hole (H14) allows the high-temperature-side inflow port (27a) of the third housing portion (22c) and the high-temperature internal inflow groove (85) of the high-temperature-side header body (33) to communicate with each other. The fifteenth packing hole (H15) allows the high-temperature-side inflow port (27a) of the second housing portion (22b) and the high-temperature internal inflow groove (85) of the high-temperature-side header body (33) to communicate with each other. The sixteenth packing hole (H16) allows the high-temperature-side outflow port (28a) of the second housing portion (22b) and the high-temperature internal outflow groove (86) of the high-temperature-side header body (33) to communicate with each other. The seventeenth packing hole (H17) allows the high-temperature-side outflow port (28a) of the first housing portion (22a) and the high-temperature internal outflow groove (86) of the high-temperature-side header body (33) to communicate with each other. The eighteenth packing hole (H18) allows the high-temperature-side inflow port (27a) of the first housing portion (22a) and the high-temperature internal inflow groove (85) of the high-temperature-side header body (33) to communicate with each other.

With such a configuration, the respective low-temperature-side outflow paths (26) of the first to third housing portions (22a to 22c) are connected to each other in parallel through the first series-parallel connection groove (97). The respective low-temperature-side inflow paths (25) of the first to third housing portions (22a to 22c) are connected to each other in parallel through the second series-parallel connection groove (98). The respective high-temperature-side outflow paths (28) of the first to third housing portions (22a to 22c) are connected to each other in parallel through the high-temperature internal outflow groove (86). The respective high-temperature-side inflow paths (27) of the first to third housing portions (22a to 22c) are connected to each other in parallel through the high-temperature internal inflow groove (85). In other words, the first to third housing portions (22a to 22c) are connected to each other in parallel to constitute the first parallel block (29a).

With the above-described configuration, the respective low-temperature-side outflow paths (26) of the first to third housing portions (22a to 22c) and the respective high-temperature-side inflow paths (27) of the fourth to sixth housing portions (22d to 22f) are connected to each other in series through the first series-parallel connection groove (97). The respective low-temperature-side inflow paths (25) of the first to third housing portions (22a to 22c) and the respective high-temperature-side outflow paths (28) of the fourth to sixth housing portions (22d to 22f) are connected to each other in series through the second series-parallel connection groove (98). In other words, the first parallel block (29a) and the second parallel block (29b) are connected to each other in series.

Low-Temperature-Side Header

A low-temperature-side header (42) is different from that of Embodiment 1 described above in the configurations of a low-temperature-side header body (43) and a first low-temperature-side packing (44). The configuration of a second low-temperature-side packing (45) is the same as that of Embodiment 1 described above.

Low-Temperature-Side Header Body

In a front surface (43a) or a back surface (43b) of the low-temperature-side header body (43) (in other words, in at least one of a vicinity of a first surface and a vicinity of a second surface inside the low-temperature-side header (42)), a low-temperature internal inflow groove (87) and a low-temperature internal outflow groove (88) are formed in a multilayer structure.

The low-temperature internal inflow groove (87) allows a low-temperature-side inflow hole (83) and a low-temperature-side inflow port (25a) of each of the fourth to sixth housing portions (22d to 22f) (specifically, an inlet of a low-temperature-side inflow path (25) of each of the fourth to sixth housing portions (22d to 22f)) to communicate with each other through the first low-temperature-side packing (44). The low-temperature internal inflow groove (87) allows the respective low-temperature-side inflow ports (25a) of the fourth to sixth housing portions (22d to 22f) to communicate with each other through the first low-temperature-side packing (44) by parallel connection. The low-temperature internal inflow groove (87) has a substantially C-like shape open upward in the front surface (43a) of the low-temperature-side header body (43). The low-temperature internal inflow groove (87) constitutes a low-temperature internal inflow path. The low-temperature internal inflow groove (87) constitutes a parallel internal flow path.

The low-temperature internal outflow groove (88) communicates with low-temperature-side outflow ports (26a) of the fourth to sixth housing portions (22d to 22f) (specifically, outlets of low-temperature-side outflow paths (26) of the fourth to sixth housing portions (22d to 22f)) through through holes (88a) formed in the bottom of the low-temperature internal outflow groove (88) and the first low-temperature-side packing (44). The low-temperature internal outflow groove (88) communicates with the low-temperature-end outflow port (74) through the second low-temperature-side packing (45). The low-temperature internal outflow groove (88) allows the respective low-temperature-side outflow ports (26a) of the fourth to sixth housing portions (22d to 22f) to communicate with each other through the first low-temperature-side packing (44) by parallel connection. The low-temperature internal outflow groove (88) has a substantially L-like shape in the back surface (43b) of the low-temperature-side header body (43). The low-temperature internal outflow groove (88) constitutes a low-temperature internal outflow path. The low-temperature internal outflow groove (88) constitutes a parallel internal flow path.

First Low-Temperature-Side Packing

Nineteenth to twenty-fourth packing holes (H19 to H24) each having a vertically long rectangular shape are formed in the first low-temperature-side packing (44). The nineteenth to twenty-fourth packing holes (H19 to H24) extend through the first low-temperature-side packing (44) in the thickness direction. The nineteenth packing hole (H19) allows the low-temperature-side inflow port (25a) of the fourth housing portion (22d) and the low-temperature internal inflow groove (87) of the low-temperature-side header body (43) to communicate with each other. The twentieth packing hole (H20) allows the low-temperature-side outflow port (26*a*) of the fourth housing portion (22*d*) and the low-temperature internal outflow groove (88) of the low-temperature-side header body (43) to communicate with each other. The twenty-first packing hole (H21) allows the low-temperature-side outflow port (26*a*) of the fifth housing portion (22*e* and the low-temperature internal outflow groove (88) of the low-temperature-side header body (43) to communicate with each other. The twenty-second packing hole (H22) allows the low-temperature-side inflow port (25*a*) of the fifth housing portion (22*e*) and the low-temperature internal inflow groove (87) of the low-temperature-side header body (43) to communicate with each other. The twenty-third packing hole (H23) allows the low-temperature-side inflow port (25*a*) of the sixth housing portion (22*f*) and the low-temperature internal inflow groove (87) of the low-temperature-side header body (43) to communicate with each other. The twenty-fourth packing hole (H24) allows the to low-temperature-side outflow port (26*a*) of the sixth housing portion (22*f* and the low-temperature internal outflow groove (88) of the low-temperature-side header body (43) to communicate with each other.

With such a configuration, the respective low-temperature-side outflow paths (26) of the fourth to sixth housing portions (22*d* to 22*f*) are connected to each other in parallel through the low-temperature internal outflow groove (88). The respective low-temperature-side inflow paths (25) of the fourth to sixth housing portions (22*d* to 22*f*) are connected to each other in parallel through the low-temperature internal inflow groove (87).

Flow of Heat Medium in Magnetic Refrigeration Module

A description is given of a flow of the heat medium in the magnetic refrigeration module (20) when the air conditioning system (10) is operated, more specifically, when the heat medium pump (130) performs the first operation or the second operation.

As illustrated in FIGS. 29A to 29K, when the heat medium pump (130) performs the first operation, the heat medium flows from the low-temperature side to the high-temperature side in the magnetic refrigeration module (20). Specifically, in the magnetic refrigeration module (20), the heat medium having flowed in from the low-temperature-end inflow port (73) flows into the low-temperature-side inflow hole (83) of the low-temperature-side header body (43). The heat medium having flowed out of the low-temperature-side inflow hole (83) of the low-temperature-side header body (43) flows into the low-temperature-side inflow path (25) of each of the fourth to sixth housing portions (22*d* to 22*f*) through the low-temperature internal inflow groove (87) of the low-temperature-side header body (43). The heat medium having flowed out of the low-temperature-side inflow path (25) of each of the fourth to sixth housing portions (22*d* to 22*f*) flows through the magnetic working substances (23) in each of the fourth to sixth housing portions (22*d* to 22*f*) and then flows into the high-temperature-side outflow path (28) of each of the fourth to sixth housing portions (22*d* to 22*f*).

The heat medium having flowed out of the high-temperature-side outflow path (28) of each of the fourth to sixth housing portions (22*d* to 22*f*) flows into the low-temperature-side inflow path (25) of each of the first to third housing portions (22*a* to 22*c*) through the second series-parallel connection groove (98) of the high-temperature-side header body (33). The heat medium having flowed out of the low-temperature-side inflow path (25) of each of the first to third housing portions (22*a* to 22*c*) flows through the magnetic working substances (23) in each of the first to third housing portions (22*a* to 22*c*) and then flows into the high-temperature-side outflow path (28) of each of the first to third housing portions (22*a* to 22*c*). The heat medium having flowed out of the high-temperature-side outflow path (28) of each of the first to third housing portions (22*a* to 22*c*) flows into the high-temperature-side outflow hole (82) of the high-temperature-side header body (33) through the high-temperature internal outflow groove (86) of the high-temperature-side header body (33). The heat medium having flowed out of the high-temperature-side outflow hole (82) of the high-temperature-side header body (33) flows to the outside of the magnetic refrigeration module (20) through the high-temperature-end outflow port (72).

As illustrated in FIGS. 30A to 30K, when the heat medium pump (130) performs the second operation, the heat medium flows from the high-temperature side to the low-temperature side in the magnetic refrigeration module (20). Specifically, in the magnetic refrigeration module (20), the heat medium having flowed in from the high-temperature-end inflow port (71) flows into the high-temperature-side inflow path (27) of each of the first to third housing portions (22*a* to 22*c*) through the high-temperature internal inflow groove (85) of the high-temperature-side header body (33). The heat medium having flowed out of the high-temperature-side inflow path (27) of each of the first to third housing portions (22*a* to 22*c*) flows through the magnetic working substances (23) in each of the first to third housing portions (22*a* to 22*c*) and then flows into the low-temperature-side outflow path (26) of each of the first to third housing portions (22*a* to 22*c*).

The heat medium having flowed out of the low-temperature-side outflow path (26) of each of the first to third housing portions (22*a* to 22*c*) flows into the high-temperature-side inflow path (27) of each of the fourth to sixth housing portions (22*d* to 22*f*) through the first series-parallel connection groove (97) of the high-temperature-side header body (33). The heat medium having flowed out of the high-temperature-side inflow path (27) of each of the fourth to sixth housing portions (22*d* to 22*f*) flows through the magnetic working substances (23) in each of the fourth to sixth housing portions (22*d* to 22*f*) and then flows into the low-temperature-side outflow path (26) of each of the fourth to sixth housing portions (22*d* to 22*f*). The heat medium having flowed out of the low-temperature-side outflow path (26) of each of the fourth to sixth housing portions (22*d* to 22*f*) passes through the low-temperature internal outflow groove (88) of the low-temperature-side header body (43) and then flows to the outside of the magnetic refrigeration module (20) through the low-temperature-end outflow port (74).

Advantageous Effects of Embodiment 4

Also with the magnetic refrigeration module (20) according to the present embodiment, advantageous effects similar to those of Embodiment 1 described above are obtained.

In the magnetic refrigeration module (20) according to the present embodiment, at least some of the plurality of housing portions (22) are connected to each other in parallel. With this configuration, a heat medium supplied to the magnetic refrigeration module (20) simultaneously flows through the plurality of housing portions (22) connected to each other in parallel.

The magnetic refrigeration module (20) according to the present embodiment includes a plurality of parallel blocks (29*a*, 29*b*) each constituted by the plurality of housing portions (22) connected to each other in parallel, and the plurality of parallel blocks (29*a*, 29*b*) are connected to each other in series. With this configuration, a heat medium supplied to the magnetic refrigeration module (20) sequentially flows through the plurality of parallel blocks (29a, 29b) connected to each other in series. In each of the parallel blocks (29a, 29b), the heat medium simultaneously flows through the plurality of housing portions (22) connected to each other in parallel.

In the magnetic refrigeration module (20) according to the present embodiment, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) are constituted by a multilayer structure provided at the low-temperature-side header (42) or the high-temperature-side header (32). With this configuration, the low-temperature internal inflow path (87), the low-temperature internal outflow path (88), the high-temperature internal inflow path (85), the high-temperature internal outflow path (86), the first series internal flow path (91, 93, 95, 97), and the second series internal flow path (92, 94, 96, 98) are constituted by the multilayer structure, and thus each header (32, 42, 52, 62) can be downsized.

In the magnetic refrigeration module (20) according to the present embodiment, the header structure (32, 42, 52, 62) includes the low-temperature-side header (42) and the high-temperature-side header (32); the low-temperature internal inflow path (87) and the low-temperature internal outflow path (88) are constituted by a multilayer structure provided at the low-temperature-side header (42); and the high-temperature internal inflow path (85) and the high-temperature internal outflow path (86) are constituted by a multilayer structure provided at the high-temperature-side header (32). With this configuration, the heat medium flows from the low-temperature-side header (42) through the plurality of housing portions (22) to the high-temperature-side header (32), or flows in the opposite direction. When the low-temperature internal inflow path (87) and the low-temperature internal outflow path (88), or the high-temperature internal inflow path (85) and the high-temperature internal outflow path (86) are constituted by the multilayer structure, the low-temperature-side header (42) or the high-temperature-side header (32) can be downsized.

In the magnetic refrigeration module (20) according to the present embodiment, each of the low-temperature-side header (42) and the high-temperature-side header (32) has a first surface (34a, 44a) facing the housing portion (22) and a second surface (35a, 45a) on a back side of the first surface (34a, 44a); the low-temperature internal inflow path (87) and the low-temperature internal outflow path (88) that have the multilayer structure are constituted by grooves (87, 88) formed in at least one of a vicinity of the first surface (44a) and a vicinity of the second surface (45a) inside the low-temperature-side header (42); and the high-temperature internal inflow path (85) and the high-temperature internal outflow path (86) that have the multilayer structure are constituted by grooves (85, 86) formed in at least one of a vicinity of the first surface (34a) and a vicinity of the second surface (35a) inside the high-temperature-side header (32). With this configuration, the low-temperature internal inflow path (87), the low-temperature internal outflow path (88), the high-temperature internal inflow path (85), and the high-temperature internal outflow path (86) that have the multilayer structure can be attained by a simple configuration of the grooves (85 to 88) formed inside the low-temperature-side header (42) or the high-temperature-side header (32).

Improvement of Embodiment 4

In the magnetic refrigeration module (20) according to Embodiment 4 illustrated in FIGS. 28A to 28K and so forth, flow paths for connecting, to each other in series, the first parallel block (29a) in which the first to third housing portions (22a to 22c) are connected to each other in parallel and the second parallel block (29b) in which the fourth to sixth housing portions (22d to 22f) are connected to each other in parallel are separated into a forward path and a return path, but in practice, the heat medium can flow in both directions. Thus, performance deteriorates due to the flow paths becoming a dead volume.

Figure 39:
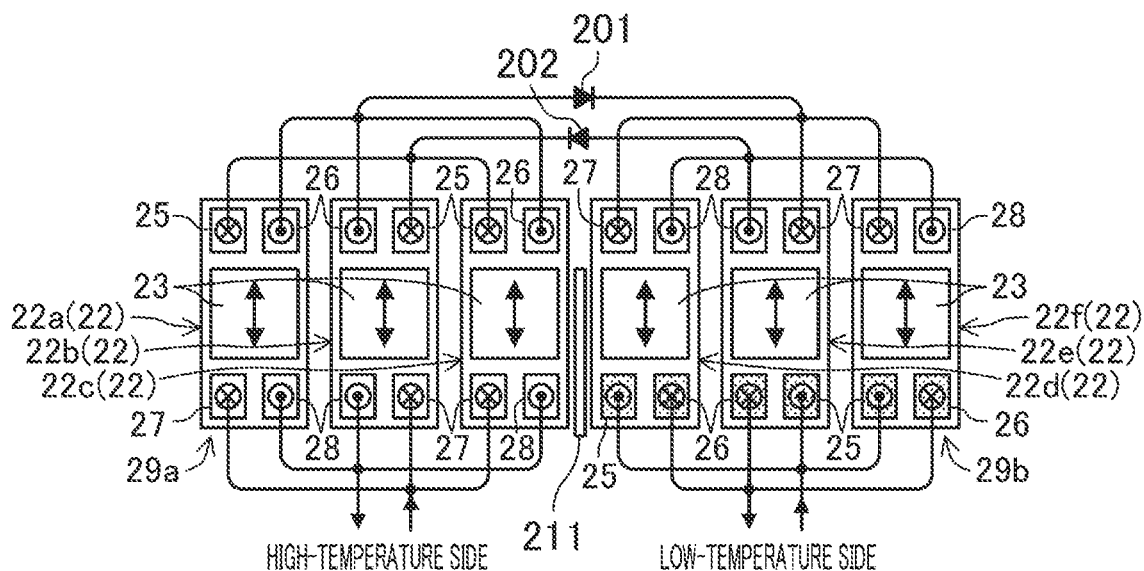
FIG. 39 is a diagram illustrating an example of a state in which a backflow prevention portion and a heat insulating layer are further provided in the magnetic refrigeration module illustrated in FIGS. 28A to 28K.
Figure 40:
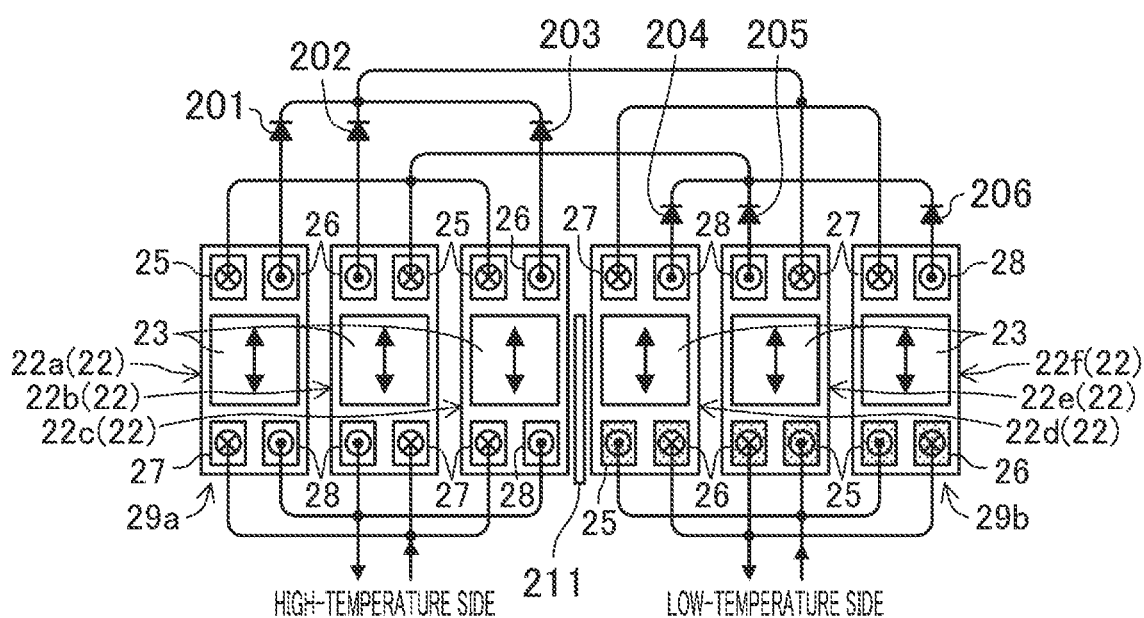
FIG. 40 is a diagram illustrating another example of a state in which a backflow prevention portion and a heat insulating layer are further provided in the magnetic refrigeration module illustrated in FIGS. 28A to 28K.

Thus, when the housing portions (22) are connected in parallel before being connected in series as in the present embodiment, backflow prevention portions (201, 202) may be provided after the housing portions (22) are connected in parallel as illustrated in FIG. 39 or backflow prevention portions (201, 202, 203, 204, 205, 206) may be provided before the housing portions (22) are connected in parallel as illustrated in FIG. 40, Thus, the directions in which the heat medium flows in the flow paths (25 to 28) of each housing portion (22) can be determined, thereby suppressing a deterioration in performance due to the flow paths (25 to 28) becoming a dead volume. In FIGS. 39 and 40, the same components as those of Embodiment 4 illustrated in FIGS. 28A to 28K are denoted by the same reference numerals.

In the configuration illustrated in FIG. 39, a first backflow prevention portion (201) may be disposed between a portion where the respective flow paths communicating with the respective low-temperature-side outflow ports (26a) (the outlets of the low-temperature-side outflow paths (26)) of the first to third housing portions (22a to 22c) constituting the first parallel block (29a) are connected in parallel and a portion where the respective flow paths communicating with the respective high-temperature-side inflow ports (27a) (the inlets of the high-temperature-side inflow paths (27)) of the fourth to sixth housing portions (22d to 22f) constituting the second parallel block (29b) are connected in parallel. A second backflow prevention portion (202) may be disposed between a portion where the respective flow paths communicating with the respective low-temperature-side inflow ports (25a) (the inlets of the low-temperature-side inflow paths (25)) of the first to third housing portions (22a to 22c) constituting the first parallel block (29a) are connected in parallel and a portion where the respective flow paths communicating with the respective high-temperature-side outflow ports (28a) (the outlets of the high-temperature-side outflow paths (28)) of the fourth to sixth housing portions (22d to 22f) constituting the second parallel block (29b) are connected in parallel.

In the configuration illustrated in FIG. 39, the first backflow prevention portion (201) may be connected to at least one of a side of the low-temperature-side outflow port (26a) of each of the first to third housing portions (22a to 22c) and a side of the high-temperature-side inflow port (27a) of each of the fourth to sixth housing portions (22d to 22f) through a structure for parallel connection. The second backflow prevention portion (202) may be connected to at least one of a side of the low-temperature-side inflow port (25a) of each of the first to third housing portions (22a to 22c) and a side of the high-temperature-side outflow port (28a) of each of the fourth to sixth housing portions (22d to 22f) through a structure for parallel connection. In this way, as described in Embodiment 1 (see FIGS. 32 and 33A to 33C), the backflow prevention portion (201, 202) can be installed inside the header structure (32, 42) at a position located upstream of the structure for series connection.

In the configuration illustrated in FIG. 39, the number of backflow prevention portions (201, 202) installed is smaller than that in the configuration illustrated in FIG. 40. In contrast, inside the header structure (32, 42), a structure for parallel connection has to be further added at a position located upstream of the backflow prevention structure (see the backflow prevention structure (36) of Embodiment 1 illustrated in FIGS. 32 and 33A to 33C) constituting the backflow prevention portion (201, 202). In other words, for example, a three-layer header structure is required.

In the configuration illustrated in FIG. 40, first to third backflow prevention portions (201, 202, 203) may be disposed between the respective low-temperature-side outflow ports (26a) (the outlets of the low-temperature-side outflow paths (26)) of the first to third housing portions (22a to 22c) constituting the first parallel block (29a) and a portion where the respective flow paths communicating with the low-temperature-side outflow ports (26a) are connected in parallel. Fourth to sixth backflow prevention portions (204, 205, 206) may be disposed between the respective high-temperature-side outflow ports (28a) (the outlets of the high-temperature-side outflow paths (28)) of the fourth to sixth housing portions (22d to 22f) constituting the second parallel block (29b) and a portion where the respective flow paths communicating with the high-temperature-side outflow ports (28a) are connected in parallel.

In the configuration illustrated in FIG. 40, the first to third backflow prevention portions (201, 202, 203) may be connected to the respective low-temperature-side outflow ports (26a) of the first to third housing portions (22a to 22c). The fourth to sixth backflow prevention portions (204, 205, 206) may be connected to the respective high-temperature-side outflow ports (28a) of the fourth to sixth housing portions (22d to 22f). In this way, as described in Embodiment 1 (see FIGS. 32 and 33A to 33C), the backflow prevention portion (201, 202, 203, 204, 205, 206) can be installed inside the header structure (32, 42) at a position located upstream of the structure for series connection.

In the configuration illustrated in FIG. 40, the number of backflow prevention portions (201 to 206) installed is larger than that in the configuration illustrated in FIG. 39. In contrast, inside the header structure (32, 42), the header body (see the high-temperature-side header body (33) according to Embodiment 1 illustrated in FIGS. 32 and 33A to 33C) disposed at a position located downstream of the backflow prevention structures constituting the backflow prevention portions (201 to 206) has a function of parallel connection in addition to series connection. Thus, a two-layer header structure is provided and the structure is simplified.

Heat Insulating Layer

In the magnetic refrigeration module (20) according to the present embodiment illustrated in FIGS. 28A to 28K and so forth, when the housing portions (22) or the flow paths (25 to 28) having different temperatures are adjacent to each other, a heat leakage occurs and performance deteriorates.

Hence, as illustrated in FIG. 39 or FIG. 40, a heat insulating layer (first heat insulating layer) (211) may be provided between the first parallel block (29a) and the second parallel block (29b) connected in series. The heat insulating layer (211) may be constituted by a heat insulator, a slit, or the like. Part of the housing portions (22) may be constituted by a heat insulating member serving as the heat insulating layer (211). The heat insulating layer (211) may be provided entirely between the first parallel block (29a) and the second parallel block (29b) connected in series, or may be provided partly between the first parallel block (29a) and the second parallel block (29b) connected in series. The heat insulating layer need not be provided between the housing portions (22) connected in parallel inside the first parallel block (29a) and the second parallel block (29b).

In the configurations illustrated in FIG. 39 and FIG. 40, the heat insulating layer (211) is provided between the magnetic working substances (23) in the third housing portion (22c) (the first parallel block (29a)) and the magnetic working substances (23) in the fourth housing portion (22d) (the second parallel block (29b)) through which the heat medium flows at different temperatures, and between the high-temperature-side outflow path (28) of the third housing portion (22c) and the low-temperature-side inflow path (25) of the fourth housing portion (22d) through which the heat medium flows at different temperatures.

Accordingly, a deterioration in performance due to a heat leakage can be suppressed even when the housing portions (22) (magnetic working substances (23)) or the flow paths (25 to 28) having different temperatures are adjacent to each other. In other words, a deterioration in performance due to a heat leakage between the housing portions (22) through which the heat medium flows at different temperatures can be suppressed.

Other Embodiments

The above-described embodiments may be configured as follows.

For example, the number of housing portions (22) is not limited to that described in each of the above-described embodiments. As long as some of the plurality of housing portions (22) are connected to each other in series, how to connect the plurality of housing portions (22) may be set in any manner. As an example, it is conceivable that six housing portions (22) are connected in parallel by two each to form three parallel blocks, and the three parallel blocks are connected to each other in series.

For example, only part of the header structure may be made of a nonmagnetic material having a thermal conductivity of 10 W/mK or less.

For example, at least part of the header structure may be made of a material having a thermal conductivity of 10 W/mK or less, or may be made of a nonmagnetic material.

For example, the solid-state cooling module may be a system other than the magnetic refrigeration module that induces the magnetocaloric effect in the magnetic working substance (23) as a solid refrigerant substance. The solid refrigerant substance referred to here also includes a substance having intermediate properties between a liquid and a solid, such as a flexible crystal.

Examples of the solid-state cooling module of other systems include a system that induces a caloric effect by application of a force field (such as an electric field) other than a magnetic field, for example, 1) a system that induces an electrocaloric effect in a solid refrigerant substance, 2) a system that induces a barocaloric effect in a solid refrigerant substance, and 3) a system the induces an elastocaloric effect in a solid refrigerant substance.

In the solid-state cooling module of the system 1), when an electric-field variation is applied to a solid refrigerant substance made of a dielectric, the solid refrigerant substance undergoes a phase transition from a ferroelectric to a paraelectric, and the solid refrigerant substance generates heat or absorbs heat.

In the solid-state cooling module of the system 2), when a pressure variation is applied to a solid refrigerant substance, the solid refrigerant substance undergoes a phase transition to generate heat or absorb heat.

In the solid-state cooling module of the system 3), when a stress variation is applied to a solid refrigerant substance, the solid refrigerant substance undergoes a phase transition to generate heat or absorb heat.

Although the embodiments and the modifications have been described above, it will be understood that various changes in modes and details may be made without departing from the idea and scope of the claims. The above-described embodiments and modifications may be appropriately combined or replaced as long as the target functions of the present disclosure are not impaired.

As described above, the present disclosure is useful for a solid-state cooling module, in particular, a magnetic refrigeration module.

The invention claimed is:

1. A solid-state cooling module comprising:
   a plurality of housing portions, each of the housing portions housing a solid refrigerant substance,
   the solid-state cooling module being configured to heat or cool a heat medium flowing through insides of the plurality of housing portions, and
   at least some of the plurality of housing portions are connected to each other in series with respect to a flow of the heat medium,
   each of the housing portions having a low-temperature-side inflow port, a low-temperature-side outflow port, a high-temperature-side inflow port, and a high-temperature-side outflow port, and
   in each of the housing portions,
      the heat medium flows from the low-temperature-side inflow port to the high-temperature-side outflow port through the solid refrigerant substance, or
      the heat medium flows from the high-temperature-side inflow port to the low-temperature-side outflow port through the solid refrigerant substance.

2. The solid-state cooling module according to claim 1, further comprising:
   a backflow prevention portion disposed in at least part of series connection portions of the plurality of housing portions.

3. The solid-state cooling module according to claim 1, wherein
   the plurality of housing portions extend in a predetermined direction and are arranged along a direction intersecting with the predetermined direction.

4. The solid-state cooling module according to claim 3, wherein
   each of the housing portions includes flow paths extending in the predetermined direction and configured to allow the heat medium to enter and exit the solid refrigerant substance, and
   the flow paths and the solid refrigerant substance are arranged in a direction intersecting with both of the direction along which the plurality of housing portions are arranged and the predetermined direction.

5. The solid-state cooling module according to claim 1, further comprising:
   a heat insulating layer disposed at least partly between the housing portions connected in series of the plurality of housing portions.

6. The solid-state cooling module according to claim 5, wherein temperatures of the heat medium flowing through housing portions adjacent to each other with the heat insulating layer interposed therebetween are different from each other.

7. The solid-state cooling module according to claim 1, wherein
   at least some of the plurality of housing portions are connected to each other in parallel with respect to the flow of the heat medium.

8. The solid-state cooling module according to claim 7, further comprising:
   a plurality of parallel blocks, each formed by the plurality of housing portions connected to each other in parallel, the plurality of parallel blocks being connected to each other in series with respect to the flow of the heat medium.

9. The solid-state cooling module according to claim 1, wherein
   a backflow prevention portion is connected to at least one of the low-temperature-side inflow port, the low-temperature-side outflow port, the high-temperature-side inflow port, and the high-temperature-side outflow port.

10. The solid-state cooling module according to claim 1, wherein
    the low-temperature-side inflow port and the low-temperature-side outflow port of each of the housing portions disposed on a most low-temperature side, and
    the high-temperature-side inflow port and the high-temperature-side outflow port of each of the housing portions disposed on a most high-temperature side
    are disposed on one side in the solid-state cooling module.

11. The solid-state cooling module according to claim 1, wherein
    the low-temperature-side inflow port and the low-temperature-side outflow port of each of the housing portions disposed on a most low-temperature side, and
    the high-temperature-side inflow port and the high-temperature-side outflow port of each of the housing portions disposed on a most high-temperature side
    are disposed on sides opposite to each other in the solid-state cooling module.

12. The solid-state cooling module according to claim 1, further comprising:
    a low-temperature-end inflow port communicating with the low-temperature-side inflow port of each of the housing portions disposed on a most low-temperature side;
    a low-temperature-end outflow port communicating with the low-temperature-side outflow port of each of the housing portions disposed on the most low-temperature side;
    a high-temperature-end inflow port communicating with the high-temperature-side inflow port of each of the housing portions disposed on a most high-temperature side; and
    a high-temperature-end outflow port communicating with the high-temperature-side outflow port of each of the housing portions disposed on the most high-temperature side.

13. The solid-state cooling module according to claim 12, further comprising:
    a header structure having a low-temperature internal inflow path, a low-temperature internal outflow path, a high-temperature internal inflow path, and a high-temperature internal outflow path, the low-temperature internal inflow path allowing the low-temperature-side inflow port of each of the housing portions disposed on the most low-temperature side and the low-temperature-end inflow port to communicate with each other, the low-temperature internal outflow path allowing the low-temperature-side outflow port of each of the housing portions disposed on the most low-temperature side and the low-temperature-end outflow port to communicated with each other, the high-temperature internal inflow path allowing the high-temperature-side inflow port of each of the housing portions disposed on the most high-temperature side and the high-temperature-end inflow port to communicate with each other, and the high-temperature internal outflow path allowing the high-temperature-side outflow port of each of the housing portions disposed on the most high-temperature side and the high-temperature-end outflow port to communicate with each other.

14. The solid-state cooling module according to claim 13, wherein the header structure further has a first series internal flow path and a second series internal flow path, the first series internal flow path connects the low-temperature-side outflow port of the housing portion and the high-temperature-side inflow port of another one of the housing portions to each other in series with respect to the flow of the heat medium to allow the high-temperature-end inflow port to communicate with the low-temperature-end outflow port through the plurality of housing portions, and the second series internal flow path connects the high-temperature-side outflow port of the housing portion and the low-temperature-side inflow port of the other one of the housing portions to each other in series with respect to the flow of the heat medium to allow the low-temperature-end inflow port to communicate with the high-temperature-end outflow port through the plurality of housing portions.

15. The solid-state cooling module according to claim 14, wherein the header structure includes a low-temperature-side header having the low-temperature internal inflow path and the low-temperature internal outflow path, and a high-temperature-side header having the high-temperature internal inflow path and the high-temperature internal outflow path, or a common header having the low-temperature internal inflow path, the low-temperature internal outflow path, the high-temperature internal inflow path, and the high-temperature internal outflow path, and a connection header having the first series internal flow path and the second series internal flow path.

16. The solid-state cooling module according to claim 15, wherein the low-temperature internal inflow path, the low-temperature internal outflow path, the high-temperature internal inflow path, the high-temperature internal outflow path, the first series internal flow path, and the second series internal flow path are formed by a single layer structure or a multilayer structure provided at the low-temperature-side header or the high-temperature-side header, or the common header or the connection header.

17. The solid-state cooling module according to claim 15, wherein the header structure includes the low-temperature-side header and the high-temperature-side header, the low-temperature internal inflow path and the low-temperature internal outflow path are formed by a single layer structure or a multilayer structure provided at the low-temperature-side header, and the high-temperature internal inflow path and the high-temperature internal outflow path are formed by a single layer structure or a multilayer structure provided at the high-temperature-side header.

18. The solid-state cooling module according to claim 17, wherein each of the low-temperature-side header and the high-temperature-side header has a first surface facing the housing portion and a second surface on a back side of the first surface, the low-temperature internal inflow path and the low-temperature internal outflow path that have the single layer structure are formed by grooves formed in a vicinity of the first surface inside the low-temperature-side header, whereas the low-temperature internal inflow path and the low-temperature internal outflow path that have the multilayer structure are formed by grooves formed in at least one of the vicinity of the first surface and a vicinity of the second surface inside the low-temperature-side header, and the high-temperature internal inflow path and the high-temperature internal outflow path that have the single layer structure are formed by grooves formed in a vicinity of the first surface inside the high-temperature-side header, whereas the high-temperature internal inflow path and the high-temperature internal outflow path that have the multilayer structure are formed by grooves formed in at least one of the vicinity of the first surface and a vicinity of the second surface inside the high-temperature-side header.

19. The solid-state cooling module according to claim 15, wherein the header structure includes the common header and the connection header, the low-temperature internal inflow path, the low-temperature internal outflow path, the high-temperature internal inflow path, and the high-temperature internal outflow path are formed by a single layer structure or a multilayer structure provided at the common header, and the first series internal flow path and the second series internal flow path are formed by a single layer structure or a multilayer structure provided at the connection header.

20. The solid-state cooling module according to claim 19, wherein each of the common header and the connection header has a first surface facing the housing portion and a second surface on a back side of the first surface, the low-temperature internal inflow path, the low-temperature internal outflow path, the high-temperature internal inflow path, and the high-temperature internal outflow path that have the single layer structure are formed by grooves formed in a vicinity of the first surface inside the common header, whereas the low-temperature internal inflow path, the low-temperature internal outflow path, the high-temperature internal inflow path, and the high-temperature internal outflow path that have the multilayer structure are formed by grooves formed in at least one of the vicinity of the first surface and a vicinity of the second surface inside the common header, and the first series internal flow path and the second series internal flow path that have the single layer structure are formed by grooves formed in a vicinity of the first surface inside the connection header, whereas the first series internal flow path and the second series internal flow path that have the multilayer structure are formed by grooves formed in at least one of the vicinity of the first surface and a vicinity of the second surface inside the connection header.

21. The solid-state cooling module according to claim 13, wherein
the plurality of housing portions are integrated with each other by the header structure.

22. The solid-state cooling module according to claim 13, wherein
at least part of the header structure is made of a material having a thermal conductivity of 10 W/mK or less.

23. The solid-state cooling module according to claim 13, wherein
at least part of the header structure is made of a nonmagnetic material.

24. The solid-state cooling module according to claim 1, wherein
the solid refrigerant substance is a magnetic working substance, and
the solid-state cooling module is a magnetic refrigeration module.

* * * * *